United States Patent [19]

Taniguchi et al.

[11] Patent Number: 5,272,500
[45] Date of Patent: Dec. 21, 1993

[54] FLASH PHOTOGRAPHING SYSTEM

[75] Inventors: Nobuyuki Taniguchi, Tondabayashi; Hiroshi Hosomizu, Shiki; Kenji Tsuji, Kashiwara; Takanobu Omaki, Sennan; Masaaki Nakai, Nara, all of Japan

[73] Assignee: Minolta Camera Kabushiki Kaisha, Osaka, Japan

[21] Appl. No.: 260,318

[22] Filed: Oct. 20, 1988

Related U.S. Application Data

[60] Continuation of Ser. No. 16,004, Feb. 18, 1987, which is a division of Ser. No. 819,015, Jan. 15, 1986, abandoned, which is a division of Ser. No. 614,031, May 25, 1984, Pat. No. 4,573,786.

[30] Foreign Application Priority Data

| | | | |
|---|---|---|---|
| May 27, 1983 | [JP] | Japan | 58-94605 |
| Jun. 1, 1983 | [JP] | Japan | 58-98227 |
| Jun. 4, 1983 | [JP] | Japan | 58-100050 |
| Jun. 7, 1983 | [JP] | Japan | 58-102407 |
| Jun. 10, 1983 | [JP] | Japan | 58-104650 |
| Jun. 13, 1983 | [JP] | Japan | 58-106424 |
| Jun. 15, 1983 | [JP] | Japan | 58-108484 |
| Jun. 17, 1983 | [JP] | Japan | 58-109921 |
| Jun. 18, 1983 | [JP] | Japan | 58-109854 |
| Jun. 21, 1983 | [JP] | Japan | 58-112326 |
| Jun. 23, 1983 | [JP] | Japan | 58-113920 |
| Jun. 23, 1983 | [JP] | Japan | 58-113921 |
| Mar. 13, 1984 | [JP] | Japan | 59-48435 |

[51] Int. Cl.⁵ ............................................. G03B 15/03
[52] U.S. Cl. ............................... 354/413; 354/145.1
[58] Field of Search ............ 354/413, 416, 417, 145.1

[56] References Cited

U.S. PATENT DOCUMENTS

| | | | |
|---|---|---|---|
| 4,573,786 | 3/1986 | Taniguchi et al. | 354/416 |
| 4,701,041 | 10/1987 | Serikawa | 354/413 |

Primary Examiner—Russell E. Adams
Attorney, Agent, or Firm—Watson, Cole, Grindle & Watson

[57] ABSTRACT

A flash photographing system includes a camera body, a flash controller connected to the camera body and three flash devices: the first flash device is directly mounted on the camera body; the second flash device is mounted on the flash controller; and the third flash device is connected through a suitable cord to the flash controller. A microcomputer is provided in the camera body and also in each of the flash devices so as to control the three flash devices in various different modes of operations, such as simultaneous flash mode, sequence flash mode, and yet providing an appropriate amount of light for the proper exposure.

12 Claims, 24 Drawing Sheets

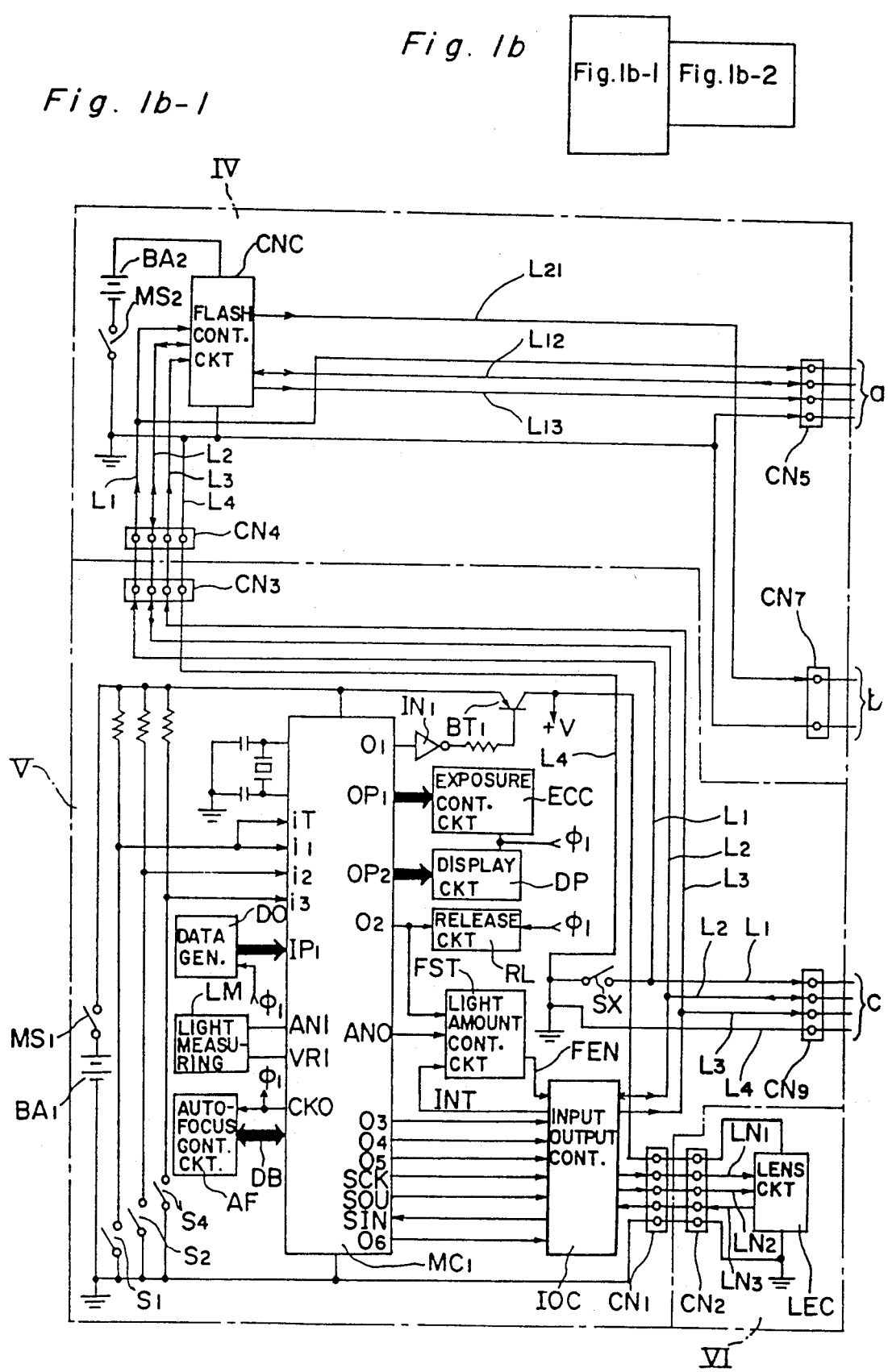

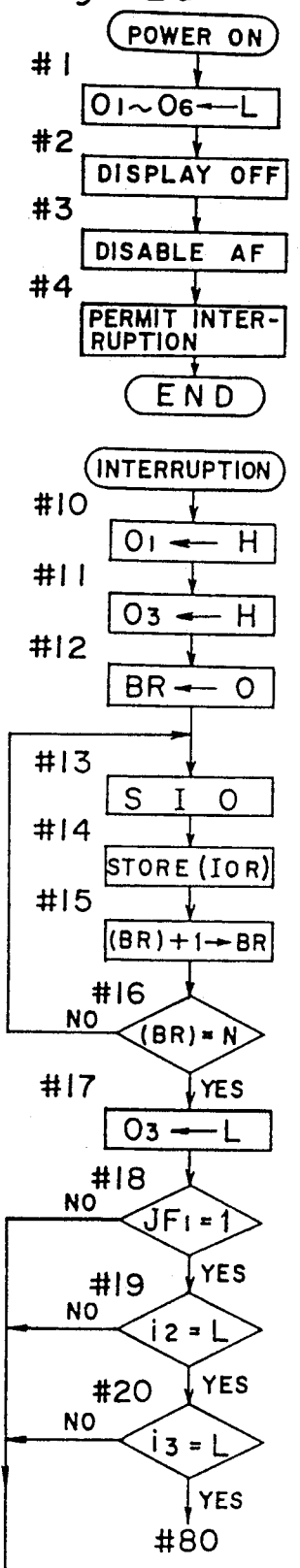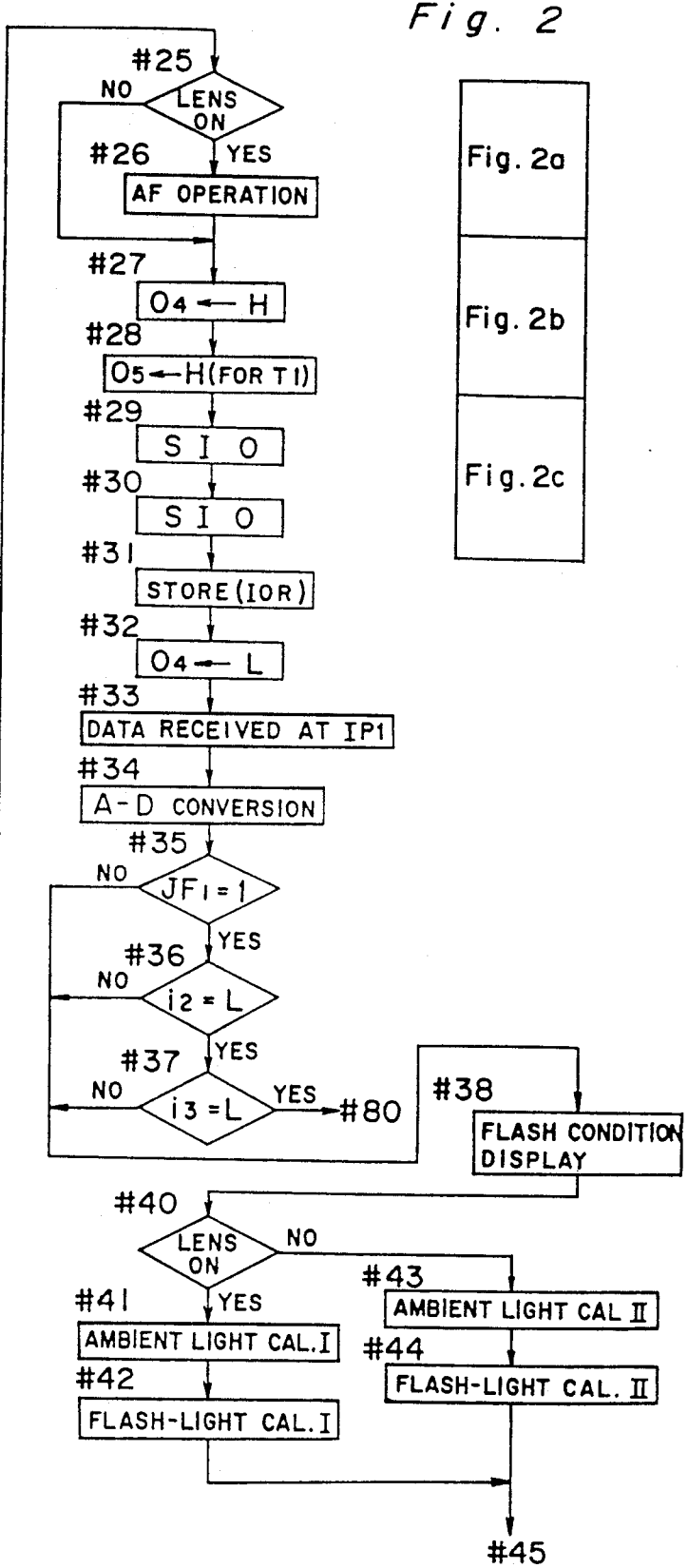

FLASH PHOTOGRAPHING SYSTEM

CROSS REFERENCE TO RELATED APPLICATIONS

This application is a continuation application of application Ser. No. 016,004, filed Feb. 18, 1987, which is a divisional application of application Ser. No. 819,015, filed Jan. 15, 1986, and now abandoned, which is a divisional application of application Ser. No. 614,031, filed May 25, 1984 and is now U.S. Pat. No. 4,573,786.

BACKGROUND OF THE INVENTION

1. Field of the Invention

The present invention generally relates to an improvement in a flash photographing system, and in individual devices operative in the system, such as an electronic flash device and a camera. More specifically, the present invention relates to an improvement in the transmission of data and information among various devices in the system and also to an improvement in the control of a plurality of flash light emissions enabled by the system.

2. Description of the Prior Art

In the field to which the present invention pertains, it is well known to transmit various data and information among devices in a flash photographing system by way of a plurality of terminals. On the other hand, it is also well known that, by means of adopting a double flashhead type or a plurality of electronic flash devices within the system, a plurality of flash light emissions are carried out during one exposure. In such a system, the number and type of the data and information to be transmitted among the devices in the system are so many that it has long been desired to rationalize them efficiently. It has also long been desired to accurately and properly control the cooperative relationship between these devices in the system and also to avoid any possibility that the operation of the system as a whole would become unreasonable. In addition, in order to accomplish these, it has been desired to improve the individual devices, such as the electronic flash device and the photographic camera, which are operative in the flash exposure system.

SUMMARY OF THE INVENTION

The present invention has for its essential object to provide a flash photographing exposure system effective to permit the various data and information t be transmitted efficiently among the various devices in the system with the use of a minimized number of terminals to permit the devices to be cooperative organically with each other.

Another object of the present invention is to provide an electronic flash device functioning within the system referred to above, wherein with the use of a minimized number of terminals, transmission of the data and information between the electronic flash device and another device in the system can be carried out efficiently.

A further object of the present invention is to provide an electronic flash device of the type referred to above, wherein an improvement has been made to avoid the occurrence of any confusion or interference among the data and information on the communication with another device in the system.

A still further object of the present invention is to provide an electronic flash device of the type referred to above, which is so structured as to avoid any possible contradictory operations to those of the other devices in the system.

A still further object of the present invention is to provide an electronic flash device of the type referred to above wherein when a plurality of such flash devices are employed in the system, no confusion arises in the system as a whole even if these flash devices are in contradictory conditions with each other.

A still further object of the present invention is to provide an improved electronic flash device of a type employing two flash light emitters.

Another object of the present invention is to provide an improved electronic flash device of the type referred to above, wherein the flash device operates satisfactorily even if the expected information fails to reach from another device in the system.

Yet another object of the present invention is to provide an improved electronic flash device, wherein the proper data and information can be transmitted in the system in accordance with the number of flash devices employed, whether it be one or more than one.

A still further object of the present invention is to provide a controlling device in the system which is, in the case where a plurality of electronic flash devices are employed, capable of collecting information fed from these electronic flash devices, determining these collected information and, based on the result of the determination, commanding the timing at which the electronic flash devices are to be fired and also delivering the result of the determination to the photographic camera.

A still further object of the present invention is to provide an improved electronic flash device of the type capable of firing at a desired firing timing in accordance with the command fed from the controlling device of the type referred to above.

A still further object of the present invention is to provide a photographic camera capable of variably setting a flash synchronized exposure time in automatic response to the information fed from the controlling device of the type referred to above.

A still further object of the present invention is to improve a photographic camera of a type which is capable of controlling the ratio of amount of flash light emitted from the individual flash light emitters in the case where a plurality of flash light emissions are carried out in the system.

A still further object of the present invention is to provide an electronic flash device capable of, for the sake of the photographic camera of the type referred to above, supplying proper light measurement controlling signals in synchronized with the flash firing.

A still further object of the present invention is to provide an electronic flash device capable of, when a plurality of flash light emissions take place sequentially, generating information to be displayed appropriate for the sequential flash light emissions.

A still further object of the present invention is to provide a controlling device capable of controlling the timing at which three electronic flash devices are to be fired.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIGS. 1b-1 and 1b-2 taken together as shown in FIG. 1b show circuit diagram of the system shown in FIG. 1a;

FIGS. 2a, 2b and 2c taken together as shown in FIG. 2 show a flow chart of operation carried out by microcomputer MC1 shown in FIG. 1b-1;

FIGS. 4a and 4b taken together as shown in FIG. 4 show a detailed flow chart of step #41 of ambient light calculation I shown in FIG. 2a;

FIGS. 5a and 5b taken together as shown in FIG. 5 show a detailed flow chart of step #42 of flash-light calculation I shown in FIG. 2a;

FIG. 6 show a detailed flow chart of step #43 of ambient light calculation II and step #44 of flash light calculation II shown in FIG. 2a;

FIG. 10 is a circuit diagram showing the detail of mode determining circuit TIC shown in FIG. 9a;

DESCRIPTION OF THE PREFERRED EMBODIMENTS

Figure 1A:
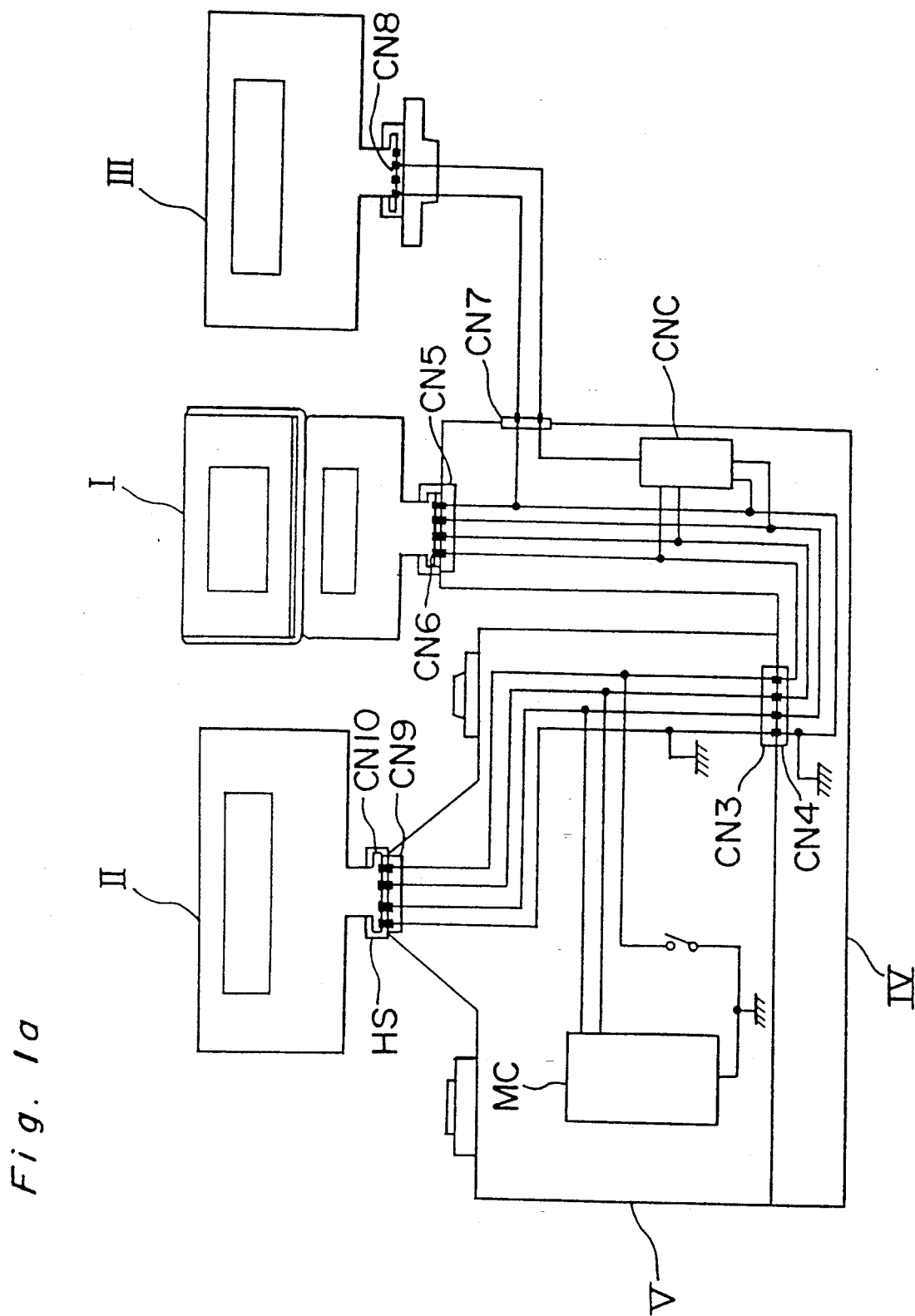
FIG. 1a is a diagrammatic view of a flash photographing system according to the present invention.

Referring to FIG. 1a a flash photographing system according to the present is diagrammatically shown. The system as shown comprises a single-reflex camera body V having a shoe connector CN9 and bottom connector CN3, a flash controller IV having connectors CN4, CN5 and CN7, and three electronic flash devices I, II and III. Electronic flash device I is a double flash-head type having a connector CN6, electronic flash device II is a single flash-head type having a connector CN10, and III is the same electronic flash device as II with a connector CN8. Although not illustrated in FIG. 1a, the system further comprises an interchangeable lens VI (FIG. 1b-1) mounted on the camera body V. These elements, i.e., camera body V, interchangeable lens VI, flash controller IV and three flash devices I, II and III, are mutually connected with each other through a single network defining the flash photographing system of the present invention.

According to the example shown in FIG. 1a, electronic flash device I is connected to flash controller IV through connectors CN6 and CN5, electronic flash device II is connected to camera body V through connectors CN9 and CN10, and electronic flash device III is connected to flash controller IV through connectors CN8 and CN7.

Instead of the connection shown in FIGS. 1a and 1b, camera body V and flash controller IV can be connected with flash devices in other manner such as described below.

(1) Exchange flash devices I and II with each other.

(2) Remove flash device III and use only two flash devices I and II.

(3) Use only one flash device I or II by connecting it to shoe connector CN9.

(4) Use only one flash device I or II by connecting it to connector CN5 of flash controller IV.

(5) Use only one flash device I or II by connecting it to shoe connector CN9, and connecting flash controller IV to bottom connector CN3 but no flash device is connected to flash controller IV.

(6) Use no flash device, but merely a flash controller IV is connected to camera body V.

In the case of (6) where only the flash controller IV is connected and no flash device is connected, no flash photographing is carried out, but normal photographing under ambient light is carried out. In addition to the above, other type of electronic flash device, such as a type which is not dedicated to any particular system or is designed for a different flash photographing system, can be mounted on shoe connector CN9 or connector CN5. In such a case, the flash device may emit flash light in response to a start signal, but operates independly of the flash photographing system of the present invention. Furthermore, when a flash device is connected to connector CN7, no matter what type it is, it operates within the control of the present system, because the flash device connected to the connector CN7 is controlled only from the view point of timed relationship with other operations, and not from the view point of amount of light emitted therefrom.

Although there are various different connections are available, the description given below is directed to the connection shown FIG. 1a, unless it is stated otherwise.

Figures 1, 1B, 2:
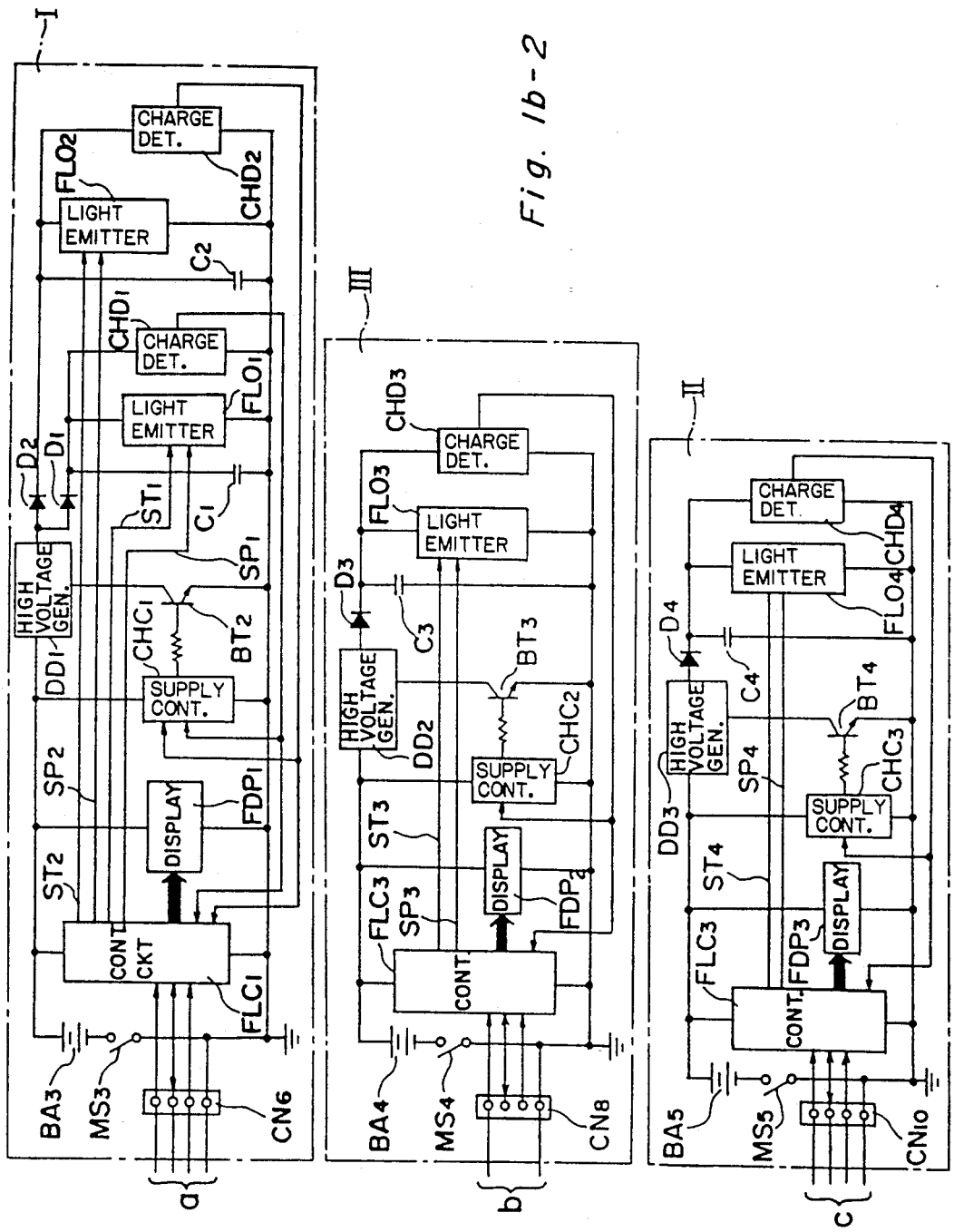

Referring to FIGS. 1b-1 and 1b-2 taken together as shown in FIG. 1b, a block diagram of a circuit of flash photographing system shown in FIG. 1a is shown. In the throughout drawings, a heavy line represents a bundle of signal lines and a hairline represents a single signal line.

Referring particularly to FIG. 1b-1, camera body V has connectors CN1, CN3 and CN9. Connectors CN3 and CN9, each having four terminals, are both connected to the same lines L1, L2 and L3 and grounded line. As shown in FIG. 1a, connector CN9 is preferably provided at a hot shoe HS for the direct connection with a flash device, such as I as illustrated in the drawings as an example, and connector CN3 is provided at the bottom of the camera body for the connection with flash controller IV. Connector CN1 is provided, for example, on a body mount ring (not shown) for mounting the interchangeable lens. Thus, when an interchangeable lens is properly mounted, connector CN1 having five terminals is connected with a connector CN2 provided in the interchangeable lens. Thus, various data are sent from a lens circuit LEC to camera body V.

Flash controller IV has a connector CN4 for the electric connection with camera body V through bottom connector CN3. Flash controller IV further has a four-terminal connector CN5 and two-terminal connector CN7, both are connectable to a flash device. When a flash device, such as I, is connected to connector CN5, signal exchange and data exchange are effected between the flash device and the flash controller IV to control the firing timing and amount of flash light emitted from the flash device I. On the other hand, when a flash device, such as III, is connected to connector CN7, only a start emission signal is applied at a controlled timing from flash controller IV to the flash device III to effect the emission of flash light with a constant amount of light or an amount controlled by a system other than the system of the present invention.

Next, the description is particularly directed to the circuit of camera body V.

Referring to FIG. 1b-1, a main switch MS1 is connected to a battery BA1. Provided operatively to a shutter release button (not shown) are light measuring switch S1 and release switch S2 such that light measuring switch S1 turns on by a first half depression of the shutter release button and release switch S2 turns on by a further depression of the button. When light measuring switch S1 closes, LOW is applied to microcomputer MC1 at each of interruption terminal iT and input terminal i1, and when release switch S2 closes, LOW is applied to microcomputer MC1 at input terminal i2. A reset switch S4 is provided which opens when an exposure control operation completes, and closes when an exposure control mechanism (not shown) including a shutter mechanism and an aperture mechanism is charged. Like other switches, reset switch S4 produces HIGH or LOW which is applied to microcomputer MC1 to input terminal i3.

A data generator DO is provided for generating set data, such as exposure control mode, film sensitivity, shutter speed, F-stop number, and the like. The generated data is applied to input IP1 of microcomputer MC1. Instead of manual setting, the film sensitivity data can be set automatically by reading the film sensitivity information provided on the film cartridge (not shown).

A light measuring circuit LM has two outputs: one is connected to input ANI of microcomputer MC1 for providing measured light intensity in an analog form to microcomputer MC1; and other is connected to input VRI for providing the microcomputer MC1 with a reference voltage by means of a reference voltage generator (not shown) in light measuring circuit LM for the purpose of giving a reference voltage required by an analog-to-digital (A-D) conversion to be effected in microcomputer MC1.

An auto-focus control circuit AF is provided which detects the focusing condition of picture taking lens and shifts it, when it is out-of-focus, to an infocus position. More specifically, auto-focus control circuit AF operates in response to the command signal from microcomputer MC1 through data bus DB, and detects amount and direction of defocus of an image formed by the picture taking lens on a predetermined image forming plane. Then, by the data representing the amount of defocus and the data representing the type of interchangeable lens from lens circuit LEC, an amount of shift of picture taking lens (actually, an amount of shift of focusing lens of all the lenses provided in the picture taking lens) is calculated. Then, the lens is shifted in accordance with the calculated amount, and the focusing condition is displayed.

A release circuit RL is provided for starting the operation of the exposure control mechanism (not shown). It operates in response to HIGH produced from output O2 of microcomputer MC1.

A display circuit DP is provided for displaying various control factors, such as exposure control value (e.g., shutter speed and F stop number to be effected), exposure control mode, film sensitivity, condition of flash device, etc. The display is effected in accordance with the data from output OP2 of microcomputer MC1.

An exposure control circuit ECC controls shutter and aperture mechanisms in accordance with shutter speed data and F-stop down data from output OP2 of microcomputer MC2.

A transistor BT1 is provided for controlling a power supply. When microcomputer produces HIGH from its output O1 and LOW from inverter IN1, transistor BT1 conducts, thereby providing voltage +V to circuits other than microcomputer MC1 and also to lens circuit LEC.

A sync switch, or X contact, Sx is provided which closes to produce LOW when a leading curtain (not shown) of shutter mechanism completes its scan, indicating that the shutter is opened. The LOW from sync switch Sx is applied through line L1 to flash device II, flash controller IV, and further to flash device I.

A light amount control circuit FST is provided which controls the amount of flash light to be emitted from each connected flash device A detail of light amount control circuit FST will be described later in connection with FIG. 8.

An input/output control IOC is provided for controlling signal transmission between camera body V and each of interchangeable lens VI, flash device II and flash controller IV. A detail of input/output control IOC will be described later in connection with FIG. 7.

Microcomputer MC1 has a number of input and output terminals which are described below.

An output CKO is provided for producing a train clock pulses $\phi 1$ which is applied to each of auto-focus control circuit AF, data generator DO, exposure control circuit ECC, display circuit DP and release circuit RL.

An output ANO produces a D-A converted film sensitivity signal for the control of amount of light to be emitted from each flash device.

Terminals SCK, SOU and SIN are for serial sending of data. For example, when a data is to be sent from microcomputer MC1 to input/output control IOC, serial-output terminal SOU produces binary form data bit-by-bit serially in a synchronized relationship with a positive edge of each of eight clock pulses from output SCK. Contrary, when a data is to be sent from input/output control IOC to microcomputer MC1, serial-input terminal SIN receives binary form data bit-by-bit serially in a synchronized relationship with a negative edge of each of eight clock pulses from output SCK.

An output O3 produces HIGH when a data is to be sent between camera body V and mounted lens VI. An output O4 produces HIGH when a data is to be sent to a connected flash device and/or flash controller IV. An output O5 is provided for producing a signal representing the operating condition of connected flash device and/or flash controller IV. More particularly, when a data is to be sent to camera body V from the connected flash device and/or flash controller IV, output O5 produces HIGH for a first predetermined period of time (such as 90 microseconds). When a data is to be sent from camera body V to the connected flash device and/or flash controller IV, output O5 produces HIGH for a second predetermined period of time (such as 150 microseconds). And, when an exposure control operation is to be effected by camera body V, output O5 produces HIGH for a third predetermined period of time (such as 210 microseconds). An output O6 produces HIGH when a data is to be sent from camera body to flash device and/or flash controller.

The interchangeable lens VI mounted on the camera body V has a lens circuit LEC which receives power +V from camera body V. When microcomputer MC1 in camera body V produces HIGH from output O3, line LN1 carries HIGH, thereby activating the lens circuit LEC. Then, in response to clock pulses applied through line LN2, the fixed data stored in lens circuit LEC is serially sent bit-by-bit through line LN3 to camera body V. The fixed data can be minimum F-stop data (fully opened aperture data), maximum F-stop data, focal length data, photographing distance data, various data for the auto-focus adjustment check data (for checking whether or not an interchangeable lens appropriate for the system of the present invention is properly mounted on camera body V), and any other necessary data.

Line L1 is provided for sending LOW when sync switch Sx closes.

Line L2 is provided for a bidirectional data bus for sending serial data from camera body to each of connected flash devices and/or flash controller, or vice versa. When flash light is being emitted from the connected flash devices, a light measurement control signal is transmitted through line L2 from each flash device to camera body. This light measurement control signal is defined by a combination of LOW, HIGH and LOW such that the first LOW starts from the beginning of the light emission from a first flash device and lasts for a first predetermined period of time (which is longer than a time necessary for the full emission of flash light, such as 2.5 milliseconds). Then comes HIGH which lasts for a second predetermined period of time (such as 1 millisecond), and after that, the second LOW lasts for a third predetermined period of time necessary for the emission of two flash lights at their full light amount and effected one after another (such as 5.5 milliseconds). The light measurement control signal will be described in detail later. On the contrary, when flash light is not being emitted, or when no data transmission is effected, line L2 carries HIGH or LOW indicating that the flash devices are in charged condition or in uncharged condition, respectively.

Line L3 is provided for sending clock pulses produced from output SCK of microcomputer MC1 to each flash device and flash controller when data transmission is to be effected therebetween so as to synchronize the data sending and receiving operation. Line L3 is also used for sending a signal from output O5 representing the operating condition of the camera body, and for sending an emission stop signal from light amount control circuit produced during the emission of flash light from the flash device.

Next, the description is directed to the circuit of flash device I.

Referring to FIG. 1b-2, flash device I of a double flash-head type comprises battery BA3 and main switch MS3. Control circuit FLC1 is provided for controlling light emission, data transmission, and calculation for display, and its detail will be described later in connection with FIGS. 9a, 9b, 10, 11, 12, 13a, 13b, 13c, and 14. Display FDP1 is provided for displaying various information, such as flash mode (which can be divided into a double-action twin flash mode wherein two flash lights are emitted sequentially from two flash heads in one flash device; former or latter in a sequence flash mode wherein two flash lights are emitted sequentially from two flash devices; a simultaneous flash mode wherein two flash lights are emitted simultaneously from two flash devices; and a single flash mode wherein a flash light is emitted from one flash device), bounce mode, aperture size value based on the data transmitted from camera body, film sensitivity, focal length, and an information relating to the illumination angle covered by the flash light where the flash device is of a type which can change the width of illumination angle. Furthermore, in the case where the flash device is set to an automatic light amount control mode, display FDP1 displays an available range of distance (available range of photographing distance in which the light amount to be emitted can be controlled relatively to the photographing distance). When the flash device is set to a manual mode wherein the light amount to be emitted is manually set, a photographing distance which provides an appropriate exposure is displayed.

Flash device I further includes a supply control circuit CHC1 which receives signals from charge detectors CHD1 and CHD2 and provides a signal to transistor BT2 for controlling high voltage generator DD1. When transistor BT2 conducts, high voltage generator DD1 is so actuated as to step up the voltage from battery BA3 to a predetermined high voltage, such as 300 volts. The produced high voltage is applied through each diodes D1 and D2 to capacitors C1 and C2, respectively, thereby charging the capacitors C1 and C2. When capacitors C1 and C2 are charged above respective predetermined levels charge detectors CHD1 and CHD2 produce HIGH, respectively. Such a HIGH is referred to as a charge completion signal. When a charge completion signal is produced from both charge detectors CHD1 and CHD2, supply control circuit CHC1 produces LOW, thereby turning the transistor BT2 off to cut off the further supply of high voltage from high voltage generator DD1. When, however, a charge completion signal is not produced from at least one of charge detectors CHD1 and CHD2, supply control circuit CHC1 continues to produce HIGH, thereby turning the transistor BT2 on to continue the supply of high voltage from high voltage generator DD1.

Flash device I still further includes two light emitters FLO1 and FLO2 for emitting two flash lights. Light emitter FLO2 is connected to control circuit FLC1 through lines SP2 and ST2 and is provided in a pivotal fashion so as to change the light emitting direction between straight for the direct lighting and tilted (usually upwards) for the bounce lighting. Light emitter FLO1 is connected to control circuit FLC1 through lines SP1 and ST1 and is provided in a fixed flash-head for shooting only the straight flash light.

When only flash device I is connected to camera body V directly at the hot shoe or through flash controller IV, and when light emitter FLO2 is facing straight (hereinafter referred to as a straight flashing fashion), the flash light emits only from light emitter FLO2 and not from light emitter FLO1. On the contrary, when only flash device I is connected to camera body and when light emitter FLO2 is facing other than straight (hereinafter referred to as a bounce flashing fashion), the flash light emits first from light emitter FLO2 for an amount which is equal to about ⅔ of the necessary amount for the proper exposure, and then, flash light emits from light emitter FLO1 for the remaining ⅓ of the necessary amount. This flash mode is called double-action flash mode.

When flash device I is connected to camera body V not solely but together with other flash device II and/or III, as shown in FIGS. 1b-1 and 1b-2 taken together, flash device I operates in a different manner such that flash light emits only from light emitter FLO2 no matter whether light emitter FLO2 is in the straight flashing fashion or in the bounce flashing fashion.

It is to be noted that light emitters FLO1 and FLO2 start emission of light in response to HIGH (start emission signal) applied thereto through lines ST1 and ST2, respectively. Also, since the capacity of capacitor C1 is much smaller than that of capacitor C2, the maximum available light that can be emitted from light emitter FLO1 is much smaller than that from light emitter FLO2. For example, the guide number of light emitter FLO2 itself is 40, whereas that of light emitter FLO1 itself is 8. Furthermore, light emitter FLO2 is pivotally supported to permit the change of light emitting direction, whereas light emitter FLO1 is fixedly supported to emit only the straight flash light. Both light emitters FLO1 and FLO2 can change the amount of light to be emitted such that light emitters FLO1 and FLO2 stop emission of light in response to HIGH (stop emission signal) from lines SP1 and SP2, respectively.

Next, the description is directed to flash device II. The flash device II includes battery BA5 which is connected to main switch MS5. A control circuit FLC3, having the same function as the control circuit FLC1 in flash device I, is provided for sending display data to display FDP3 and sending start emission signal through line ST4 and stop emission signal through line SP4 to light emitter FLO4. The detail of the control circuit FLC3 will be described later in connection with FIGS. 15a, 15b, 16 and 17.

Flash device II further includes a supply control circuit CHC3 which receives a signal from charge detector CHD4 and provides a signal to transistor BT4 for controlling high voltage generator DD3 in a manner similar to high voltage generator DD1 described above. It is to be noted that light emitter FLO4 is supported pivotally to permit the change of light emitting direction, thereby permitting both the straight flashing fashion and bounce flashing fashion. Flash device III has the same structure as flash device II.

Next, the description is directed to flash controller IV shown in FIG. 1b-1. Flash controller IV includes battery BA2 which is connected to main switch MS2. Flash control circuit CNC is provided which receives data from flash devices I and/or II in a synchronized relationship with clock pulses from camera body V to detect the conditions of the flash devices, such as mounted condition and various operating conditions, thereby determining a flash mode. When two flash devices, such as I and II, are connected to connectors CN5 and CN9, respectively, flash control circuit CNC simultaneously receives signals from flash devices I and II, and also simultaneously sends signals to them.

It is to be noted that the term "the flash device" herein used means not only one flash device connected to either one of the connectors CN5 and CN9, but also represents two flash devices connected to both connectors CN5 and CN9, unless it is stated otherwise.

A signal representing the determined flash mode is sent to the flash device in a synchronized relationship with clock pulses from camera body V. Then, by the clock pulses from camera body V, signals representing the flash mode and condition of flash device are sent to camera body V. Based on the result of determination of flash mode, it is further determined whether or not to emit light from flash device III. When it is determined to emit light from flash device III (i.e., the determined flash mode is sequence flash mode), a start emission signal is applied through line L21 to flash device III after two flash devices I and II complete the emission of flash light. The detail of flash control circuit CNC is described later in connection with FIG. 18.

Next, the various flash modes are described.

The single flash mode is established when only flash device I is connected to camera body V directly on the shoe connector CN9 or through flash controller IV at connector CN5, and when light emitter FLO2 is facing straight, as in the straight flashing fashion. In this case, a single shot of flash light is emitted from light emitter FLO2, and no light is emitted from light emitter FLO1. The available range of photographing distance under the single flash mode is determined in accordance with the maximum light amount that can be emitted from light emitter FLO2 solely, and the determined available range is displayed.

The double-action twin flash mode is established when only flash device I is connected to camera body V directly on the shoe connector CN9 or through flash controller IV at connector CN5, and when light emitter FLO2 is set in the bounce flashing fashion facing other than straight. In the double-action twin flash mode, light emitter FLO2 emits ⅔ of the total necessary light for the proper exposure and, immediately thereafter, light emitter FLO1 emits remaining ⅓ of the necessary light for the proper exposure. The available range of photographing distance under the double-action twin flash mode is determined and displayed in accordance with the maximum light amount that can be emitted from light emitter FLO1.

Another single flash mode is established when only flash device II is connected to camera body V directly on shoe connector CN9 or through flash controller IV at connector CN5 with light emitter FLO4 set either in the straight or bounce flashing fashion. When light emitter FLO4 is set in the straight flashing fashion under this single flash mode, the available range of photographing distance is determined and displayed in accordance with the maximum light amount that can be emitted from light emitter FLO4. But, when light emitter FLO4 is set in the bounce flashing fashion, no available range is determined nor displayed.

The simultaneous flash mode is established when two flash devices are connected to shoe connector CN9 and connector CN5, respectively, with at least one of the two flash devices being of a dedicated type such as flash device I or II, and when flash controller IV is selecting the simultaneous mode (This selection can be done manually through a suitable two-position switch (not shown) provided in the flash controller IV movable between "simultaneous" and "sequence".). Here, it is assumed that flash device I is connected to connector CN5 of flash controller IV and flash device II is connected to shoe connector CN9 of camera body V. Under the simultaneous flash mode, flash device I operates such that only light emitter FLO2 emits light and no light is emitted from light emitter FLO1, no matter whether the light emitter FLO2 is set in the straight or bounce flashing fashion. Thus, under the simultaneous flash mode, two flash devices I and II start the emission of flash light simultaneously and stop flashing when the sum of emitted lights from both devices I and II reaches a desired amount for the proper exposure. The available range of photographing distance under the simultaneous flash mode is determined and displayed in accordance with the maximum light amount that can be emitted from each flash device, only when light emitter FLO2 is set in the straight flashing fashion. When light emitter FLO2 is set in the bounce flashing fashion, no determination nor display is effected for the available range of photographing distance.

The sequence flash mode with two flash devices is established when two flash devices are connected to shoe connector CN9 and connector CN5, respectively, with each one of the two flash devices being of a dedicated type such as flash device I or II, and when flash controller IV is selecting the sequence mode, e.g., by the two-position switch provided in the flash controller IV. Here, it is assumed that flash device I is connected to connector CN5 of flash controller IV and flash device II is connected to shoe connector CN9 of camera body V. Under the sequence flash mode, flash device I operates such that only light emitter FLO2 emits light and no light is emitted from light emitter FLO1, no matter whether the light emitter FLO2 is set in the straight or bounce flashing fashion. Thus, under the sequence flash mode, first, flash device I emits ⅔ of the total necessary light for the proper exposure and, immediately thereafter, flash device II emits remaining ⅓ of the necessary light for the proper exposure. The available range of photographing distance under the sequence flash mode is determined and displayed in accordance with the maximum light amount that can be emitted from flash device II.

The sequence flash mode with three flash devices is established when the third flash device, such as III as indicated in the drawings, is connected to connector CN7, and when flash controller IV is selecting the sequence mode, e.g., by the two-position switch provided in the flash controller IV. Under the sequence flash mode with three flash devices, the operation is similar to that with two flash devices, but is different such that, after the two flash devices I and II emit lights in that order, the third flash device III emits light in response to a start emission signal transmitted through line L21 to the third flash device III. Since the third flash device III is connected to flash controller IV with only two lines, e.g., line L21 for the start emission signal and line L4 connected to ground, no stop emission signal produced by light amount control circuit FST in camera body V is applied to flash device III. Thus, the flash photographing system of the present invention controls not an amount of flash light from the third flash device but the timing when to start the light emission. Thus, the third flash device emits light with the full amount when it is a non-controllable type, or it may emit light less than the full amount when it is a self-controllable type manually or automatically. From this view point, the third flash device connected to connector CN7 can not only be a dedicated type such as flash device I or II, but also be any other known type. From the practical usage, the third flash device connected to connector CN7 is for lighting the background of a main subject to be photographed. For example, when a person standing in front of a wall is to be taken, the third flash device is placed away from the camera using an extension so as to light only the back wall, thereby eliminating undesirable shades produced by the other flash lights from flash devices I and II. In other words, since the main subject, in this case the person standing in front of the wall, is properly lighted by an aid of flash lights from flash devices I and II, it is not preferable to further light the main subject with the third flash light. Thus, the third flash device is particularly used for lighting the surrounding or background of the main subject for the effect of natural lighting.

Next, the operations of camera body V and the flash photographing system of FIG. 1a are described in connection with FIGS. 2a, 2b, 2c, 3, 4a, 4b, 5a, 5b, 6, 7 and 8.

Figure 2B:
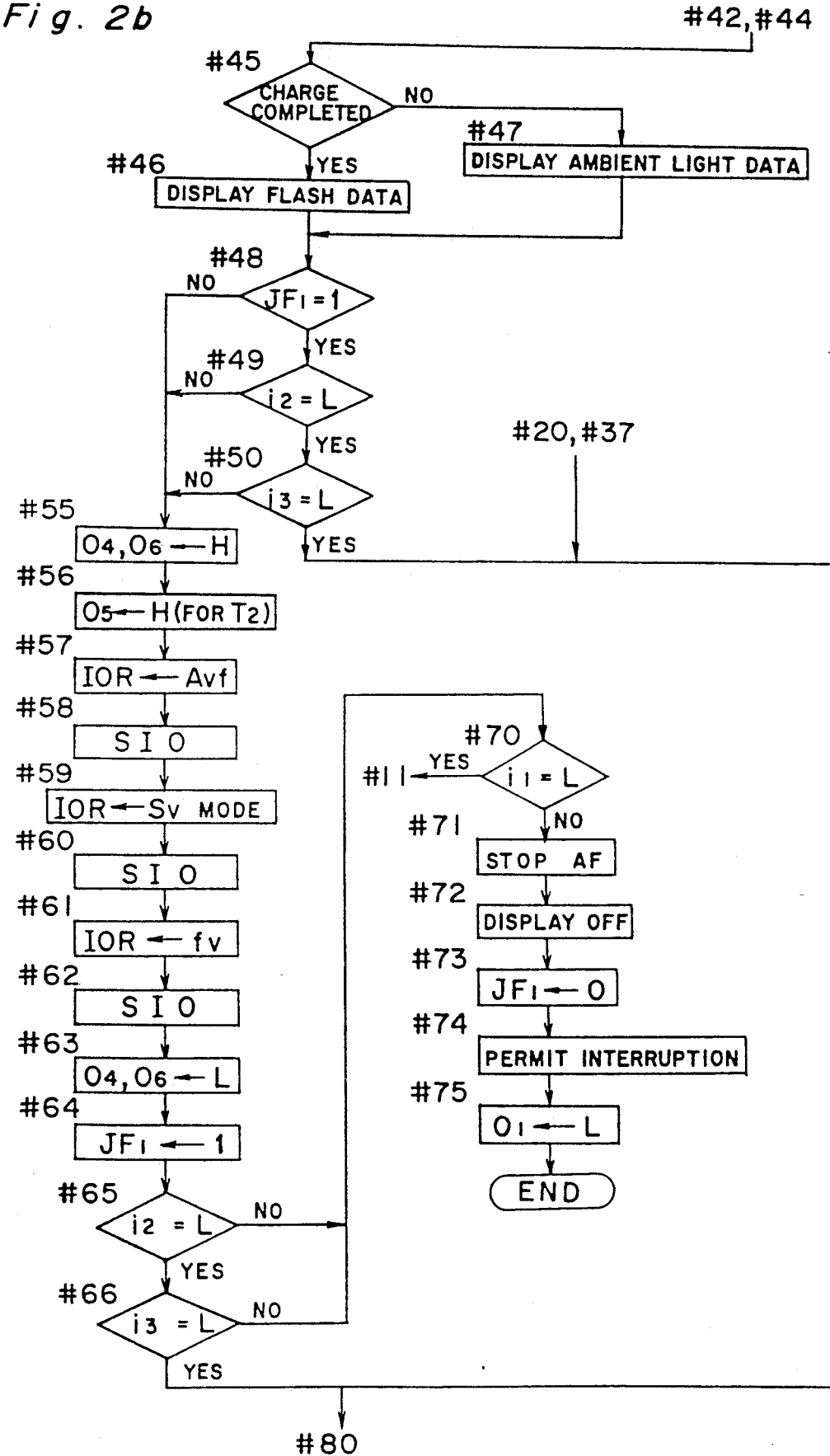
Figure 2C:
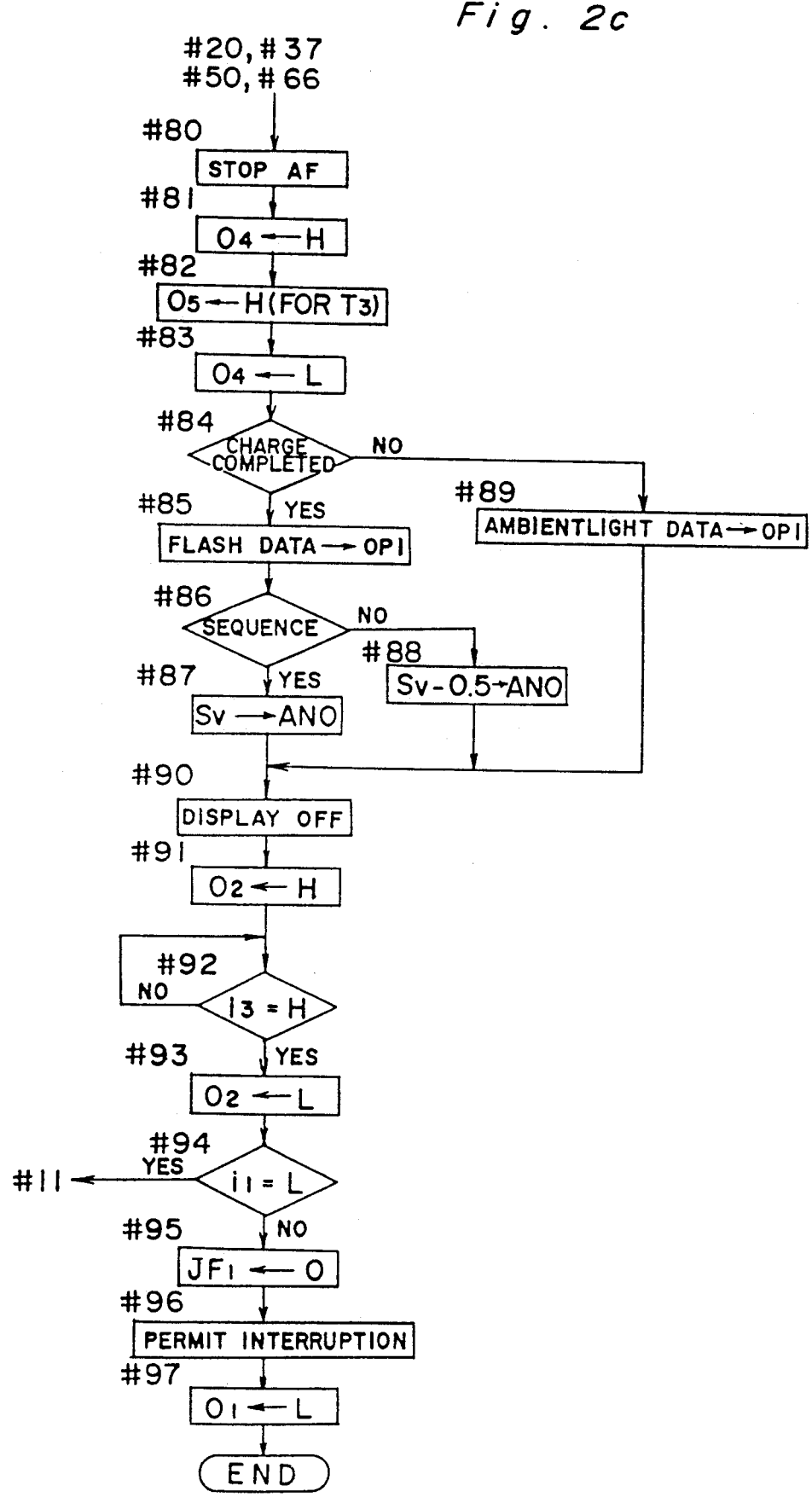

Referring particularly to FIGS. 2a, 2b and 2c taken together as shown in FIG. 2, a flow chart of operation carried out by microcomputer MC1 shown in FIG. 1b-1. When main switch MS1 of camera body V turns on, power is applied to microcomputer MC1, thereby starting an operation when power is supplied. At step #1, outputs O1-O6 produce LOW, and at step #2, data for cancelling any display given through display circuit DP is produced. Then, at step #3, any transmission of data through data bus DB to autofocus control circuit AF is cut off thereby disabling the autofocus control circuit AF from being operated. At step #4, microcomputer MC1 is set in a condition ready to receive an interruption signal to its interruption terminal iT, and it stops its operation.

When light measuring switch S1 closes, LOW is applied to interruption terminal iT, thereby again starting the operation of microcomputer MC1. At step #10, output O1 produces HIGH, thereby producing LOW from inverter IN1. Thus, transistor BT1 conducts to supply electric power to circuits other than microcomputer MC1 and also to lens circuit LEC. At step #11, output O3 produces HIGH, thereby starting the data reading from lens circuit LEC in a manner described below. First, register (BR) (A reference character(s) given in parentheses represents an element, such as a register or a flag established within the microcomputer through programming.) in microcomputer MC1 is set to "0", and at step #13, operations based on the serial-in/out instruction is carried out. Accordingly, the data from lens circuit LEC are read in serial in/out register (IOR) in microcomputer MC1. The contents of serial in/out register (IOR) are loaded into a certain register for the first time, thereafter adding "1" to the content of the register (BR). At the step #16, whether or not the contents of register (BR) reach "N" is judged, and if not, the procedure will return to step #13 to repeat the above mentioned functions. After repeating steps #13 to #16 for a predetermined number of times N, the contents of register (BR) reaching "N" is judged at step #16 and the procedure goes to step #17.

Figure 7:
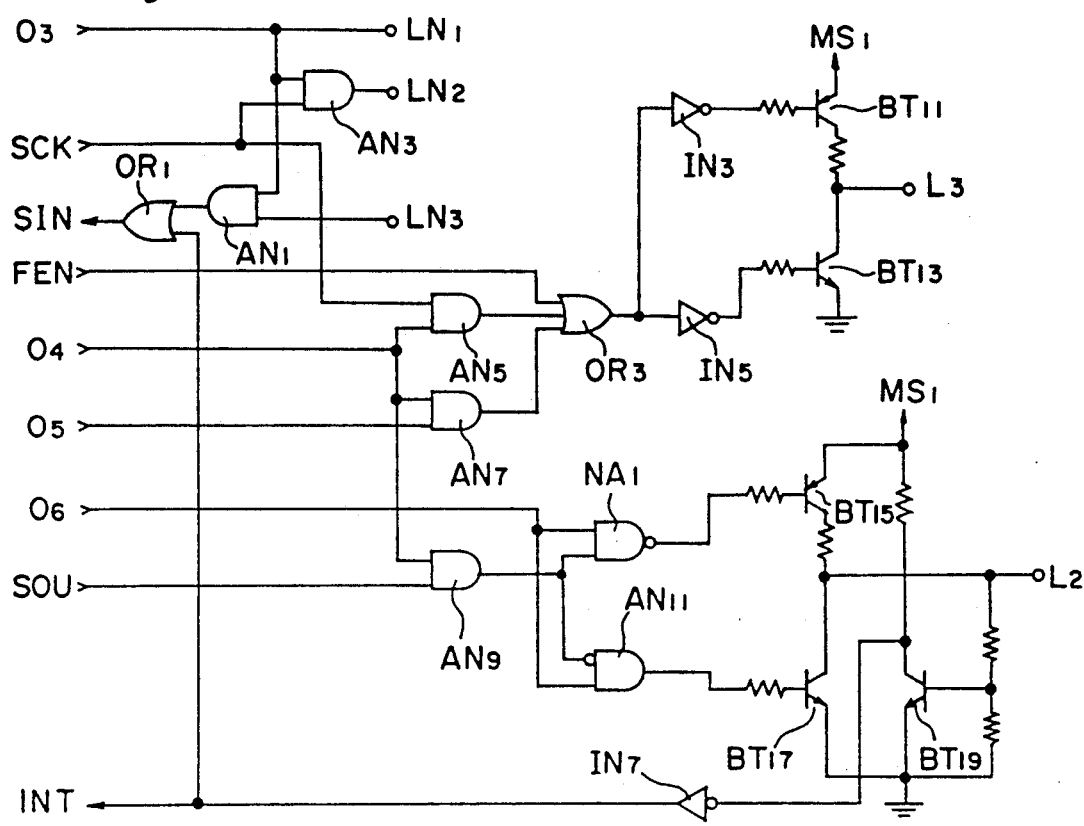
FIG. 7 is a circuit diagram showing the detail of input output control IOC shown in FIG. 1b-1.

Next, the description is directed to data reading from the lens circuit LEC with reference to FIGS. 1b-1, 1b-2 and 7. FIG. 7 particularly shows the detail of input/output control circuit IOC shown in FIG. 1b-1. When output O3 of microcomputer MC1 produces HIGH, AND gates AN1 and AN3 are enabled. The HIGH from output O3 of microcomputer MC1 is also applied through line LN1 to lens circuit LEC, thereby activating the lens circuit LEC. Then, eight clock pulses are serially produced from output SCK of microcomputer MC1, which are applied through AND gate AN3 and line LN2 to lens circuit LEC. In a synchronized relationship with the positive edges of eight clock pulses, lens circuit LEC serially sends the first data through line LN3. The first data is applied through AND gate AN1 and OR gate OR1 to input SIN of microcomputer MC1. In the microcomputer MC1, the first data are read serially in register (IOR) in a synchronized relationship with the negative edges of the same eight clock pulses.

Lens circuit LEC includes ROM (read-only memory) for storing a plurality of fixed data in a predetermined alignment, address designating means for sequentially designating address of ROM, and data producing means for serially producing the read data. Each time the train of eight clock pulses is applied through line LN2, address data are renewed, thereby producing different types of data serially in a predetermined number. Then, microcomputer MC1 stores the data in the sent order at certain registers. Thus, one register carries one data. For example, one register in microcomputer MC1 carries minimum F-stop data (fully opened aperture data) and another carries maximum F-stop data, and so on. In this manner, a certain register in microcomputer MC1 always carries the same kind of data sent from the mounted interchangeable lens. When the data to be sent is a photographing distance data (this data is in relation to the amount of movement of focusing lens), a coded plate (not shown) for producing data corresponding to the photographing distance is provided operatively in association with the distance ring of the lens. By the use of data produced from the coded plate in combination with the number of clock pulses counted, address can be designated. A similar arrangement can be applied in the case where the mounted lens is a zoom lens.

Returning back to FIG. 2a, at step #17, output O3 produces LOW, thereby stopping the data reading from lens circuit LEC. Then, at step #18, it is determined whether flag (JF1) is carrying "1" or not. Flag (JF1) carries "1" when the calculations for the exposure control are completed, but carries "0" if not. When it is determined that flag (JF1) is carrying "0" indicating that the exposure control calculations are not completed, the program advances to step #25. On the contrary, when it is determined that flag (JF1) is carrying "1", it is further determined at step #19 whether or not input i2 is receiving LOW as a result of closure of release switch S2. When input i2 is not receiving LOW, the program goes to step #25. But, if input i2 is receiving LOW indicating that release switch S2 is turned on, the program advances to step #20. At step #20, it is still further determined whether or not input i3 is receiving LOW as a result of closure of reset switch S4. If reset switch S4 is still off, because that the exposure control mechanism has not completed its charge, input i3 receives HIGH. In this case, the program goes to step #25. On the contrary, when the exposure control mechanism is charged to turn switch S4 on, input i3 receives LOW. In this case the program follows the procedure from step #80 (FIG. 2c) to carry out the exposure control operation.

At step #25, it is determined whether or not the check data is included within all the data read in from the lens. The check data, such as "10101010" which is common to every type of interchangeable lens, is stored in ROM at a certain address in every type of interchangeable lens. When it is determined that no check data is transmitted, microcomputer MC1 determines that no lens is mounted or that the lens is not properly mounted. On the contrary, when it is determined that the check data is transmitted, microcomputer MC1 determines that the lens is properly mounted. When the check data is present indicating that the lens is properly mounted, the program goes to step #26 at which the read in data related to autofocusing adjustment are transmitted through data bus DB to autofocus control circuit AF. Thus, autofocus operation is carried out by circuit AF and, thereafter, the program goes to step #27. On the contrary, when there is no check data indicating that no lens is properly mounted, no autofocus operation is carried out. Thus, in this case, the program jumps from step #25 to #27.

At step #27, output O4 produces HIGH, thereby enabling data exchange with the flash device and/or with flash controller IV. Then, at step #28, output O5 produces HIGH for a predetermined period T1, such as 90 microseconds This HIGH is applied through lines L3 and L13 to the flash device and/or flash controller. After this period T1, the flash device and/or flash controller determines that it is a mode to transmit data from flash device and/or flash controller to camera body V. Such a mode is hereinafter referred to as FC mode. The data transmission is carried out in the following manner.

At step #29, based on the serial-in/out instruction, eight clock pulses are serially transmitted through lines L3 and L13 from camera body V to the flash device. In a synchronized relationship with the positive edges of eight clock pulses, the flash device serially sends six bits of data through line L2 and L12. The six bits of data are read in serially in the flash controller in a synchronized relationship with the negative edges of the first six of the same eight clock pulses. Then, the flash controller determines the flash mode based on the read in data and the data set in the flash controller by the two-position switch movable between "simultaneous" and "sequence". Then, in a synchronized relationship with the positive edges of the remaining two of the same eight clock pulses, two bits of data indicating the result of this determination are sent out through lines L2 and L12. During step #29, microcomputer MC1 reads the six bits data and two bits data on line L2 in a synchronized relationship with the negative edges of the eight clock pulses in serial in/out register (IOR). However, the microcomputer MC1 will not utilize this data.

Then, at step #30, eight clock pulses are again serially transmitted through lines L3 and L13 in accordance with the serial in/out instruction. Depending on the number of flash devices connected to depending, when one flash device is connected, where it is connected, the operation in step #30 is different.

In the case where two flash devices are connected, one through flash controller IV at connector CN5 and the other at shoe connector CN9, no data is transmitted from the flash devices through lines L2 and L12. This is done by holding both flash devices in an open condition. The open condition is established when transistors BT35 and BT37 (FIG. 9a) in control circuit FLC1 are maintained off. While the two flash devices are held in the open condition, the flash controller produces, in a synchronized relationship with the positive edges of the clock pulses, through line L2 to camera body V a data which is determined by the setting of the two-position switch in combination with the data applied previously at step #29 to the flash controller from the two flash devices. Since the two flash devices are in the open condition at step #30, no interference takes place with the data sent from the flash controller on lines L2.

In the case where one flash device is connected through flash controller IV at connector CN5, the flash controller produces at step #30 the data obtained from the flash device through lines L2. At this moment, flash device produces data through line L12 in a manner similar to that carried out in step #29, but this time at step #30, the data is cut off by the flash controller.

In the case where one flash device is connected to show connector CN9, the operation in step #29 is repeated again in step #30. More specifically, at step #29, the data is produced from the flash device through line L2 in a synchronized relationship with clock pulses, and at step #30, the same data is produced again from the flash device through line L2 in a synchronized relationship with clock pulses.

It is to be noted that in the case where the flash controller is connected to the camera body but no flash device is connected to connector CN5, line L2 is maintained in the open condition not to prevent signal transmission from taking place between camera body and flash device II directly connected thereto through connector CN9. In this case the open condition is established when transistors BT55 and BT57 (FIG. 18) in flash control circuit CNC are maintained off.

Next, the description is directed to various data transferred in a synchronized relationship with the sixteen clock pulses during steps #29 and #30. The sixteen clock pulses are designated as bits b0, b1, b2, . . . and b15. A particular data is produced correspondingly to each bit. Table 1 given below shows the data with its name correspondingly to sixteen bits b0–b15, and it also shows operation condition of the flash device, flash controller and camera.

TABLE 1

| Bit | Name of the Data | Data | Signal Transmission |
|---|---|---|---|
| b0 | Power On S. | H - power switch on | Flash Device → Flash Cont. Camera provides clock pulses. |
| b1 | Twin S. | L - bounce flash fashion | |
| b2 | Ready S. | H - charge completed | |
| b3 | FDC S. | L - cease flash S. | |
| b4 | Preserved | L | |
| b5 | ID S. | L - dedicated flash device | |
| b6 | Flash Mode S. | HH . . . Simultaneous | Flash Cont. → Flash Device Camera provides clock pulses. |
| b7 | | HL . . . Former in Seq. | |
| | | LH . . . Later in Seq. | |
| | | LL . . . Single Flash | |
| b8 | Power On S. | H - power switch on | Flash Device → Flash Cont. Camera provides clock pulses. |
| b9 | ID S. | L - dedicated flash device | |
| b10 | Seq. Flash S. | L - sequence flashing | Camera or |
| b11 | Ready S. | H - charge completed | |
| b12 | FDC S. | L - cease flash S. | Camera |
| b13 | Preserved | L | Camera provides clock pulses. |
| b14 | Preserved | L | |
| b15 | Preserved | L | |

Notes:
(a) S. represents Signal.
(b) H and L represent HIGH and LOW, respectively.
(c) - reads "in response to"

The first six data corresponding to the first six bits b0–b5 are produced from the flash device and are loaded in the flash controller. During the generation of the fist six data, the camera body only produces the clock pulses.

In response to the positive edge of the first bit b0, a first data, namely a power on signal, is transmitted from the flash device to the flash controller, and in response to the negative edge of the first bit b0, the power on signal is loaded in the flash controller. The power on signal is HIGH when the power switch of the flash device is on.

Similarly, in response to the second bit b1, a second data, namely a twin signal, is sent from the flash device to the flash controller. The twin signal is LOW when the connected flash device is the same as flash device I and when the flash device is set in the bounce flashing fashion in which light emitter FLO2 is facing other than straight. The twin signal is HIGH when the situation is other than the above.

In response to the third bit b2, a third data, namely a ready signal, is sent from the flash device to the flash controller. The ready signal is HIGH when the main capacitor in the flash device is charged to the require level, and LOW if not.

In response to the fourth bit b3, a fourth data, namely an FDC signal, is sent from the flash device to the flash controller. The FDC signal is LOW when an FDC signal generator (which corresponds to circuit INF in FIG. 9) is enabled, and HIGH when the FDC signal generator is not enabled. The FDC signal generator is enabled for a period of time after X contact Sx is changed from a closed state to an opened state with a flash terminating signal from the camera body having reached the flash device prior to a lapse of predetermined time after the initiation of flash light emission. I is understood that when no FDC signal is generated, the light is not sufficient even after the full emission of flash light. In such a case, it will result in an under exposure.

The fifth bit b4 is preserved for the future use. For example, if an auxiliary light emitter is provided for the autofocus adjustment, a signal in response to the fifth bit b4 can be transmitted indicating that the auxiliary light emitter is ready for the light emission.

In response to the sixth bit b5, a sixth data, namely an ID (identification) signal, is sent from the flash device to the flash controller. The ID signal is LOW when the connected flash device is a flash device designed for the flash photographing system of the present invention. According to the commercially available flash devices, there are some which produces HIGH on line L2 when the main capacitor is charged to the required level. When this type of flash device is mounted, the flash controller and camera body read the HIGH, thereby distinguishing the flash device of conventional type with the flash device applicable for the present system.

In response to the seventh and eighth bits b6 and b7, a seventh data, namely a flash mode signal, which is a 2-bit signal, is sent from the flash controller to the flash device through lines L2 and L12. The flash mode signal is determined by the power on signal which has been transmitted to flash controller IV from the flash device and the data set in the flash controller by the two-position switch. In other words, the flash controller produces a data representing the actual flash mode signal through lines L2 and L12. Various flash mode signals under different conditions are shown in Table 2 below.

TABLE 2

| Power on S. on line L2 | Power on S. on line L12 | two-position sw. | Flash Mode | Flash Mode S. L2 b6 | L2 b7 | L12 b6 | L12 b7 |
|---|---|---|---|---|---|---|---|
| L | L | Simultaneous | No flash | L | L | L | L |
| L | L | Sequence | No flash | L | L | L | L |
| H | L | Simultaneous | Single flash | L | L | L | L |
| H | L | Sequence | Single flash | L | L | L | L |
| L | H | Simultaneous | Single flash | L | L | L | L |
| L | H | Sequence | Single flash | L | L | L | L |
| H | H | Simultaneous | Simultaneous | H | H | H | H |
| H | H | Sequence | Sequence | L | H | H | L |

When the flash device receives a particular flash mode signal shown in Table 2, the flash device carries out the operation based on that particular flash mode signal.

As stated above, the data corresponding to bits b0–b5 are sent from the flash device to the flash controller, and the data corresponding to bits b6 and b7 are sent in the opposite direction, i.e., from flash controller to flash device.

In the case where the flash device is connected to connector CN5 and/or CN9 through an extension cable, an undesirable stray capacitance may be produced among lines L2 and L3 and ground, resulting in an undesirable impedance in the extension cable. When the ID signal produced correspondingly to bit b5 from flash device is HIGH, and in the case where no flash controller is connected, there will be no discharge circuit. Thus, the charge by the HIGH is maintained in the lines as the stray capacitance. Thus, in the following steps corresponding to bits b6 and b7, the flash device receives pseudo HIGH signals. According to one example, in the case where the desired mode is a single flash mode with one flash device connected to shoe connector CN9 through an extension cable, pseudo HIGH signals appear as a data corresponding to bits b6 and b7. Thus, the flash device erroneously reads as simultaneous flash mode or sequence flash mode, resulting in error operation. In order to avoid such an error operation, the flash device according to the system of the present invention produces LOW as the ID signal at the bit b5.

The next eight data (Table 1) corresponding to the next eight bits b8–b15 are produced from the flash device and are loaded in the camera body, when a flash device is connected to the shoe connector CN9.

But, when a flash device is connected to the connector CN5 of the flash controller IV, the data transmission can be such that the data read from the flash devices at bits b8–b15 may be applied, as they are, through the flash controller to the camera body, thereby storing the non-revised data from the flash device in the camera body. However, this will have a problem explained below. When a flash device is connected to the flash controller through an extension cable, there may be an undesirable delay of signal transmission by the cable and circuit in the flash controller. Thus, the clock pulses sent from camera body to flash device may be delayed, resulting in a time difference between the positive edges of the same clock pulse in the camera body and in the flash device. In response to the positive edge of the clock pulse in the flash device a data is produced which is applied through the cable and the flash controller to the camera body, further delaying the data. In the camera body, the data is read in in response to the negative edge of the clock pulse. But when the total delay, i.e., the sum of delay of the clock pulse sent to the flash device and the delay of the data sent back to the flash controller, is longer than a period between the positive and negative edges of the clock pulse, the camera body reads an error signal. Thus, according to the system of the present invention the data from the flash device is temporarily stored in the flash controller and, then, the data is sent from the flash controller to the camera body.

In the case where flash controller IV is connected to camera body V, but no flash device is connected to the flash controller at connector CN5, flash controller IV produces no signal on line L2 during bits b8–b15, but instead it is held in an open condition, i.e., high impedance condition. Thus, any signal transmitted from the flash device on shoe connector CN9 to camera body V will not be interferenced.

When the flash devices are connected to shoe connector CN9 and connector CN5 of flash controller IV, flash controller IV produces, during bits b6 and b7, a data "11", "10" or "01" indicating the multi-flash. The produced data is applied to each flash device, which is then held in the high impedance condition producing no data through lines L2 and L12. Then, the flash controller determines a data based on the data read from both flash devices and the setting of two-position switch. The determined data is transmitted, during bits b8–b15, from flash controller IV to camera body V.

Next, each data in bits b8–b15 is described.

In response to the bit b8, a data, namely a power on signal, is sent from the flash device or flash controller to the camera body. When it is sent from the flash device, the power on signal is HIGH when the power switch of the flash device is closed. When it is sent from the flash controller, the power on signal is HIGH when at least one flash device has provided HIGH to flash controller in the previous step at the bit b0.

In response to bit b9, a data, namely an ID signal, is sent from the flash device or flash controller to the camera body. When the ID signal is sent from the flash device, LOW is applied indicating that the connected flash device is a flash device designed for the flash photographing system of the present invention. When the ID signal is sent from the flash controller, LOW is applied in the case where the flash controller has received at least one LOW in the previous step at b5 from the connected flash devices.

In response to bit b10, a data, namely a sequence flash signal, is sent from the flash device or flash controller to the camera body. If the sequence flash signal is sent from the flash device, it is LOW when the mounted flash device is a double flash-head type set in the double-action twin flash mode, and HIGH when it is other than that. If the sequence flash signal is sent from the flash controller, it produces LOW when mode is sequence, and HIGH when the mode is other than that.

In response to bit b11, a data, namely a ready signal, is sent from the flash device or flash controller to the camera body. If the ready signal is sent from the flash device, it is HIGH when the main capacitor in the flash device is charged to a required level. If the ready signal is sent from the flash controller, it is HIGH when the signals received in the previous step at b2 are all HIGH, indicating that the connected flash devices ar both ready for the light emission. When at least one of the two flash devices in the previous step b2 has provided LOW to the flash controller, the flash controller sends LOW at this step b11.

In response to bit b12, a data, namely an FDC signal, is sent from the flash device or flash controller to the camera body. If the FDC signal is sent from the flash device, it is LOW when the FDC signal generator of the flash device is enabled. On the contrary, if the FDC signal is sent from the flash controller, it is LOW when at least one of the two flash devices in the previous step b3 has provided LOW to the flash controller.

The bits b13, b14 and b15 are preserved for the future use. For the time being, LOWs are sent from flash device or flash controller to the camera body during bits b13-b15.

When the data transmission described above completes, the flash device and the flash controller are set in a waiting mode for waiting to receive pulses from lines L3 and L13. During the waiting mode, line L2 produces HIGH when the flash device is charged to the required level, and LOW if not.

Referring back to FIG. 2a, at step #31, the data sent from the flash device or flash controller are read in certain register (IOR) in the microcomputer MC1. Thereafter, at step #32, output O4 produces LOW. Then, at step #33, various data applied to input IP1, such as exposure control mode, set exposure time Tvs in APEX index, set aperture size Avs in APEX index, set or detected (Detection is done by reading marks formed on film cartridge.) film sensitivity Sv in APEX index, etc., are stored at number of registers prepared for each data. At step #34, output signal Bv-Avo (Bv is the brightness of an object to be photographed in APEX index, and Avo is a fully opened aperture value in APEX index) from light measuring circuit LM is A-D converted, and the converted digital signal is stored in a certain register. Then, at steps #35-#37, it is determined, in a similar manner to steps #18-#20, whether or not to carry out the exposure control operation. When it is determined to carry out the exposure control operation, the program advances to step #80, but if not, the program goes to step #38.

Figure 3:
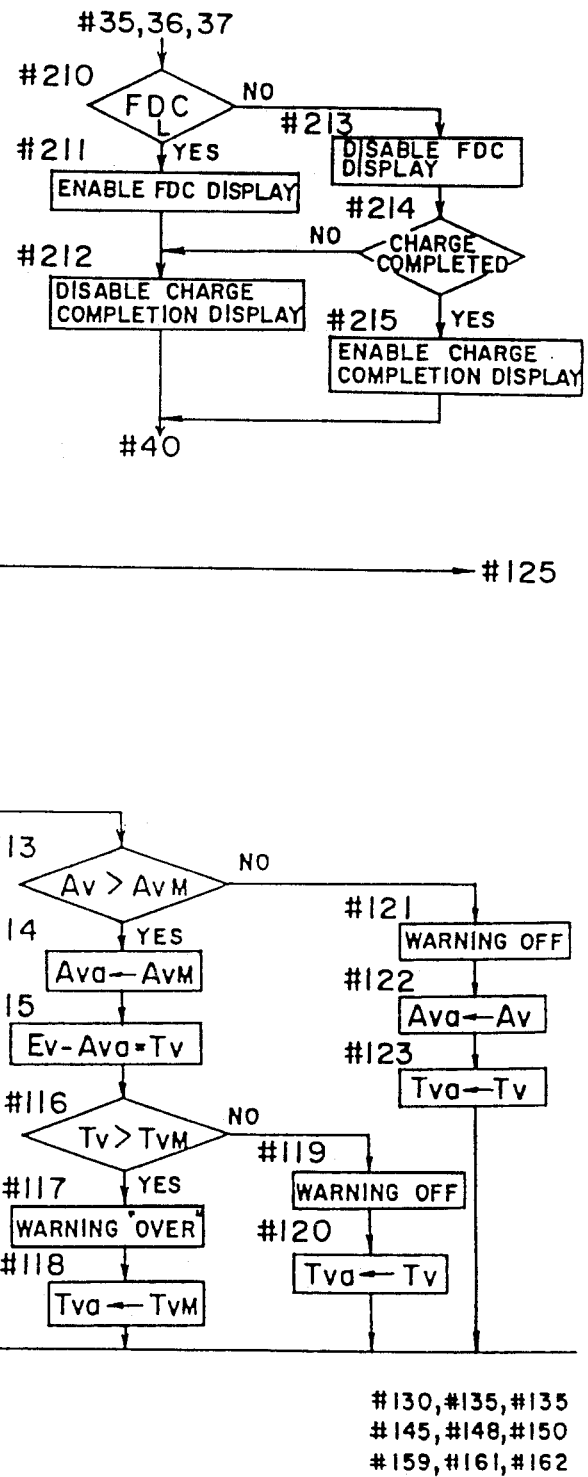
FIG. 3 is a flow chart showing a detailed steps for step #38 of flash condition display shown in FIG. 2b.

The detail of step #38 is shown in FIG. 3. At step #210, it is detected whether or not the FDC signal is LOW or HIGH. At step #210, when it is detected that FDC signal is LOW, FDC display is effected at step #211, indicating that the sufficient flash light has been emitted. Thereafter, at step #212, charge completion display is disabled. On the contrary, at step #210, when it is detected that FDC signal is HIGH, FDC display is disabled at step #213, and at step #214, it is detected whether a charge completion signal is present or not. When the charge completion signal is present, the program goes to for display of charge completion. When the charge completion signal is not present, the program goes to step #212 disabling the charge completion signal. Thereafter, the program goes to step #40.

Referring back to FIG. 2a, at step #40, it is determined whether or not a check data "10101010" is present. When a check data is present, calculations at steps #41 and #42 are carried out, and if not, calculations at steps #43 and #44 are carried out. The calculations at steps #41, #42, #43 and #44 are described in detail below with reference to FIGS. 4a to 6.

Figure 4:
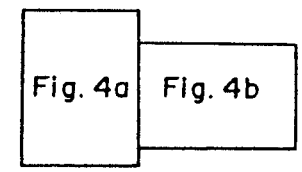
Figure 4A:
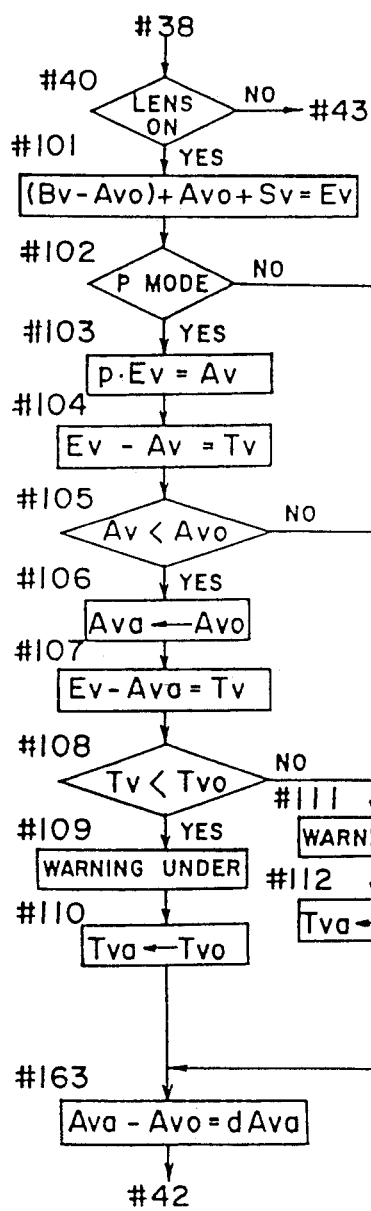
Figure 4B:
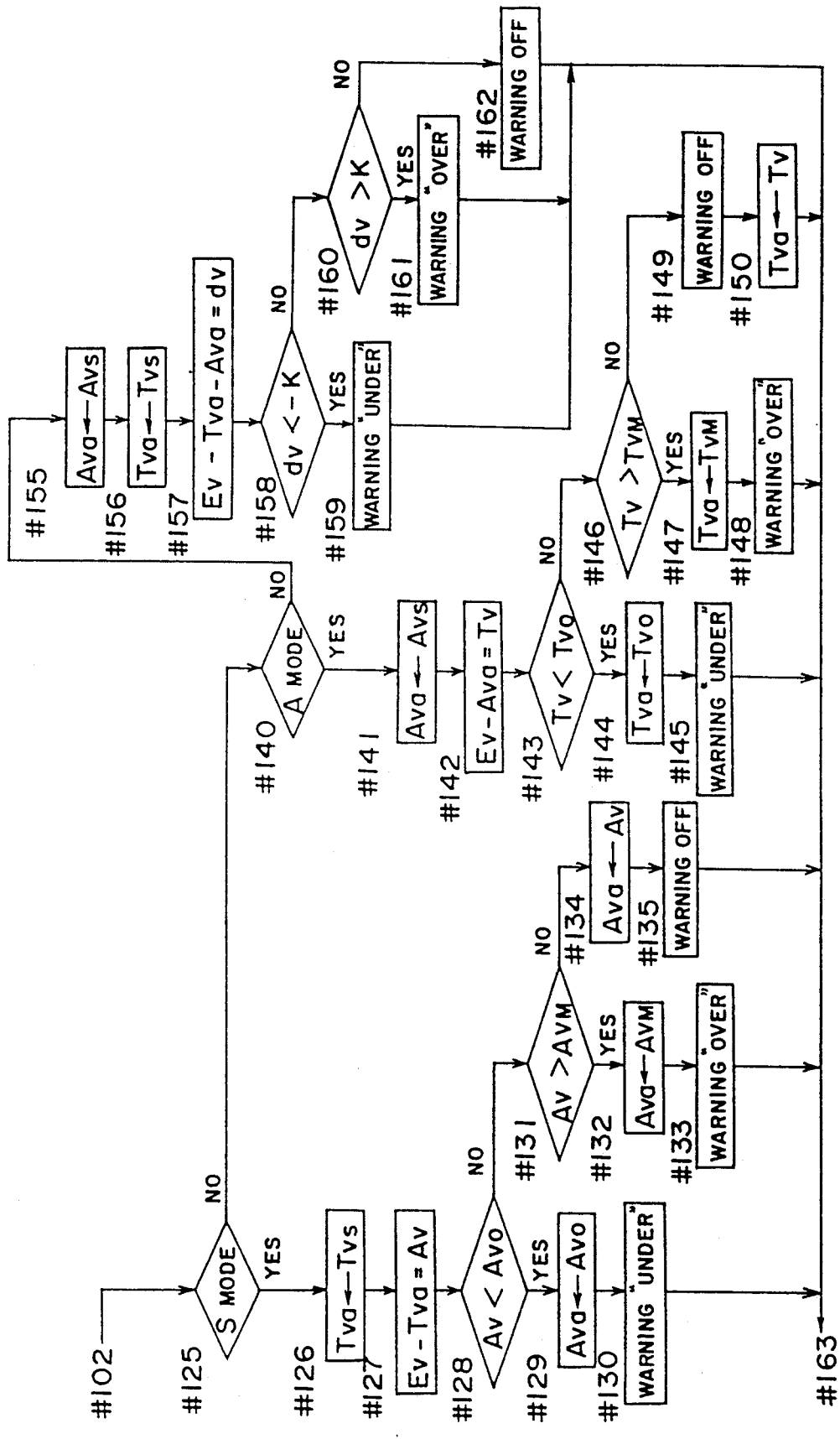

Referring particularly to FIGS. 4a and 4b, a flow chart is shown for carrying out an ambient light calculation I for step #41.

At step #101, an exposure value EV expressed in APEX index is calculated through an equation (1) below:

$$(Bv - Avo) + Avo + Sv = Ev. \qquad (1)$$

Then, at step #102, the exposure control mode is detected, whether it is a P mode (program exposure mode) or not. When it is P mode, the procedure goes to step #103 and to #104. In these steps, following calculations are effected.

$$p \cdot Ev = Av \; (0 < p < 1) \qquad (2)$$

$$Ev - Av = Tv \qquad (3)$$

wherein Av and Tv are given in APEX index representing aperture value and exposure time, respectively, to be controlled, and p is a program constant to determine a ratio of distribution of exposure value Ev between aperture value and exposure time value. The program constant p determines the program chart, and can be set at the design stage or can be made variable for the manual setting by the user. Then, at step #105, when it is determined that Av < Avo, Avo is assigned to Ava at step #106, and at step #107, $$Ev - Ava = Tv \qquad (5)$$

is calculated. Then, when Tvo ≦ Tv, Tv in equation (5) is assigned to Tva (step #112), and at the same time, providing no warning (step #111). On the contrary, when Tvo > Tv, Tvo is assigned to Tva (step #110), and at the same time, providing a warning "UNDER" for the indication of under exposure (step #109). The exposure time Tvo corresponds to the longest controllable exposure time in the camera body.

At step #105, when Av obtained through the equation (2) is such that Av ≧ Avo, the program goes to step #113 at which it is determined whether Av > AvM. When Av > AvM, the program goes to step #114 at which AvM is assigned to Ava. Then, at step #115, the calculation of equation (5) is carried out. Then, at step #116, when it is detected that Tv ≦ TvM, Tv is assigned to Tva and no warning is provided. On the contrary, when it is detected that Tv > TvM at step #116, TvM is assigned to Tva and a warning "OVER" is provided for the indication of over exposure. The exposure time TvM corresponds to the shortest controllable exposure time in the camera body.

At step #113, when it is detected that Av ≦ AvM, no warning is produced. Then, the Av obtained through equation (2) is assigned to Ava representing the aperture value for photographing under the ambient light, and the Tv obtained through equation (3) is assigned to Tva representing the shutter speed value for photographing under the ambient light.

Then, at step #163, a calculation $$Ava - Avo = dAva \qquad (4)$$

is carried out, in which dAva represents a number of steps stopped down under the ambient light. Then, data Ava, dAva and Tva are stored in registers.

At step #102, when it is detected that the mode is not P mode, the program goes to step #125 (FIG. 4b) to detect whether or not the mode is S mode (exposure time preferred/aperture auto-controlled mode). When the mode is S mode, set exposure time data Tvs is assigned to Tva at step #126. Then a calculation $$Ev - Tva = Av \tag{6}$$

is carried out. When it is detected that $Av < Avo$ at step #128, Avo is assigned to Ava, and also a warning "UNDER" is provided for the indication of under exposure. When $Av \geq Avo$, the program goes to step #131 at which it is detected whether $Av > AvM$. When $Av > AvM$, AvM is assigned to Ava, and also a warning "OVER" is provided for the indication of over exposure. When it is detected that the condition is not $Av < Avo$ or $Av > AvM$, Av as obtained from equation (6) at step #134 is assigned to Ava, and at the same time, no warning is provided. Thereafter, the program goes to step #163.

At step #125, when it is detected that the mode is not S mode, the program goes to step #140 to further detect whether or not the mode is A mode (aperture preferred-/exposure time auto-controlled mode). When the mode is A mode, the program goes to step #141 at which the set aperture value Avs is assigned to Ava representing the aperture value for photographing under ambient light. Then, the calculation of equation (5) is carried out. Then at step #143, when $Tvo > Tv$, Tvo is assigned to Tva and at the same time, a warning "UNDER" is provided. When it is detected at step #143 that $Tvo \leq Tv$, the program goes to step #146. Then, at step #146, when $TvM < Tv$, TvM is assigned to Tva and, at the same time, a warning "OVER" is provided. When it is detected that the condition is not $Tvo < Tv$ or $TvM < Tv$, the result Tv obtained from the equation (5) is assigned to Tva representing the exposure time for photographing under ambient light and, at the same time, no warning is provided. Thereafter, the program goes to step #163.

When the mode is not P, S, or A, but is an M mode (manual setting exposure control mode), the program further goes to step #155 and to #156 at which set data Avs and Tvs are assigned to Ava and Tva, respectively. A following calculation $$Ev - (Tva - Ava) = dv$$

is carried out at step #157. When the result dv of the calculation is such that $dv < -K$ (K is a constant representing the film latitude), a warning "UNDER" is produced. When the result is such that $dv > K$, a warning "OVER" is produced. When the result is such that $-K \leq dv \leq K$, no warning is produced. Thereafter, the program goes to step #163.

At step #163, using Ava representing the aperture value for photographing under the ambient light and Avo representing the fully opened aperture value, the dAva representing the number of steps stopped down under the ambient light is calculated through a following equation $$dAva = Ava - Avo.$$

the program advances to step #42 for the flash light calculation I.

Figure 5A:
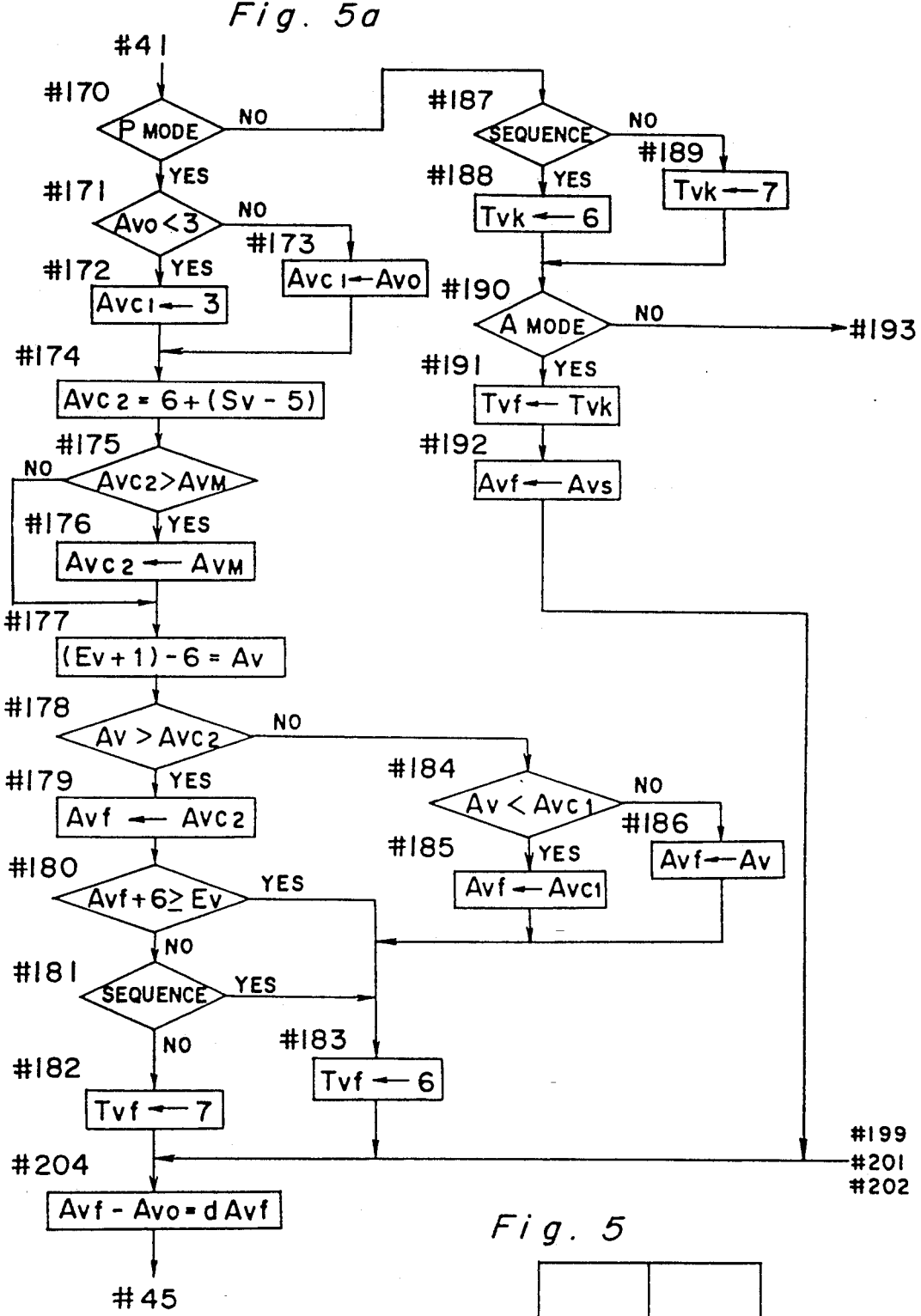
Figure 5:
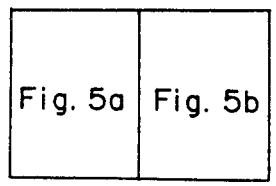
Figure 5B:
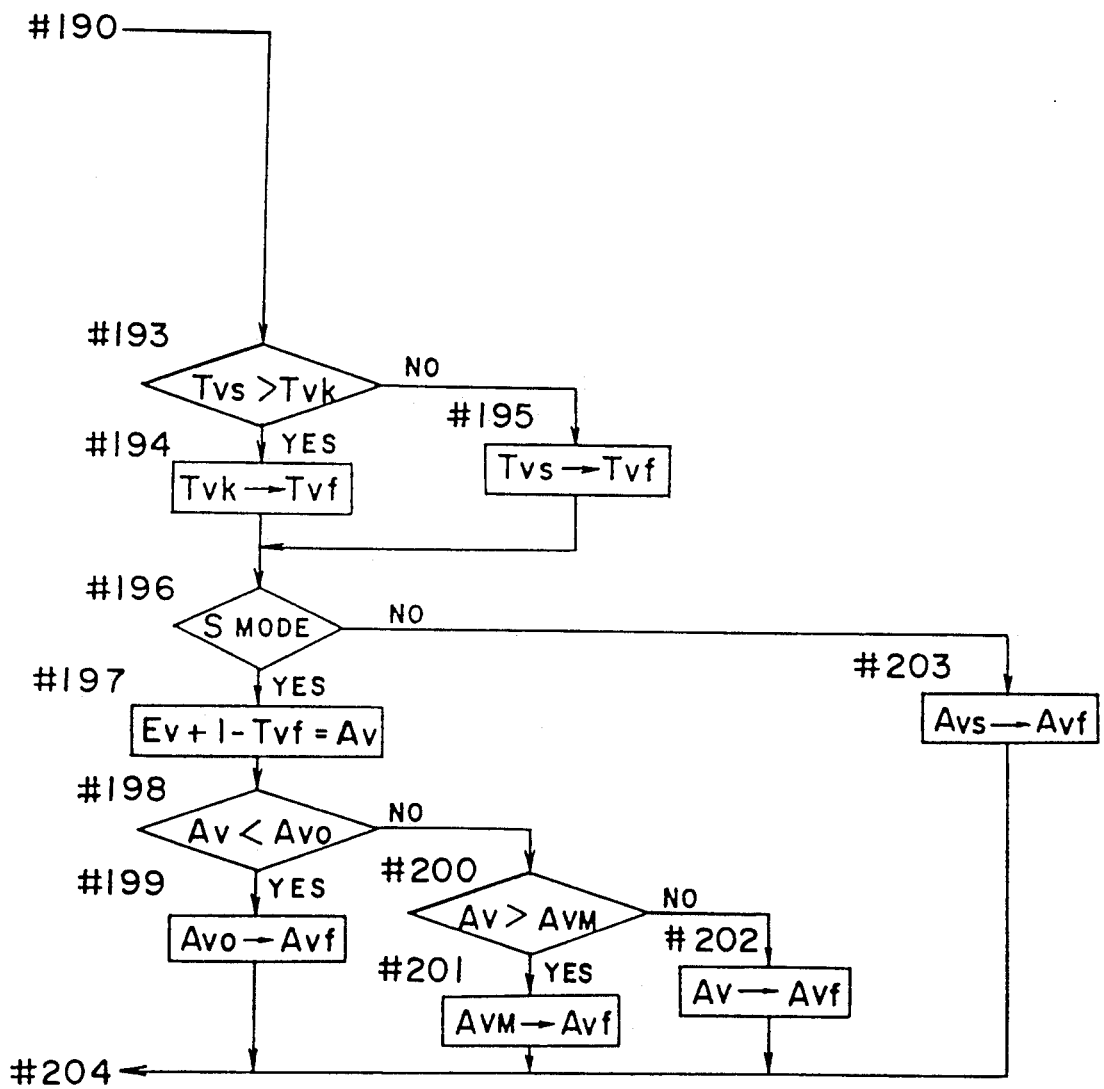

Referring to FIGS. 5a and 5b, a detail of step #42 for the flash light calculation I is shown. At step #170, when the detected mode is P mode, and at step #171, when $Avo < 3$ (Avo=3 corresponds to F-stop number=2.8) "3" is assigned to Avc1. Contrary, at step #171, when $Avo \leq 3$, Avo is assigned to Avc1. Then at step #174, $$Avc2 = 6 + (Sv - 5) \tag{7}$$

is calculated. Here, 6 corresponds to F-stop No. 8, and 5 corresponds to ISO100. Then, at step #175, when $Avc2 > AvM$, AvM is assigned to Avc2, but is $Avc2 \leq AvM$, Avc2 continues to hold the value equal to the result obtained through equation (7). Then, the program goes to step #177 at which a calculation $$Ev + 1 - 6 = Av \tag{8}$$

is carried out. When the calculated result Av is detected to be $Av > Avc2$ at step #178, avc2 is assigned to Avf at step #179. At the next step #180, when it is detected that $Avf + 6 \geq Ev$, "6" is assigned to Tvf. Contrary, at step #180, when it is detected that $Avf + 6 < Ev$, it is further detected at step #182 whether or not the data obtained from the flash device represents the sequence flash mode (or double-action twin flash mode). When the flash mode is other than the sequence flash mode (or double-action twin flash mode, "7" is assigned to Tvf. When the flash mode is sequence flash mode (or double-action twin flash mode), "6" is assigned to Tvf, even when $Avf + 6 < Ev$.

When the result Av calculated from equation (8) is such that $Av < Avc1$, the program goes from step #184 to #185, at which Avc1 is assigned to Avf. When the result Av calculated from equation (8) is such that $Avc1 \leq Av \leq Avc2$, the result Av is assigned to Avf as an aperture value for photographing with an aid of flash light. Thereafter, the program goes to step #183 at which "6" is assigned to Tvf. Then, the program goes to step #204.

At step #170, when it is detected that the mode is not P mode, the program goes to step #187 at which it is detected whether the data obtained from the flash device (or flash controller IV) represents the sequence flash mode (or double-action twin flash mode) or other mode. When the flash mode is a sequence flash mode, "6" (corresponding to 1/60 sec) is assigned to Tvk representing the limit of synchronizing exposure time. When the flash mode is not a sequence flash mode, "7" (corresponding to 1/125 sec) is assigned to Tvk. Thereafter, the program goes to step #190 at which it is detected whether the mode is A mode or not.

When it is detected at step #190 that the mode is A mode, set aperture value Avs is assigned to Avf (step #192) and Tvk is assigned to Tvf (step #191). Then, the program goes to step #204. When it is detected at step #190 that the mode is not A mode, the program goes to #193.

Referring to FIG. 5b, at step #193, it is detected whether $Tvs > Tvk$ or not. If yes, Tvk is assigned to Tvf and, if no, Tvs is assigned to Tvf. Then, at step #196, it is detected whether the mode is S mode or not. When the mode is S mode, $$Ev + 1 - Tvf = Av \tag{9}$$

is calculated. Then, it is detected whether the calculated result Av is below Avo, above AvM or between Avo and AvM. When the result Av is below Avo ($Av < Avo$), Avo is assigned to Avf (step #199). When the result Av is above AvM ($Av > AvM$), AvM is assigned to Avf (step #201). And, when the result Av is between Avo and AvM (Avo≦Av≦AvM), Av is assigned to Avf. Thereafter, the program goes to step #204.

On the other hand, if it is detected at step #196 that the mode is not S mode, i.e., the mode is M mode, the program goes to step #203 in which the value Avs is assigned to Avf, and further advances to step #204.

Figure 6:
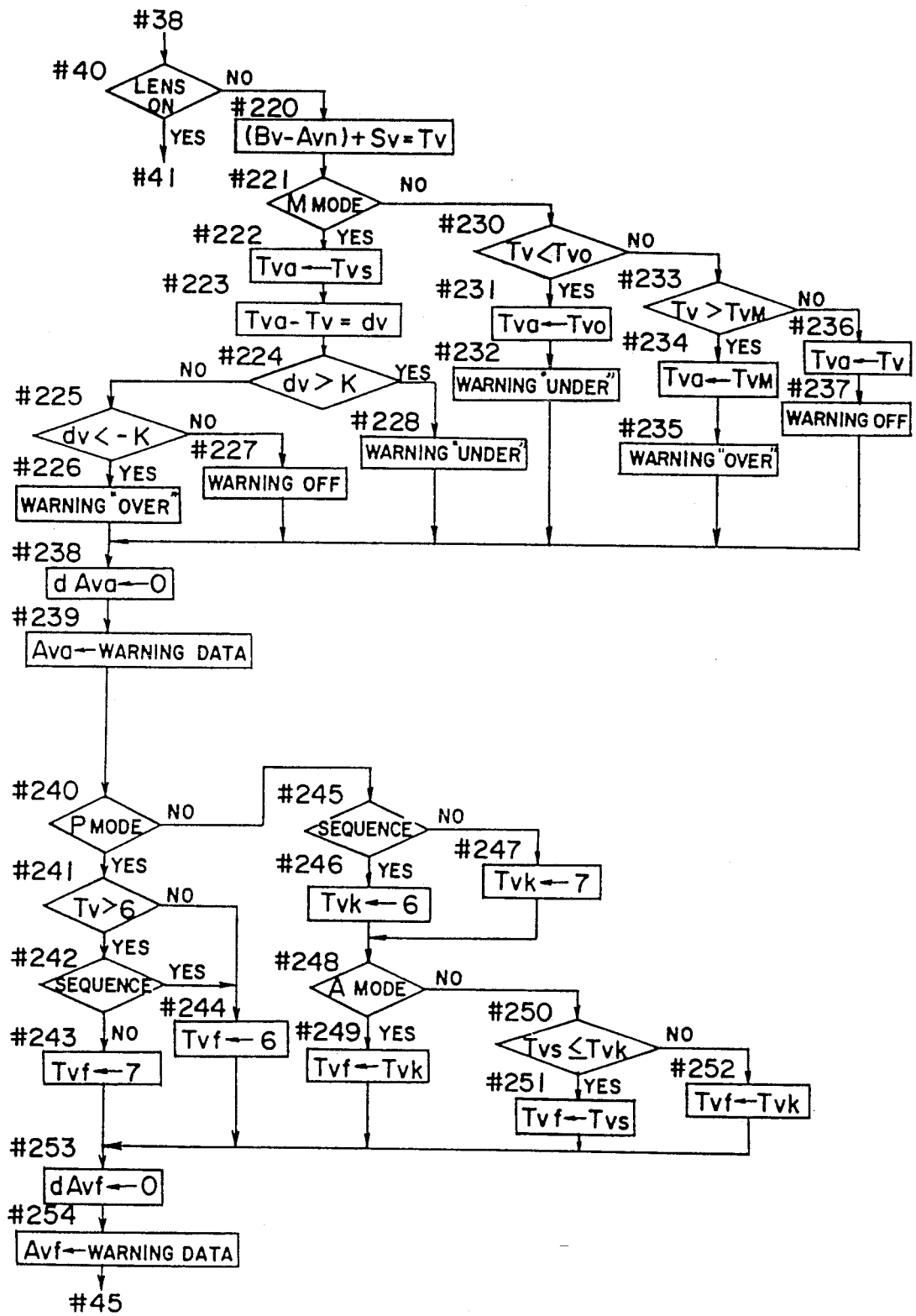

Referring to FIG. 6, the description is now directed to the details of the ambient light calculation II at step #43 and flash light calculation II ate step #44.

At step #220, a calculation $$Bv - Avn + Sv = Tv \qquad (10)$$

is carried out. Here, Bv-Avn represents an output of light measuring wherein Avn is an aperture value representing not the aperture controlled according to the present embodiment, but an aperture value representing the manually set or fixed aperture value, such as in various adaptors like an extention ring, a bellows, a pin hole adaptor, or an interchangeable lens.

Then, at step #221, it is detected whether the mode is M mode or not. When it is M mode, the program goes to step #222 at which set exposure time Tvs is assigned to control exposure time Tva. Then, a calculation is carried out as follows:

$$Tva - Tv = dv.$$

wherein Tv is the result Tv of equation (10). When the result dv of the calculation is such that $dv < -K$ (K is a constant representing the film latitude), a warning "OVER" is produced. When the result is such that $dv > K$, a warning "UNDER" is produced. When the result is such that $-K \leq dv \leq K$, no warning is produced. Thereafter, the program goes to step #238.

When it is detected at step #221 that the mode is not M mode, it is understood that the mode is automatic exposure control mode. In this case, the program follows step #230 et seq. to detect whether the result Tv of equation (10) is smaller than Tvo, greater than TvM, or between Tvo and TvM. When Tv<Tvo, Tvo is assigned to Tva, and a warning "UNDER" is produced. When Tv>TvM, TvM is assigned to Tva, and a warning "OVER" is produced. When Tvo≦Tv≦TvM, the result Tv of equation (10) is assigned to Tva, and no warning is produced. Thereafter, the program goes to step #238.

At step #238, "0" is assigned to dAva. Then, at step #239, a warning data is assigned to Ava so as to permit the warning of "NO LENS MOUNTED".

At the next step #240, it is detected whether the mode is P mode or not. When the mode is P mode, the program goes to step #241 for detecting whether Tv (obtained from equation (10)) is greater than "6". At step #241, when it is detected that $$Tv \leq 6, \text{ ("6" corresponds to 1/60 sec)}$$

"6" is assigned to Tvf. Contrary, at step #241, when it is detected that $$Tv > 6.$$

it is further detected at step #242 whether or not the flash mode is the sequence flash mode. When the flash mode is other than the sequence flash mode, "7" ("7" corresponds 1/125 sec) is assigned to Tvf. When the flash mode is sequence flash mode, "6" is assigned to Tvf.

At step #240, when the detected mode is not P mode, it is further detected at step #245 whether or not the flash mode is sequence flash mode. When the flash mode is a sequence flash mode, "6" (corresponding to 1/60 sec) is assigned to Tvk representing the limit of synchronizing exposure time. When the flash mode is not a sequence flash mode, "7" (corresponding to 1/125 sec) is assigned to Tvk (step #247). Thereafter, the program goes to step #248 at which it is detected whether the mode is A mode or not.

When it is detected at step #248 that the mode is A mode, Tvk is assigned to Tvf (step #249). Then, the program goes to step #253. When it is detected at step #248 that the mode is not A mode, the program goes to #250. At step #250, it is detected whether Tvs≦Tvk or not. If yes, Tvs is assigned to Tvf and, if no, Tvk is assigned to Tvf. Then, the program goes to step #253.

At step #253, "0" is assigned to dAvf. Then, at step #254, a warning data is assigned to Avf so as to permit the warning of "NO LENS MOUNTED". Then, the program goes to step #45 (FIG. 2b).

It is to be noted that in the case of sequence flash mode three flash devices, at maximum, emit light sequentially. Thus, the limit of synchronizing exposure time, i.e., a period of time between the closure of X contact (Sx) and the start scan of trailing curtain, is made longer than the time necessary for the three flash devices to emit light, such as 1/60 second. On the contrary, when the flash mode is not a sequence flash mode, the flash lights emit light simultaneously. Thus, the limit of synchronizing exposure time is made longer than the time necessary for one flash light to exit light, such as 1/125 second.

Referring back to FIG. 2b, after the above described calculations, the program goes to step #45 at which it is detected whether or not the ready signal (indicating the completion of charge) is produced from the flash device. When the ready signal is present, a flash photographing is available. Thus, aperture value Avf for the flash photographing and exposure time value Tvf for the flash photographing are applied to the display circuit DP. On the contrary, when the ready signal is not present, a photographing under an ambient light is available. In this case, aperture value Ava for the ambient light photographing and exposure time value Tva for the ambient light photographing are applied to the display circuit DP. Then, at steps #48-#50, a procedure similar to steps #18-#20 is carried out, that is, the further procedure will follow the step #80 et seq. if exposure control operation is to be carried out, and the step #55 et seq. if not.

At step #55, microcomputer MC1 produces HIGH from outputs O4 and O6. Accordingly, NAND gate NA1 and AND gate AN11 (FIG. 7) are enabled to permit signal transmission through lines L2 and L12 from camera body V to the flash device. Then, HIGH is produced from output O5 for a predetermined period of time T2 (such as 150 microseconds). The HIGH from output O5 is transmitted through lines L3 and L13 to the flash device and flash controller, thereby informing that the mode is CF mode, that is a mode for transmitting various data from camera body V to the flash devices. Then, microcomputer MC1 sets the aperture value Avf for photographing under flash light in the serial in/out register (IOR). Thereafter, the set data are serially sent out. Next, the the data of film sensitivity Sv and data of exposure mode are set in register (IOR), and are sent out serially. Next, the data of focal length fv of the mounted interchangeable lens are set and serially sent out. Then, at step #63, outputs 04 and 06 produce LOW, and the program goes to step #64.

Next, the description is particularly directed to the data transmission between the flash device and camera body V.

Referring to FIG. 7, a detail of input/output control circuit IOC is shown. When the mode is FC mode, a LOW is applied to circuit IOC from output O6 of microcomputer MC1. Thereupon, NAND gate NA1 produces HIGH, and AND gate AN11 produces LOW, thereby turning transistors BT15 and BT17 off and maintaining line L2 in the open condition. And the output O4 produces HIGH, thereby enabling AND gates AN5, AN7 and AN9. Then, the clock pulses from output SCK of microcomputer MC1 are transmitted through AND gate AN5 and OR gate OR3. At the HIGH of the clock pulses, inverter IN3 produces LOW, thereby turning transistor BT11 on, and at the LOW of the clock pulses, inverter IN5 produces HIGH, thereby turning transistor BT13 on. Thus, line L3 produces a similar clock pulses.

In the FC mode, the data from the flash device through line 2 are permitted to pass through the circuit IOC to serial-input terminal SIN of microcomputer MC1 in the following manner. In the FC mode, transistors BT15 and BT17 are both turned off. Thus, when HIGH is applied to L2 from the flash device, transistor BT19 turns on, thereby producing HIGH from inverter IN7. When LOW is applied to L2, transistor BT19 turns off, thereby producing LOW from inverter IN7. These HIGH and LOW from inverter IN7 are transmitted through OR gate OR1 to serial-input terminal SIN of microcomputer MC1.

On the contrary, when the mode is CF mode, output O6 produces HIGH, thereby enabling NAND gate NA1 and AND gate AN11. Then the output O4 produces HIGH, thereby enabling AND gates AN5, AN7 and AN9, and the data from serial-output terminal SOU of microcomputer MC1 pass through AND gate AN9. When the signal from output SOU is HIGH. NAND gate NA1 produces LOW, thereby turning transistor BT15 on, and providing HIGH to line L2. When the signal from output SOU is LOW, AND gate AN11 produces HIGH, thereby turning transistor BT17 on, and providing LOW to line L2.

Referring back to FIG. 2b, a further description on the flow chart is given. At step #64, since the preparation for the exposure control is completed, "1" is assigned to a flag (JF1). Then, at steps #65 and #66, it is detected whether or not to start an exposure control operation, in a similar manner to the previous steps #19 and #20. If yes, the program goes to step #80, and if no, the program goes to step #70. At step #70, it is detected whether or not the light measuring switch S1 is turned on, by the detection whether or not input i1 is receiving LOW. When input i1 receives LOW, the program returns back to step #11 and repeats the above described operations. Contrary, when input i1 receives HIGH, the operation of auto-focus control circuit AF is stopped by the microcomputer MC1, and, nothing is made to be displayed through display circuit DP. Then, "0" is assigned to flag JF1. At the next step #74, it is permitted to receive interruption signal through terminal iT. Thereafter, LOW is produced from output O1, thereby turning transistor BT1 off to cut off the power supply (+V), and ending the operation of microcomputer MC1.

Referring to FIG. 2c, when it is required to carry out the exposure control operation, the program follows the step #80 et seq. At step #80, the operation of auto-focus control circuit AF is stopped. Then, output O4 produces HIGH, and output O5 produces HIGH for a predetermined period of time T3, such as 210 microseconds. Then, output O4 produces LOW. The flash device and flash controller read this signal from output O5 through line L3 so that they are informed that an ES mode has been established for carrying out the exposure control operation. Then, it is waited until line L1 is grounded by the closure of X contact Sx provided in the camera body. At step #84, it is detected whether a ready signal is produced from the flash device or not. When the ready signal is produced from the flash device and is applied to the microcomputer MC1, the exposure control values Tvf and dAvf for flash photographing are produced from output OP1 and are applied to exposure control circuit ECC (step #85). On the contrary, when microcomputer MC1 is not receiving any ready signal, the exposure control values Tva and dAva for ambient light photographing are produced from output OP1 and are applied to exposure control circuit ECC (step #89). In the case of flash photographing, it is further detected whether the mode is sequence flash mode or not. If the mode is sequence flash mode, an analog signal corresponding to film sensitivity Sv is produced from output ANO, and if not, output ANO produces an analog signal corresponding to Sv-0.5. A further detail of these analog signals will be described later in connection with FIG. 8.

At step #90, it is made to display nothing through display circuit DP, and then, output O2 produces HIGH. Thereupon, release circuit RL operates to start the exposure control operation. Then, the aperture mechanism is operated to control the size of aperture, and a reflection mirror (not shown) flips up. When the mirror flips up completely, a leading curtain starts to scan. When the leading curtain completes its scan, X contact Sx closes, thereby effecting, in the case of flash photographing, the emission of flash light. The amount of flash light to be emitted will be described later in connection with FIG. 8. After the exposure time from the start of the leading curtain, a trailing curtain starts to scan. When the trailing curtain completes its scan, the reflection mirror moves down, and the aperture mechanism sets the aperture in the fully opened condition. When the above exposure control operation completes, switch S4 turns off. As a result, HIGH is provided to input i3 of microcomputer MC1. At step #92, microcomputer MC1 waits until it receives HIGH to its input i3. When input i3 receives HIGH, the program goes to step #93 at which LOW is produced from output O2, and at step #94, it is detected whether or not input i1 is receiving LOW, which is accomplished in response to the closure of light measuring switch S1. If input i1 is receiving LOW, the program returns to step #11, and if it is receiving HIGH, the program goes to step #95 to assign "0" to flag (JF1). At the next step #96, it is permitted to receive interruption signal through terminal iT. Thereafter, LOW is produced from output O1, thereby turning transistor BT1 off to cut off the power supply (+V), and ending the operation of microcomputer MC1.

Figure 8:
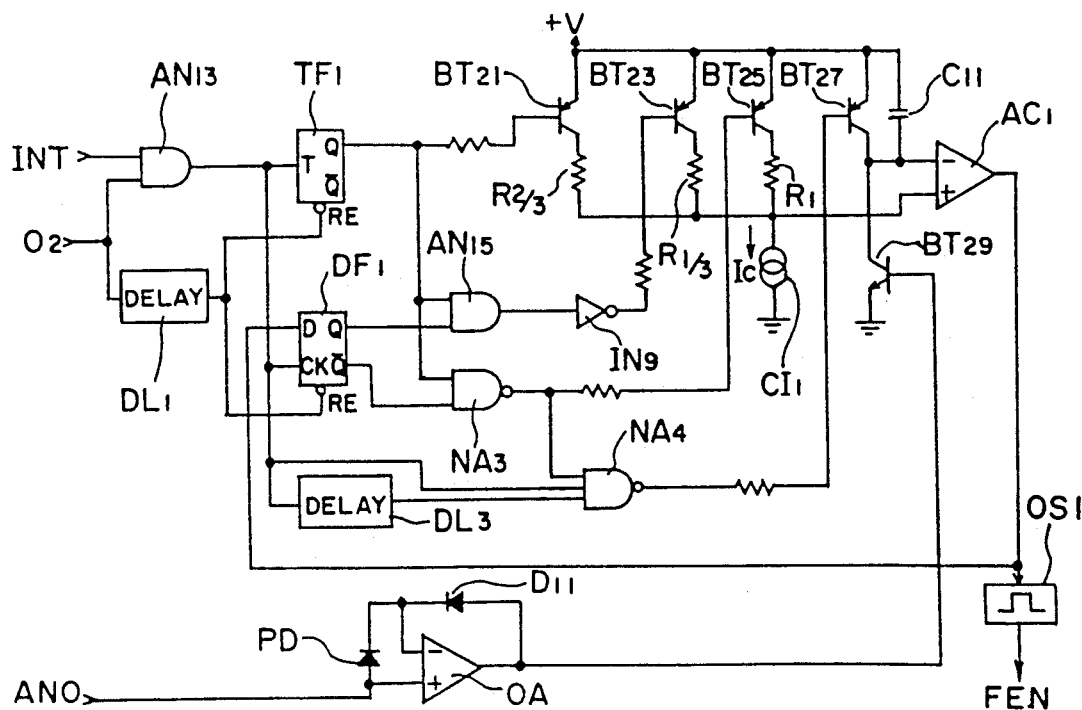
FIG. 8 is a circuit diagram showing the detail of light amount control circuit FST shown in FIG. 1b-1.

Referring to FIG. 8, a detail of light amount control circuit FS is shown. It is provided for controlling the amount of flash light to be emitted from each connected flash device. A photodiode PD is located at such a position as to receive light which has been transmitted through the picture taking lens and reflected from the film surface. The output of photodiode PD is connected to a diode D11 for the logarithmic compression of output signal from photodiode PD. Also connected to photodiode PD is an operational amplifier OA which receives data Sv from analog output ANO of microcomputer MC1 when it is a sequence flash mode, and data Sv-0.5 when it is not a sequence flash mode. Operational amplifier OA produces, during the emission of flash light, a data determined by the intensity of flash light reflected from the object to be photographed, controlled aperture value and film sensitivity. Such a data can be expressed as:

$$Qv - Sv - Avf$$

or $$Qv + (Sv - 0.5) - Avf.$$

wherein Qv is a logarithmically compressed value of intensity of reflected light from the object under flash light illumination. The output of operational amplifier OA is applied to the base of transistor BT29 which produces a collector current representing the logarithmically expanded value of output signal from amplifier OA. The collector current is integrated in capacitor C11, which produces an integrated voltage:

$$2^{Sv} \cdot \int 2^{Qv} dt / 2^{Avf}$$

or $$2^{Sv-0.5} \cdot \int 2^{Qv} dt / 2^{Avf}.$$

From output O2, HIGH is provided to circuit FST of FIG. 8 for starting the exposure control operation. In response to HIGH from output O2, AND gate AN13 is enabled to produced HIGH. HIGH from output O2 is also applied to a delay circuit DL1 which after the delay of a predetermined time produces HIGH. The delayed HIGH is applied also to reset terminals of T flip-flop TF1 and D flip-flop DF1, thereby releasing the reset condition. Thus, T flip-flop TF1 and D flip-flop DF1 are both in the operative condition. At this point, both T flip ™ flop TF1 and D flip-flop DF1 are in a reset condition, producing LOW from Q terminal and HIGH from $\bar{Q}$ terminal.

From terminal INT, which is the output of inverter IN7, shown in FIG. 7, HIGH and LOW signals transmitted from the flash device through line L2 are applied. Under the ES mode, HIGH is applied from INT when the flash device is in the ready condition. Upon closure of X contact Sx, the flash device starts to shoot light, and at the same time, the signal from INT changes in the following manner. Upon closure of X contact, the signal from INT changes to LOW for 2.5 milliseconds. Then, it holds HIGH for 1 millisecond, and then holds LOW for 5.5 milliseconds. Thereafter, the signal from INT is maintained HIGH. In other words, upon closure of X contact, terminal INT produces two LOW pulses sequentially. The first LOW pulse is produced in response to the closure of X contact and has a pulse width of 2.5 milliseconds. The second LOW pulse is produced after the interval of 1 millisecond from the end of the first LOW pulse and has a pulse width of 5.5 milliseconds. Therefore, when delay circuit DL1 starts to produce HIGH, AND gate AN15 produces LOW, inverter IN9 produces HIGH, NAND gate NA3 produces HIGH, and NAND gate NA4 produces LOW. Accordingly, transistors BT21 and BT27 turn on, and transistors BT23 and BT25 turn off. By the turn on of transistor BT21, a constant current Ic flows from the source +V through transistor BT21, resistor $R_3^g$ and constant current source CI1 to ground. Thus, a first predetermined voltage is produced at a junction between resistor $R_3^g$ and constant current source CI1, and which first predetermined voltage is applied to a non-inverting input of comparator AC1. The resistor $R_3^g$ and constant current source CI1 are so selected that the first predetermined voltage is equal to 70% of a level appropriate for the proper exposure.

Next, the description is directed to the light amount control operation of the case when the mode is not the sequence flash mode with the flash device being connected to connector CN5 and/or CN9.

When the emission of the flash light starts at the positive edge of the first LOW pulse, AND gate AN13 produces LOW, thereby producing HIGH from NAND gate NA4, and turning transistor BT27 off. Thus, capacitor C11 starts to integrate collector current of transistor BT29. In this case, since terminal ANO is producing an analog signal representing Sv-0.5, the integrated voltage Vx across the capacitor can be given as:

$$Vx = 2^{Sv} \cdot \int 2^{Qv} dt / 2^{Avf} \cdot 2^{0.5} \approx 0.7 \cdot 2^{Sv} \cdot \int 2^{Qv} dt / 2^{Avf}.$$

When the integrated voltage Vx becomes equal to 0.7 Z, that is, when $$0.7 \cdot 2^{Sv} \cdot \int 2^{Qv} dt / 2^{Avf} = 0.7 Z = Ic \cdot R_3^g \quad (11)$$

wherein Z is a constant representing a voltage for the proper exposure, comparator AC1 produces HIGH, thereby producing HIGH from one-shot circuit OS1. The pulse from OS1 is applied through circuit IOC of FIG. 7 and line L3 to the flash device, thereby stopping the emission of flash light. Since equation (11) can be given as:

$$\int 2^{Qv} dt = 2^{Avf} \cdot Z / 2^{Sv}. \quad (12)$$

the flash device emits flash light for an amount appropriate for the proper exposure. For example, it takes about 2 milliseconds to fully emit the flash light, the flash device will stop its emission not longer than 2 milliseconds, which is shorter than the duration of the first LOW pulse. After the above described operation, circuit FST of FIG. 8 carries out a further operation based on the further signal, such as the second LOW pulse obtained from terminal INT, but since the flash mode is not sequence flash mode, such a further operation has no meaning.

Next, the description is directed to the light amount control operation for the sequence flash mode, particularly with two light emissions: the first light emission is effected during the first LOW pulse; and the second light emission is effected during the first half of the second LOW pulse. In this case, two flash devices are connected to connector CN5 and CN9, respectively. The emission of the first flash light is carried out in a similar manner as described above. The only difference is in the value of current for integrating the capacitor C11. In the sequence flash mode, analog output terminal ANO provides a signal Sv and, therefore, the integrated voltage across capacitor C11 can be given as:

$$Vx' = 2^{Sv} \cdot \int 2^{Qv} dt / 2^{Av \cdot f}.$$

When Vx' becomes equal to 0.7 Z, that is, when $$0.7 Z = 2^{Sv} \cdot \int 2^{Qv} dt / 2^{Av \cdot f},$$

comparator AC1 produces HIGH to stop the emission of flash light. The above equation can be rewritten as:

$$\int 2^{Qv} dt = 0.7 \cdot 2^{Av \cdot f} \cdot Z / 2^{Sv} \qquad (13)$$

indicating that the emitted light amount $\int 2^{Qv} dt$ is equal to 70% of necessary light amount for the proper exposure. Then, when the signal at terminal INT changes from LOW to HIGH at the end of the first LOW pulse, T flip-flop TF1 changes its condition, thereby producing HIGH from its Q terminal and LOW from its $\overline{Q}$ terminal At this time, D flip-flop DF1 receives output of comparator AC1. Thus, when the exposure amount reaches 70% of necessary light for the proper exposure during the shooting of the first flash light, D flip-flop DF1 is changed to such a condition that its Q terminal produces HIGH and its $\overline{Q}$ terminal produces LOW. If the exposure amount resulted below 70% of necessary light for the proper exposure, even when the first shooting of flash light is completed, comparator AC1 continues to produce LOW even after the first LOW pulse. Thus, D flip-flop DF1 is maintained to such a condition that its Q terminal produces LOW and its $\overline{Q}$ terminal produces HIGH.

When the light amount reached 70% of necessary light for the proper exposure by the first shooting of flash light, NAND gate NA3 continues to produce HIGH. Thus, NAND gate NA4 produces LOW after the delay caused by delay circuit DL3 from the receipt of HIGH from terminal INT. Then, transistor BT27 turns on to discharge capacitor C11.

When the light amount is still below 70% of necessary light for the proper exposure even at the end of the first LOW pulse, i.e., after 2.5 milliseconds from the start emission of the first shooting of the flash light (for example, one full shooting of flash light lasts about 2 milliseconds), capacitor C11 continues to hold its charge, in a manner described below. After 2.5 milliseconds from the start emission, HIGH is provided from terminal INT, thereby changing the condition of T flip-flop TF1 such that its Q terminal produces HIGH. At that time, D flip-flop maintains its $\overline{Q}$ terminal HIGH since the comparator AC1 continues to produce LOW. Thus, NAND gate NA3 produces LOW. And, even when the output from delay circuit DL3 produces HIGH, NAND gate NA4 continues to produce HIGH, thereby maintaining transistor BT27 off. Thus, capacitor C11 further integrates the current representing the received light.

In the case where the light amount reached 70% of necessary light amount for the proper exposure during the first shooting of flash light, AND gate AN15 produces HIGH and inverter IN9 produces LOW, thereby turning transistor BT23 on to provide a second predetermined voltage level, determined by resistor $R_{\frac{1}{3}}$ and constant current source CI1, to non-inverting input of comparator AC1. The resistor $R_{\frac{1}{3}}$ and constant current source CI1 are so selected that the second predetermined voltage is equal to 30% of a level appropriate for the proper exposure.

On the contrary, in the case where the light amount did not reach 70% of necessary light amount before the end of the first LOW pulse, NAND gate NA3 produces LOW, thereby tuning transistor BT25 on. Thus, non-inverting input of comparator AC1 receives a third predetermined voltage level determined by resistor R1 and constant current source CI1, which is equal to 100% of necessary light amount for the proper exposure.

Then, in response to next LOW from terminal INT (that is the start of the second LOW pulse which occurs after 3.5 milliseconds from the start emission of the first shooting), the second shooting of flash light starts. When the light amount had reached 70% during the shooting of the first flash light, transistor BT27 turns off again in response to the second LOW pulse, and capacitor C11, which has been discharged at the aperture of the 1 millisecond HIGH pulse, starts to integrate collector current of transistor BT29 from the beginning. Contrary, when the light amount had not reached 70% during the shooting of the first flash light, transistor BT27 is maintained off and, therefore, the capacitor C11, which is still carrying the charge accumulated during the shooting of the first flash light, continues to integrate collector current of transistor BT29 in addition to the charge already stored therein In the case, where the light amount had reached 70% during the shooting of the first flash light, the second shooting of the flash light stops when the amount of light amount during the second shooting reaches 30% of necessary light for the proper exposure, that is when the following equation is satisfied.

$$\int 2^{Qv2} dt = 0.3 \cdot 2^{Av \cdot f} \cdot Z / 2^{Sv} \qquad (14)$$

In this manner, the proper exposure is effected when the first and second shootings of flash light are completed with the ratio of the light amount emitted by the first and second shooting being fixed to 7:3.

In the case, where the light amount has not reached 70% during the shooting of the first flash light, the second shooting of the flash light stops when the amount of light emitted during the second shooting reaches the remaining percentage of necessary light for the proper exposure, that is when the following equation is satisfied.

$$\int (2^{Qv1} + 2^{Qv2}) dt = 2^{Av \cdot f} \cdot Z / 2^{Sv} \qquad (15)$$

In this manner, the proper exposure is effected when the first and second shooting of flash light are completed with the ratio of the light amount emitted by the first and second shooting being A:10-A, wherein A is less than 7.

Next, the description is directed to the light amount control operation for the sequence flash mode, particularly with three light emissions: the first light emission is effected during the first LOW pulse; the second light emission is effected during the first half (2.5 milliseconds) of the second LOW pulse; and the third light emission is effected during the latter half (3 milliseconds) of the second LOW pulse. In this case, three flash devices are connected to connector CN5, CN7 and CN9, respectively. The first and second light emissions are effected in the same manner as described above by the flash devices connected to connectors CN5 and CN9, and the third light emission is effected by the flash device connected to connector CN7 after the counting of 2.5 milliseconds from the negative edge of the second LOW pulse. At the start of the third light emission, since the signal from terminal INT is LOW, capacitor C11 continues to integrate the collector current from transistor BT29. If the light amount during the first and second emission is not sufficient for the proper exposure, an ineffective stop emission signal might be produced through line L3 during the emission of the third light, but the third flash device connected to connector CN7 emits full light or a amount determined within the third flash device, because only the start emission signal is transmitted through the connector CN7.

It is to be noted that since the FDC signal (the signal produced to stop the emission of the flash light during the second shooting when the light amount has reached 100%) is controlled to produce within the first half (2.5 milliseconds) of the second LOW pulse and the exposure control signal (the signal produced to stop the emission of the flash light, such as, during the first shooting when the light amount has reached 70%) is produced with the first LOW pulse, there is no chance of an error operation caused by the ineffective stop emission signal.

Next, the description is directed to the circuit of a double flash-head type electronic flash device, such as flash device I, shown in FIG. 1b-2, in connection with FIGS. 9a, 9b, 10, 11, 12, 13a, 13b, 13c and 14.

Figure 9A:
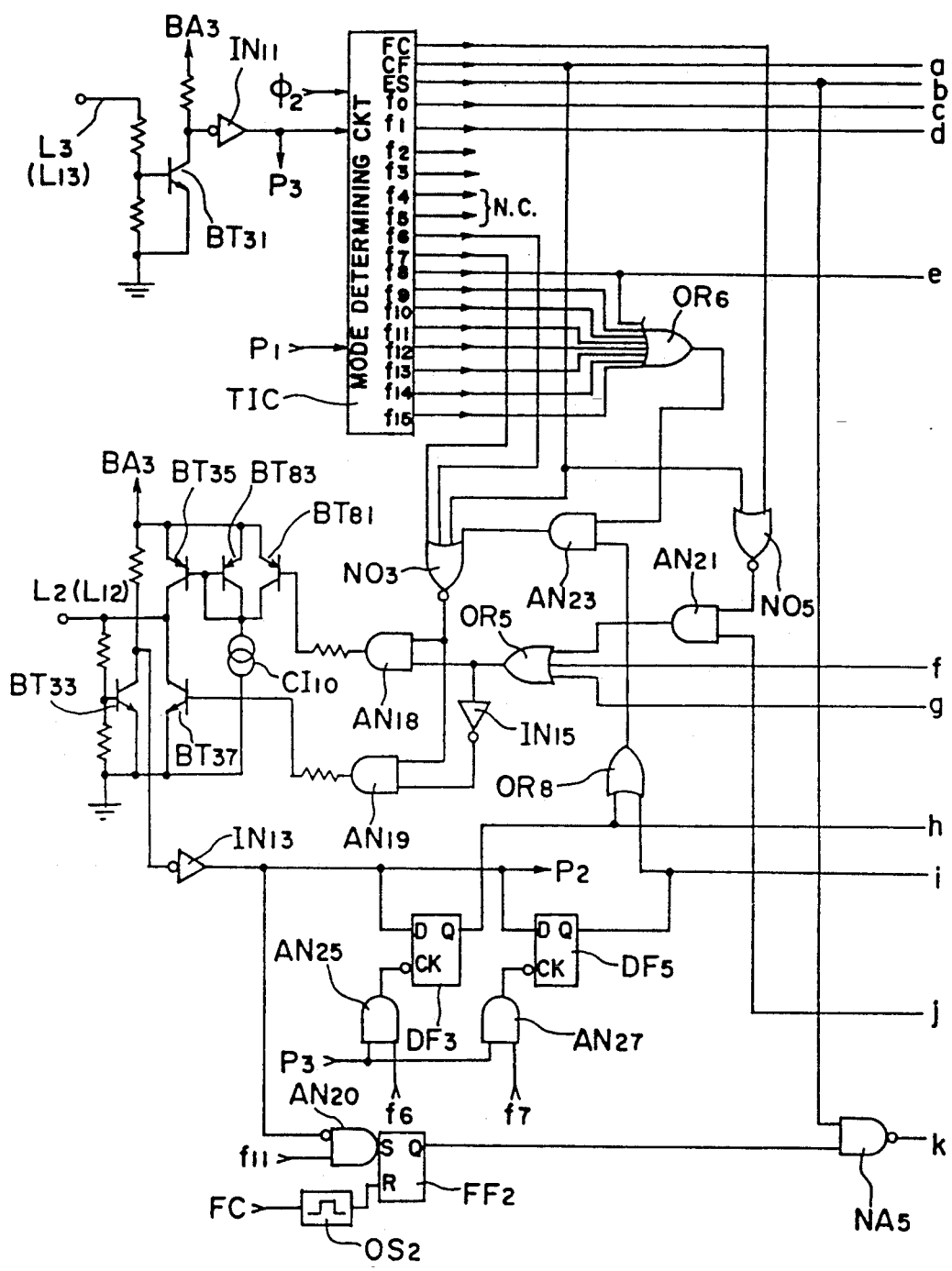
FIGS. 9a and 9b taken together as shown in FIG. 9 show the detail of control circuit FLC1 shown in FIG. 1b-2.
Figure 9:
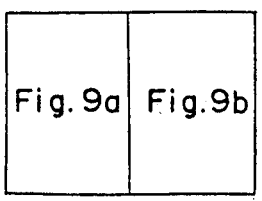
Figure 9B:
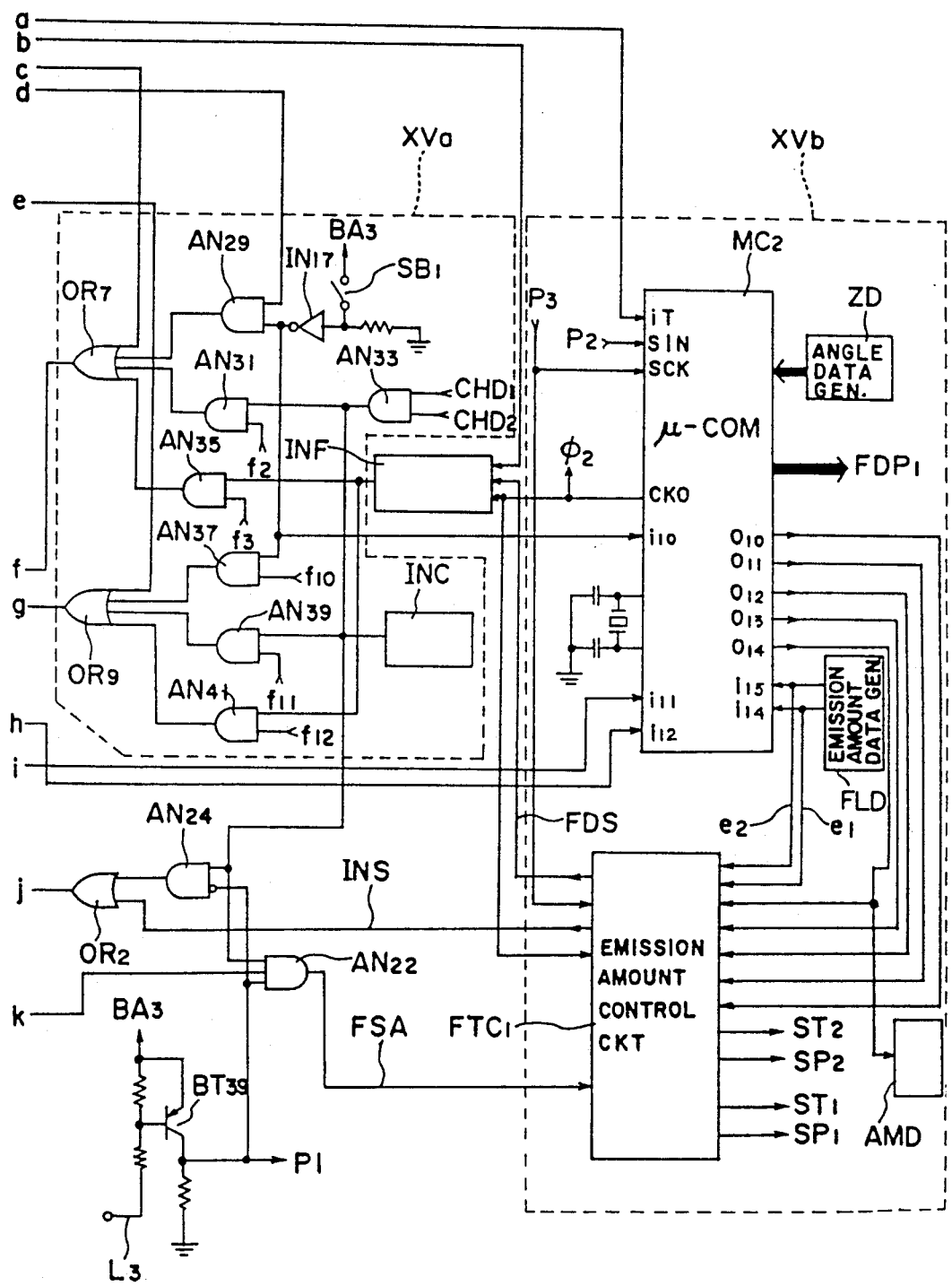

Referring to FIGS. 9a and 9b, control circuit FLC1 is shown. Through terminal L3, a pulse with its width representing either FC, CF or ES mode, clock pulses for the data transmission, and pulses to to stop the emission of flash light are applied. When the terminal L3 receives HIGH, transistor BT31 turns on, thereby producing HIGH from output P3 of inverter IN11. A mode determining circuit TIC counts the pulsewidth of the HIGH pulse from output P3 and determines the mode, and thereby controlling the flash device. The detail of the mode determining circuit TIC is described below.

Figure 10:
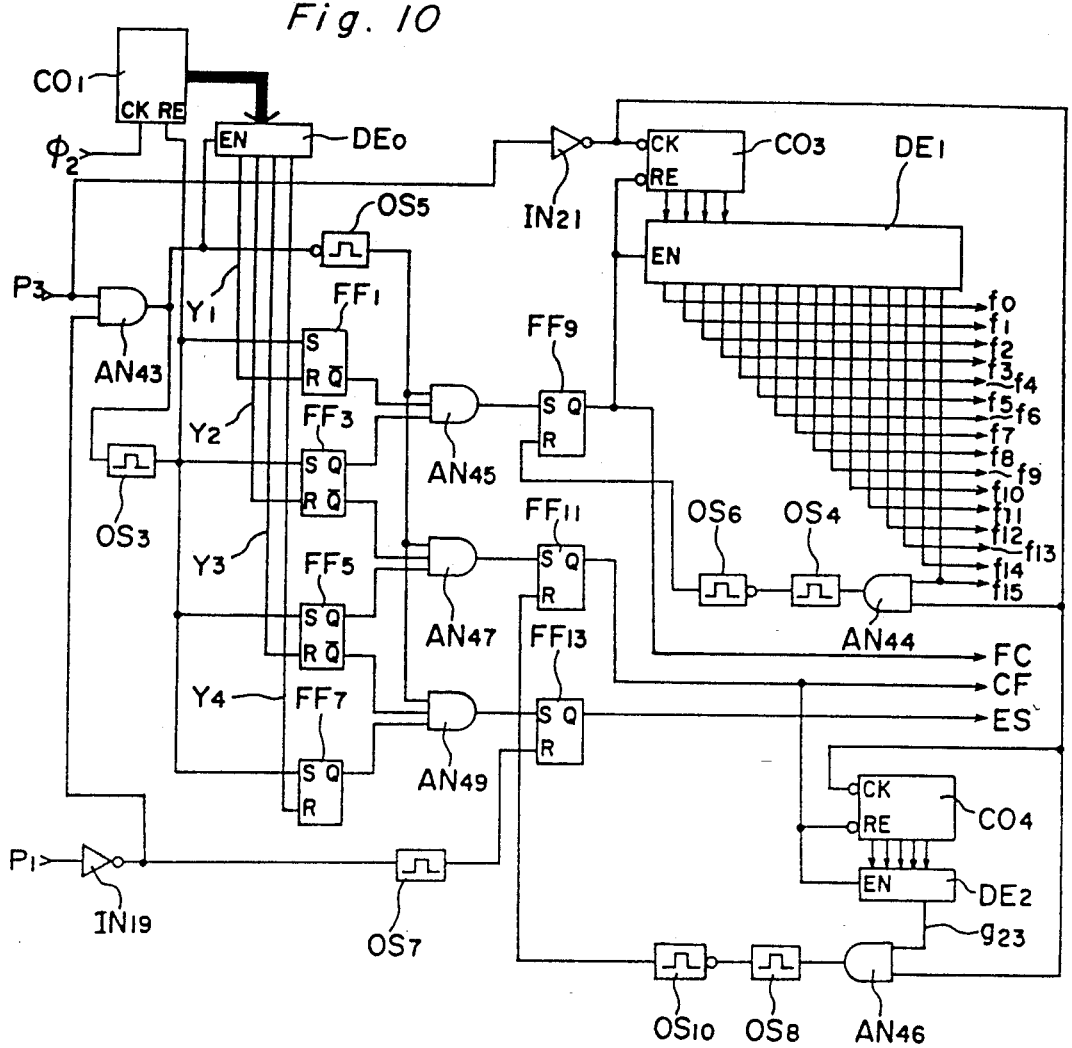

Referring to FIG. 10, mode determining circuit TIC includes inverter IN19 which receives HIGH from terminal P1 (FIG. 9b, bottom) during when line L1 is grounded upon closure of X contact Sx to turn transistor BT39, but it receives LOW during the receipt of a pulse having a width representing either FC, CF or ES mode and clock pulses for the data transmission. Thus, during the latter, inverter IN19 produces HIGH. When HIGH is applied from terminal P3, AND gate AN43 produces HIGH, thereby producing HIGH from one-shot circuit OS3. By the HIGH from one-shot circuit OS3, counter CO1 is reset, thereby start counting clock pulses $\phi 2$ from output CKO of microcomputer MC2. Also, by the same HIGH from one-shot circuit OS3, flip-flops FF1–FF7 are reset. Counter CO1 provides signals representing the result of count to decoder DE0, which then produces four delayed HIGH pulses from its outputs Y1, Y2, Y3 and Y4. From the start counting in counter CO1, signals at outputs Y1, Y2, Y3 and Y4 are delayed 60 microseconds, 120 microseconds, 180 microseconds and 240 microseconds, respectively. Therefore, from the start counting, flip-flop FF1 is held in the set condition for 60 microseconds. Similarly, flip-flop FF3 is held in the set condition for 120 microseconds, flip-flop FF5 is held in the set condition for 180 microseconds, and flip-flop FF7 is held in the set condition for 240 microseconds. Therefore, AND gate AN45 is held in the enabled condition during 60–120 microseconds from the start counting. Similarly, from the start counting, AND gate AN47 is enabled during 120–180 microseconds and AND gate AN49 is enabled during 180–240 microseconds.

Then, one-shot circuit OS5 produces a pulse in response to the negative edge of the pulse applied from terminal P3. The pulse from terminal P3 has a pulse width which is equal to either 90 microseconds, 150 microseconds or 210 microseconds. When the pulse from terminal P3 has a pulse width of 90 microseconds, the pulse from one-shot circuit OS5 is transmitted through AND gate AN45 to a set terminal of flip-flop FF9, thereby producing HIGH from its Q terminal and further from terminal FC. When the pulse from terminal P3 has a pulse width of 150 microseconds, the pulse from one-shot circuit OS5 is transmitted through AND gate AN47 to a set terminal of flip-flop FF11, thereby producing HIGH from its Q terminal and further from terminal CF. Furthermore, when the pulse from terminal P3 has a pulse width of 210 microseconds, the pulse from one-shot circuit OS5 is transmitted through AND gate AN49 to a set terminal of flip-flop FF13, thereby producing HIGH from its Q terminal and further from terminal ES.

After the pulse having a pulse width which is equal to either 90 microseconds or 150 microseconds, a train of clock pulses, each having a pulse width of about a few microseconds, are applied from terminal P3 for the data transmission. In this case, one-shot circuits OS3 and OS5 produce pulses in response to such clock pulses from AND gate AN43, but since the time interval between these two pulses from circuits OS3 and OS5 is a few microseconds which is much narrow than 60 microseconds, there will be no error operation of flip-flops FF9, FF11 and FF13.

When terminal FC produces HIGH, counter CO3 is released from the reset condition, thereby making the decoder DE1 in a condition ready to produce output. Then, the train of data transmission clock pulses from terminal P3 are inverted in inverter IN21 and are applied to counter CO3, which counts up in response to the negative edges of the inverted pulses. The counted values in counter CO3 are applied to decoder DE1 which produced HIGH from one of its sixteen outputs f0–f15 in a manner described below. When counter CO3 has counted one pulse, it produces "0001" from its output, and output f0 produces HIGH. When counter CO3 has counted two pulses, it produces "0010" from its output, and output f1 produces HIGH. Similarly, when counter CO3 has counted eight pulses, it produces "1000" from its output and output f7 produces HIGH. When counter CO3 has counted nine pulses, it produces "1001" from its output, and output f8 produces HIGH. And when counter CO3 has counted sixteen pulses, it produces "1111" from its output, and output f15 produces HIGH. These signals produced from outputs f0–f15 are used for controlling the gates for transmitting data. When output f15 produces HIGH, AND gate AN44 is enabled, thereby transmitting signal from inverter IN21 to one-shot circuit OS4 and further to one-shot circuit OS6. In response to the positive edge of a pulse from inverter IN21, that is, in response to the negative edge of a sixteenth clock pulse under the FC mode, one-shot circuit OS4 produces a pulse. By the negative edge of this pulse, one-shot circuit OS6 is triggered to produce a pulse which resets flip-flop FF9, thereby producing LOW from its Q terminal, which is substantially equal to terminal FC. Then, the mode is set to a waiting mode.

When terminal CF produces HIGH to establish a CF mode, the reset condition of counter CO4 is released and, at the same time, the decoder DE2 is set in a condition ready to produce output. Then, counter CO4 counts up clock pulses from inverter IN21. When it counts 24 pulses (this is equal to 3 bites) it produces an output "11000" and, thereupon, output g23 of decoder DE2 produces HIGH. The HIGH from decoder DE2 enables AND gate AN46, thereby transmitting signal therethrough from inverter IN21. Then, in response to the negative edge of the 24th pulse from terminal P3 that is in response to the positive edge of AND gate AN46, one-shot circuit OS8 produces a pulse. By the negative edge of this pulse, one-shot circuit OS10 produces a pulse. Then, by the pulse from one-shot circuit OS10, flip-flop FF11 is reset, thereby producing LOW from its Q terminal, which is substantially equal to CF terminal. Then, the mode is set to a waiting mode.

When terminal ES produces HIGH to establish an ES mode, LOW is applied from terminal P1. This LOW is applied in the following steps. When the trailing curtain of shutter mechanism completes its scan to close the shutter, X contact Sx opens, thereby turning transistor BT39 (FIG. 9b) off. Thus, terminal P1 produces LOW. By the LOW applied from terminal P1, inverter IN19 produces HIGH, thereby producing a pulse from one-shot circuit OS7. Accordingly, flip-flop FF13 is reset, thereby producing LOW from its Q terminal, which is substantially equal to ES terminal. Then, the mode is set to a waiting mode.

Now, referring to FIG. 9b, an emission amount control circuit FTC1 is shown at the right-hand bottom thereof. The detail of this circuit FTC1 will be described later in connection with FIG. 11. Coupled to the emission amount control circuit FTC1 is microcomputer MC2, the operation of which will be described in detail later in connection with FIGS. 13a, 13b, 13c and 14. During the waiting mode, all the terminals FC, CF and ES and all the outputs f0–f15 of mode determining circuit TIC produce LOW. Thus, each of NOR gates NO3 and NO5 produces HIGH. Emission amount control circuit FTC1 has an output INS which produces LOW in response to the closure of X contact Sx. The LOW, from output INS is maintained for 2.5 milliseconds and, thereafter, it changes to HIGH which is held for 1 millisecond. Then, LOW is produced for 5.5 milliseconds, and then, HIGH is produced for 2 milliseconds. Thereafter, output INS is maintained at LOW. In other words, upon closure of X contact, output INS produces two LOW pulses sequentially. The first LOW pulse is produced in response to the closure of X contact and has a pulse width of 2.5 milliseconds. The second LOW pulse is produced after the interval of 1 millisecond from the end of the first LOW pulse and has a pulse width of 5.5 milliseconds. The signal from OR gate OR2 is made LOW because AND gate AN24 is disabled by the closure of X contact Sx. Thereafter, AND gate AN21 (FIG. 9a) and OR gate OR5, the signals from terminal INS is applied to AND gates AN18 and AN19, and further to transistor BT35 and BT37. Accordingly, the signals from terminal INS is produced through line L2. In the case of waiting mode, AND gate 24 (FIG. 9b) produces HIGH when AND gate AN33 is producing HIGH at the completion of charge, and produces LOW when AND gate AN33 is producing LOW while charging. When the charge is completed, transistors BT83 and BT35 turns on to produce HIGH through line L2, but when the charge is not completed, transistors BT81 and BT37 turns on to produce LOW through line L2.

When the FC mode is established, mode determining circuit TIC produces HIGH from its output terminal FC, thereby producing LOW from NOR gate NO5 and further from AND gate AN21. When output f0 of mode determining circuit TIC produces HIGH, OR gates OR7 and OR5 produce HIGH, thereby producing HIGH on the line L2, which HIGH is the power on signal produced corresponding to bit b0, shown in Table 1.

When output f1 of mode determining circuit TIC produces HIGH, AND gate AN29 is enabled, thereby producing LOW from AND gate AN29 when switch SB1 closes upon turning of light emitter FLO2 of flash device I to bounce flashing fashion, or HIGH when switch SB1 opens upon turning of light emitter FLO2 to straight flashing fashion. Therefore, when AND gate AN29 produces HIGH, AND gate AN18 produces HIGH and AND gate AN19 produces LOW, thereby turning transistors BT83 and BT35 on. Thus, HIGH is produced through line L2. Contrary, when AND gate AN29 produces LOW, AND gate AN18 produces LOW, and AND gate AN19 produces HIGH, thereby turning transistors BT81 and BT37 on to produce LOW through line L2. This signal is the twin signal produced in response to the second bit b1, shown in Table 1.

When output f2 of mode determining circuit TIC produces HIGH, AND gate AN31 is enabled. Accordingly, signals from AND gate AN33 are transmitted therethrough. AND gate AN33 produces HIGH when both charge detectors CHD1 and CHD2 produce HIGH upon charge completion of both main capacitors C1 and C2 in flash device I. This signal from AND gate AN33 is produced on line L2 as ready signal.

When output f3 of mode determining circuit TIC produces HIGH, AND gate AN35 is turned to operative condition. Thus, the FDC signal, which is LOW when there is an indication of generation of a cease flash signal, and HIGH when there is no such an indication, from light adjustment success indication circuit INF (this will be described in detail later in connection with FIG. 12) is produced through line L2 in response to bit b3, shown in Table 1.

Then, when outputs f4 and f5 of mode determining circuit TIC, which are connected to nowhere, produce HIGH, OR gate OR5 produces LOW, AND gate AN19 produces) HIGH and AND gate AN18 produces LOW. Thus, transistors BT81 and BT37 turns on, thereby producing LOW along the line L2. These signals are produced in response to bits b4 and b5, shown in Table 1, wherein the signal in response to bit b4 is for the future use and the signal in response to bit b5 is the identification signal for the identification of the present system.

When outputs f6 and f7 of mode determining circuit TIC produces HIGH, NOR gate NO3 produces LOW, thereby producing LOW from each of AND gates AN18 and AN19. Thus, transistors BT35 and BT37 turn off, thereby transmitting the flash mode signal (see Table 1) determined in the flash controller IV through line L2 and transistor BT33 to inverter IN13. More specifically, when HIGH is sent from flash controller to the circuit of FIG. 9a through line L2, transistor BT33 turns on, thereby producing HIGH from inverter IN13. When LOW is sent through line L2, transistor BT33 turns off, thereby producing LOW from inverter IN13. While the output f6 is HIGH, AND gate AN25 is enabled, thereby transmitting the 7th clock pulse from terminal P3. In response to the negative edge of this clock pulse, D flip-flop DF3 stores a signal in response to bit b6 from terminal P2. Then, when output f7 is HIGH, AND gate AN27 is enabled, thereby transmitting the 8th clock pulse from terminal P3. Thus, D flip-flop DF5 stores a signal in response to bit b7 from terminal P2. The data stored in D flip-flops DF3 and DF5 are sent to inputs i11 and i12 of microcomputer MC2, thereby detecting the flash mode determined in the flash controller.

As understood from Table 1, when a flash device other than the flash device I described above is connected, at least one of the two D flip-flops DF3 and DF5 is storing HIGH. Therefore, OR gate OR8 produces HIGH, and AND gate AN23 produces HIGH during HIGH is produced from one of outputs f8-f15. Thus, NOR gate NO3 produces LOW, thereby forcibly stopping any data from being sent out through line L2 from the control circuit FLC1. Since the flash mode is either simultaneous or sequence flash mode, signals produced from flash controller IV in response to bits b8-b15 are transmitted through line L2 and are stored in camera body. Thus, during the presence of bits b8-b15, transistors BT35 and BT7 are maintained off to prevent any interference in the data exchange between camera body and flash controller.

Still referring to FIG. 9a, in the case where the flash mode is a single flash mode wherein only one flash is connected to the camera, data stored in flip-flops DF3 and DF5 will be both LOW. Thus the operation after the bits b6 and b7 is different from that described above. In this case, immediately after the signals LOW and LOW produced in response to bits b6 and b7, OR gate OR8 and AND gate AN23 produce LOW, and NOR gate NO3 produces HIGH. Thus, AND gates AN18 and AN19 are enabled, thereby permitting data send out from control circuit FLC1 through line L2. Then, when terminal f8 produces HIGH, OR gate OR 9 (FIG. 9b) produces HIGH. Thus, OR gate OR5 and, in turn, AND gate AN18 produces HIGH, whereby HIGH is produced on line L2, in a manner described above. This HIGH on line L2 is the power on signal (Table 1) produced in response to bit b8. Then, when HIGH is produced from terminal f9, OR gate OR9 produces LOW, thereby producing LOW on line L2. This LOW is the ID signal (Table 1) produced in response to bit b9. Then, when HIGH is produced from terminal f10, a signal representing the on or off condition of switch SB1 (FIG. 9b) is produced from AND gate AN37 (FIG. 9b) and, in turn, OR gate OR9, thereby producing HIGH on line L2. This signal on line L2 is the sequence flash (or double-action twin flash) signal (Table 1) produced in response to bit b10, and is LOW when the flash device is set in the bounce flash fashion and indicating the sequence flash mode (or double-action twin flash mode). By this LOW the camera body detects that the mode is sequence flash mode (or double-action twin flash mode). Then, when terminal f11 produces HIGH, the charge completion signal from AND gate AN33 is transmitted through AND gate AN39 and OR gate OR9 to line L2.

It is to be noted that by the HIGH from terminal FC of mode determining circuit TIC, one-shot circuit OS2 (bottom of FIG. 9a) produces a pulse which resets flip-flop FF2. Thus, in the case of single flash mode, the ready signal (or charge completion signal) produced in response to bit b11 causes transistors BT35 and BT33 to turn on, resulting in HIGH from inverter IN13, that is, from terminal P2. In this case, AND gate AN20 continues to produce LOW, and flip-flop FF2 is maintained in reset condition. Therefore, NAND gate NA5 produces HIGH, thereby enabling AND gate AN22 (FIG. 9b) to transmit start emission signal from terminal P1 to emission amount control circuit FTC1. On the contrary, when the charge is not completed, transistor BT37 turns on, thereby producing LOW on line L2. Thus, transistor BT33 turns off to produce LOW from terminal P2. Accordingly, flip-flop FF2 is set, thereby producing LOW from NAND gate NA5 in response to HIGH produced from terminal ES. Thus, AND gate AN22 is disabled. Accordingly, notwithstanding the start emission signal from terminal P1, no flash emission will be carried out. Thus, by the ready signal sent to the camera body in response to bit b11, the flash device itself determines whether or not to emit light, and by the received ready signal, the camera body determines whether or not to carry out the flash photographing operation. Thus, there will be no error operation in the system of the present invention.

In the case of multi-flash mode, no signal will be produced from the flash device during bits b8-b15, but instead, the flash controller produces in a manner described later, on line L2 HIGH when both flash devices are ready to emit light, and LOW when at least one flash device is not ready to emit light. Then, this signal will be read in the camera body as ready signal (charge completion signal), and in the flash device it is also read by flip-flop FF2, thereby determining whether or not to emit light.

As to the output on line L2 from flash device, the electric current flowing away from the flash device to produce HIGH is smaller than the electric current flowing towards the flash device to produce LOW. In other words there is an impedance difference between these two conditions, for the reason explained below.

There is a case in which two or more flash devices are connected to camera body parallelly through a suitable option-connector to emit an intensified flash light simultaneously. In such a case when terminal f11 produces HIGH to produce the charge completion signal, at least one flash device may not produce a charge completion signal while others do. In the flash device producing no charge completion signal, transistor BT37 turns on. Thus, even if the transistor BT35 in other flash device turns on, the electric current from transistor BT35 is restricted to a certain level by constant current circuit CI10 and transistor BT83. Therefore, even if transistor BT35 turns on, the electric current therefrom will be directed to transistor BT37 of flash device producing no charge completion signal. Therefore, transistor BT33 in any one of the connected flash device is maintained off, thereby setting flip-flop FF2. Thus, no light emission is effected from the flash devices connected to option-connector.

Then, when the terminal f12 of mode determining circuit TIC produces HIGH, a signal from light adjustment success indication circuit INF is transmitted through AND gate AN41, OR gate OR9 and is outputted on line L2. This signal is the FDC signal produced in response to bit b12 (Table 1), and is used in the camera body for the indication of condition of flash device. Then, when one of terminals f13, f14 and f15 is producing HIGH, OR gate OR9 produces LOW, thus, during which LOW is produced on line L2. As understood from Table 1, bits b13, b14 and b15 are preserved for the future use.

Figure 11:
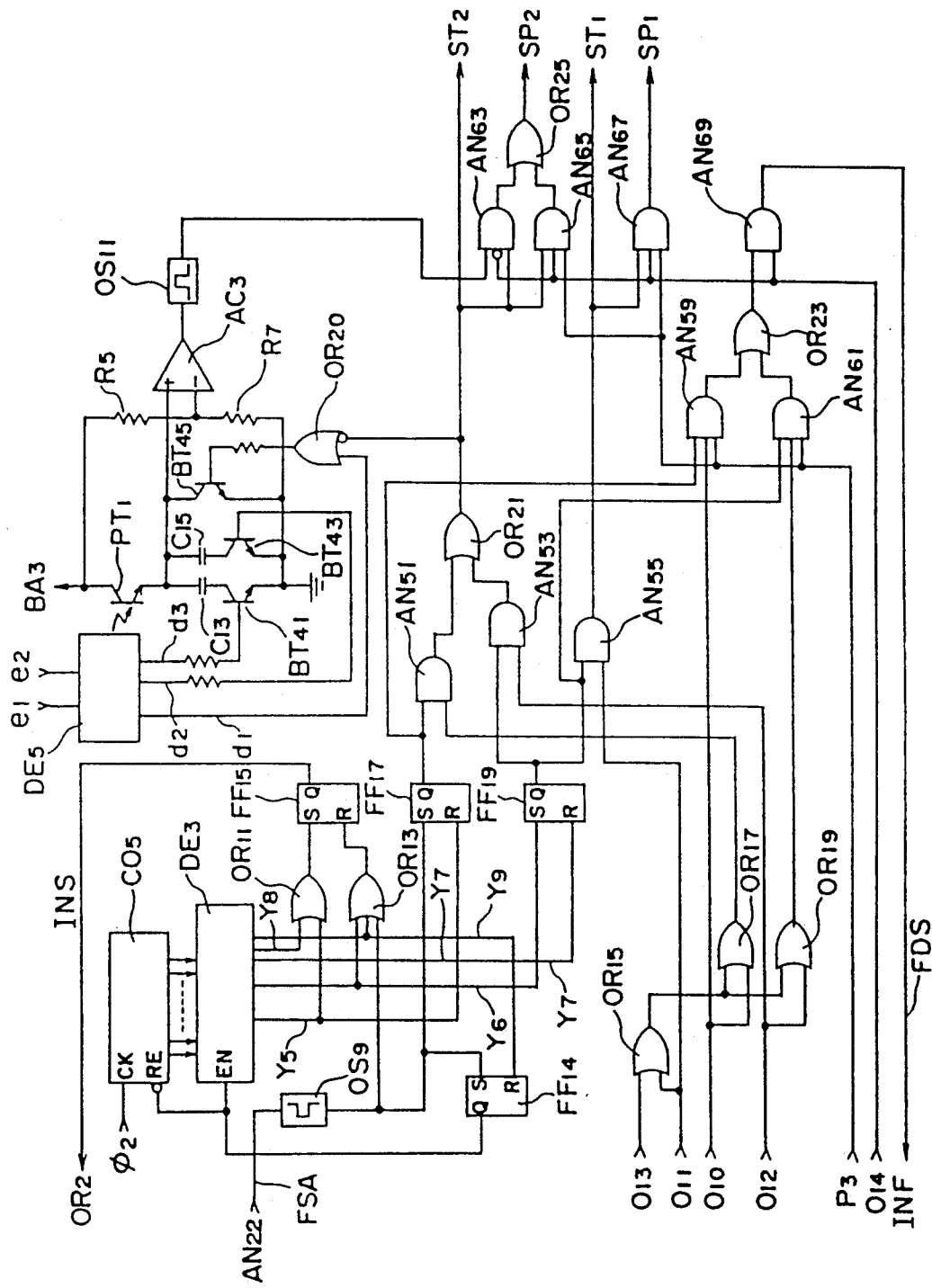
FIG. 11 is a circuit diagram showing the detail of emission amount control circuit FTC1 shown in FIG. 9b.

Next, the description is directed to the emission amount control operation under ES mode, in connection with FIGS. 9a, 9b and 11. When terminal P1 produces HIGH in response to the closure of X contact Sx of camera body (FIG. 1b-1), NAND gate NA5 produces HIGH when flip-flop FF2 is in the reset condition. And furthermore, when the charge is completed, AND gate AN22 produces HIGH along line FSA. Accordingly, one-shot circuit OS9, shown in FIG. 11, produces a HIGH pulse. By this pulse through OR gate OR13, flip-flop FF15 is reset and flip-flops FF17 and FF14 are set. Then, by a HIGH from Q terminal of flip-flop FF14, counter CO5 is released from the reset condition, and at the same time, decoder DE3 is set in a condition ready to produce output signal. Decoder DE3 has five outputs Y5, Y6, Y7, Y8 and Y9 each of which produces a HIGH pulse after a predetermined time from the HIGH produced from Q terminal of flip-flop FF14. After 2.5 milliseconds from the HIGH produced from Q terminal of flip-flop FF14, output Y5 of decoder DE3 produces a HIGH pulse. Similarly, output Y6 produces a pulse after 3.5 milliseconds from the HIGH from Q terminal of flip-flop FF14. Also, outputs Y7, Y8 and Y9 produce a pulse after 6 milliseconds, 9 milliseconds and 11 milliseconds. Flip-flop FF15 has a set terminal S connected to OR gate OR11 which is further connected to outputs Y5 and Y8, and a reset terminal R connected to OR gate OR13 which is further connected to to outputs Y6, Y9 and one-shot circuit OS9. Accordingly, for 2.5 milliseconds from the HIGH produced from Q terminal of flip-flop FF14, the Q terminal of flip-flop FF15 produces LOW. Then, it produces HIGH for 1 milliseconds (between 2.5-3.5 milliseconds), LOW for 5.5 milliseconds (between 3.5-9 milliseconds), and HIGH for 2 milliseconds (between 9-11 milliseconds). Thereafter, it produced LOW. These HIGH and LOW signals from the Q terminal of flip-flop FF15 is transmitted through line INS to OR gate OR2 (FIG. 9b). In this case, even if the charge is completed, AND gate AN24 produces LOW by the HIGH produced from terminal P1 (FIG. 9b). Thus, OR gate OR2 produces these signals applied thereto from line INS. When the mode is ES mode, NOR gate NO5 (FIG. 9a) produces HIGH, and, therefore, AND gate AN21 produces the signal supplied thereto from OR gate OR2. These signals are further transmitted in a manner described above, and are outputted to line L2. These signals are used for controlling the emission amount described above in connection with FIG. 8. In the case where this flash device is connected to a camera which does not produce a pulse that represents the mode on line L3, a HIGH produced from terminal P1 upon completion of charge is applied, since terminal ES is producing LOW, to line FSA, thereby effecting the light emission.

Referring to FIG. 9b, microcomputer MC2 has a terminal O13 which produces HIGH when the primary or first flash mode under the sequence flash mode is to be established. Terminal O11 produces HIGH when it is a double-action twin flash mode. Terminal O12 produces HIGH when the secondary or second flash mode under the sequence flash mode is to be established. Terminal O10 produces HIGH when it is a simultaneous flash mode or single flash mode. Terminal O14 produces HIGH when it is light amount auto-adjustment mode, and LOW when it is light amount manual adjustment mode. In FIG. 9b, a circuit FLD is provided for generating emission amount data for use in both light amount auto-adjustment mode and light amount manual adjustment mode. The emission amount data generating circuit FLD has two outputs e1 and e2 which are applied to decoder DE5, shown in FIG. 11, so that decoder DE5 produces 3-bit signal from its outputs d1, d2 and d3. The relationship between signals on outputs e1 and e2 and signals on outputs d1, d2 and d3, and the corresponding mode and amount of emission for each combination of signal are shown in Table 3 below.

TABLE 3

| e1 | e2 | d1 | d2 | d3 | Flash Mode | Amount of Emission |
|----|----|----|----|----|-----------|-------------------|
| H  | H  | H  | L  | L  | Auto-Adjustment | |
| H  | L  | H  | L  | L  | Manual Adjustment | Full amount |
| L  | H  | L  | H  | L  | Manual Adjustment | ½ of Full amount |
| L  | L  | L  | L  | H  | Manual Adjustment | ¼ of Full amount |

As understood from Table 3, only terminal d2 of decoder DE5 (FIG. 11) produces HIGH when it is required to emit ½ of full amount. In this case, transistor BT43 turns on, thereby defining a current path between power source BA3 and ground through phototransistor PT1, capacitor C15 and transistor BT43. Phototransistor PT1 is provided to receive directly the light emitted from light emitter FLO2 and produces current which is in relation to the intensity of emitted light. Light emitter FLO2 emits light in response to HIGH (start emission signal) from OR gate OR21 through line ST2. Since the start emission signal is also applied through OR gate OR20 to transistor BT45, transistor BT45 is maintained on before the emission of flash light, thereby discharging capacitor C15. Then, in response to the start emission signal, light emitter FLO2 starts to emit light and, at the same time, capacitor C15 starts to charge current corresponding to the the light emitted from light emitter FLO2, as detected by phototransistor PT1. Thus, the voltage charged across capacitor C15 is in relation to the amount of light emitted from light emitter FLO2, and is provided to non-inverting input of comparator AC3. When the charged voltage across capacitor C15 exceeds a predetermined voltage determined by resistors R5 and R7, comparator AC3 produces a HIGH SIGNAL which is applied to one-shot circuit OS11, thereby producing a HIGH pulse (stop emission signal). The stop emission signal is applied through AND gate AN63 and OR gate OR25 through line SP2, so as to stop the emission of flash light from light emitter FLO2.

When it is required to emit ¼ of full amount, only terminal d3 of decoder DE5 produces HIGH. In this case, transistor BT41 turns on, thereby defining a current path between power source BA3 and ground through phototransistor PT1, capacitor C13 and transistor BT41. It is to be noted that the capacitance of capacitor C13 is equal to half the capacitance of capacitor C15. Therefore, stop emission signal is produced when the charged amount reaches half the amount of that charged capacitor C15.

When it is required to emit full amount or automatically adjusted amount of light from light emitter FLO2, only terminal d1 of decoder DE5 produces HIGH, thereby producing HIGH from OR gate OR20. Thus, transistor BT45 is maintained on to prevent one-shot circuit OS11 from producing any stop emission signal.

Still referring to FIGS. 9a, 9b and 11, an operation under double-action twin flash mode is described. In this case, microcomputer MC2 (FIG. 9b) produces HIGH from its output O11, thereby producing HIGH from OR gates OR15, OR17 and OR19. Therefore, in this case, after the closure of X contact Sx, AND gate AN51 (center of FIG. 11) produces HIGH for 2.5 milliseconds, which HIGH is transmitted through OR gate OR21 on line ST2, serving as the first start emission signal. Thus, light emitter FLO2 starts the light emission. In this case, if the mode is auto-adjustment shown in Table 3, AND gate AN65 is being enabled. Thus, the first stop emission signal, which is sent from the camera body through terminal P3, is transmitted through AND gate AN65, OR gate OR25 to line SP2, thereby stopping the emission of flash light from light emitter FLO2. On the contrary, if the mode is manual adjustment mode shown in Table 3, AND gate AN63 is being enabled. Thus, the first stop emission signal, which is sent from one-shot circuit OS11, is applied through AND gate AN63, OR gate OR25 to line SP2, thereby stopping the emission of flash light from light emitter FLO2.

Then, between 3.5 and 6 milliseconds from the closure of X contact Sx, AND gate AN55 produces HIGH, which is transmitted through line ST1, serving as the second start emission signal. Thus, light emitter FLO1 starts the light emission. In this case, if the mode is auto-adjustment and microcomputer MC2 (FIG. 9b) is producing HIGH from its output O14, the second stop emission signal applied thereto from terminal P3 is transmitted through AND gate AN67 to line SP1, thereby stopping the emission of flash light from light emitter FLO1. Also, the second stop emission signal is applied through AND gate AN61, OR gate OR23 and AND gate AN69 to light adjustment success indication circuit INF. On the contrary, if the mode is manual adjustment mode, microcomputer MC2 continuers to produce LOW, thereby no stop emission signal is produced from AND gate AN67. Thus, light emitter FLO1 flashes with its full amount.

Next, an operation under simultaneous flash mode or single flash mode is described. In this case, microcomputer MC2 (FIG. 9b) produces HIGH from its output O10, thereby producing HIGH from OR gate OR17. Therefore, in this case, after the closure of X contact Sx, AND gate AN51 (center of FIG. 11) produces HIGH for 2.5 milliseconds, which HIGH is transmitted through OR gate OR21 on line ST2, serving as the start emission signal. Thus, light emitter FLO2 starts the light emission. In this case, if the mode is auto-adjustment shown in Table 3, the stop emission signal, which is sent from terminal P3, is transmitted through AND gate AN65, OR gate OR25 to line SP2, thereby stopping the emission of flash light from light emitter FLO2. On the contrary, if the mode is manual adjustment mode, the stop emission signal, which is sent from one-shot circuit OS11, is applied through AND gate AN63, OR gate OR25 to line SP2, thereby stopping the emission of flash light from light emitter FLO2. In this case, no start emission signal will be produced on line ST1 and, therefore, light emitter FLO1 remains non-actuated. Also, the stop emission signal, which has been applied from terminal P3 within 2.5 milliseconds from the closure of X contact Sx, is fed to light adjustment success indication circuit INF through AND gate AN59, OR gate OR23 and AND gate AN69.

Next, an operation under sequence flash mode is described. In the case of the first flash light emission in this mode, microcomputer MC2 (FIG. 9b) produces HIGH from its output O13, thereby producing HIGH from OR gates OR15, OR17 and OR19. Therefore, after the closure of X contact Sx, line ST2 produces HIGH for 2.5 milliseconds. Thus, light emitter FLO2 starts the light emission. In this case, if the mode is auto-adjustment, the emission of flash light stops in response to the stop emission signal from terminal P3, and if the mode is manual adjustment mode, the emission of flash light stops in response to the stop emission signal from one-shot circuit OS11. Also, the stop emission signal, which is sent from terminal P3 between 3.5–6 milliseconds from the closure of X contact Sx, is applied through AND gate AN61, OR gate OR23 and AND gate AN69 to light adjustment success indication circuit INF. Therefore, even if it did not reach ⅔ of the necessary amount for the proper exposure by the first flash light, FDC display, for the indication of sufficient amount of light for the proper exposure, will be effected if the emitted light amount in total of the first and second flash lights reaches the necessary amount.

On the other hand, in the case of the second flash light emission, microcomputer MC2 (FIG. 9b) produces HIGH from its output O12, thereby AND gate AN53 becomes enabled. Between 3.5 and 6 milliseconds from the closure of X contact Sx, AND gate AN53 produces HIGH, thereby emitting flash light from light emitter FLO2. Light emitter FLO2 stops emission in response to the stop emission signal on line SP2 produced from terminal P3 or from one-shot circuit OS11. Also, the stop emission signal, which is sent from terminal P3 between 3.5-6 milliseconds from the closure of X contact Sx, is applied to light adjustment success indication circuit INF. In the sequence flash mode described above, no flash light will be emitted from light emitter FLO1, if the employed flash device is the double flash-head type I.

Figure 12:
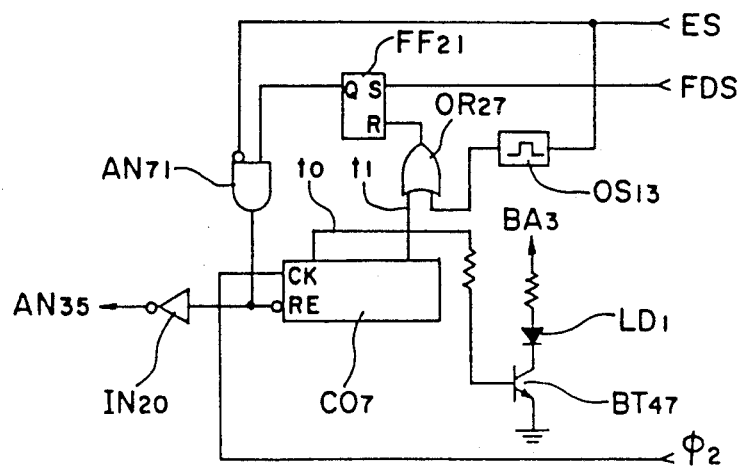
FIG. 12 is a circuit diagram showing the detail of light adjustment success indication circuit INF shown in FIG. 9b.

Referring to FIG. 12, the description is directed to light adjustment success indication circuit INF. When the stop emission signal from control circuit FTC1 is produced on line FDS, flip-flop FF21 is set. At this moment, when the mode is ES mode, HIGH is provided on line ES from mode determining circuit TIC (FIG. 9a). Therefore, AND gate AN71 produces LOW, thereby holding the counter CO7 in the reset condition. Then, when it becomes waiting mode to provide LOW on line ES, AND gate AN71 produces HIGH, thereby producing LOW from inverter IN20 to transmit FDC signal to AND gate AN35 (FIG. 9b). Also, by the HIGH from AND gate AN71, counter CO7 is released from its reset condition, thereby starting the count of clock pulses $\phi 2$ from microcomputer MC2. Counter CO7 has two outputs t0 and t1. Output t0 produces a train of pulses having a frequency of 8 Hz for turning transistor BT47 on and off repeatedly. Thus, light emitting diode LD1 connected to transistor BT47 blinks with a frequency of 8 Hz. Output t1 produces a high pulse after 3 seconds from the start counting of counter CO7. The HIGH produced from output t1 is applied through OR gate OR27 to flip-flop FF21, thereby resetting flip-flop FF21. Thus, counter CO7 is reset and, at the same time, inverter IN20 produces HIGH. Furthermore, light emitting diode LD1 stops light emission.

In the case where the photographings are carried out successively with a very short intervals, the ES mode may be established during the blinking of light emitting diode LD1. In such a case, when mode determining circuit TIC produces HIGH from its output ES, AND gate AN71 produces LOW, and inverter IN20 produces HIGH. Furthermore, counter CO7 is turned to reset condition, thereby forcibly stop blinking the light emitting diode LD1. Furthermore, by the HIGH from the output ES, one-shot circuit OS13 produces a pulse which resets flip-flop FF21.

Now, referring to FIGS. 13a, 13b, 13c and 14, the operation of microcomputer MC2 is described. When it becomes CF mode, mode determining circuit TIC produces HIGH from its output CF which is applied to interruption terminal iT of microcomputer MC2. Thereupon, microcomputer MC2 starts operation from step S3 shown in FIG. 13a. At step S3, the terminal interruption is permitted. When the terminal interruption starts, the data transmitted to terminal SIN from terminal P2 are taken in microcomputer MC2 in accordance with the clock pulses applied to terminal SCK from terminal P3. Then, the aperture value data Avf for the flash photographing is stored in a certain register in microcomputer MC2. Next, similarly, various serial data (such as film sensitivity Sv, exposure control mode) are stored in different registers in microcomputer MC2. Furthermore, 1-bite long data fv, representing the focal length of lens, is stored in a certain register in microcomputer MC2. By the above steps, data are transferred from camera body to microcomputer MC2. Then, to count a predetermined period of time (such as 10 seconds), necessary data is stored in an internally provided counter which then starts counting (step S10). When the predetermined time has been counted, interruption is permitted Then, at steps S12 and S13, respectively, it is detected whether terminals i13 and i14 are receiving HIGH or not to determined the selected mode for flash as indicated in Table 3. When both terminals are receiving HIGH, as happens when the selected mode is auto-adjustment mode, the program goes to step S15. On the contrary, when at least one of two inputs i13 and i14 is receiving "LOW", microcomputer MC2 further detects whether or not the data representing the exposure control mode as obtained from camera body is for the manual mode or not. If the data representing the exposure control mode as obtained from camera body is for the manual mode, the program goes to step S18. If it is not for the manual mode, even if the mode set in the flash device is a manual mode, the program follows the auto-adjustment mode, and therefore, the program goes to step S15. At step S15, a display for the indication of the auto-adjustment is effected. Then, output O14 produces HIGH (step S16), and "1" is assigned to flag (AMF). Thereafter, the program goes to step S21. Contrary, at step S18, a display for the indication of the manual adjustment is effected. Then, output O14 produces LOW and "0" is assigned to flag (AMF). Thereafter, the program goes to step S21.

Figures 13, 13A:
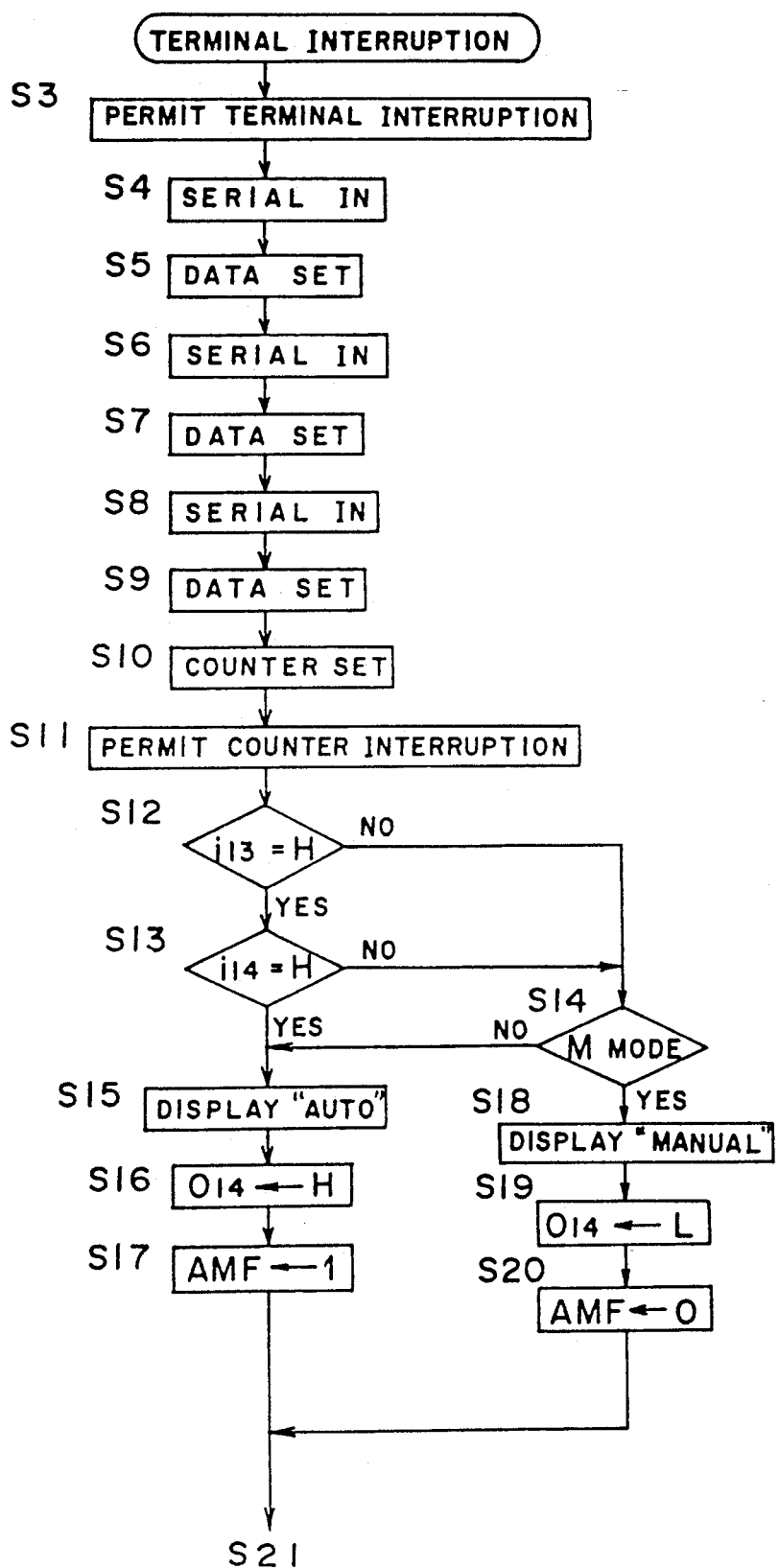
FIGS. 13a, 13b and 13c taken together as shown in FIG. 13 show a flow chart of operation carried out by microcomputer MC2 shown in FIG. 9b.
Figure 13B:
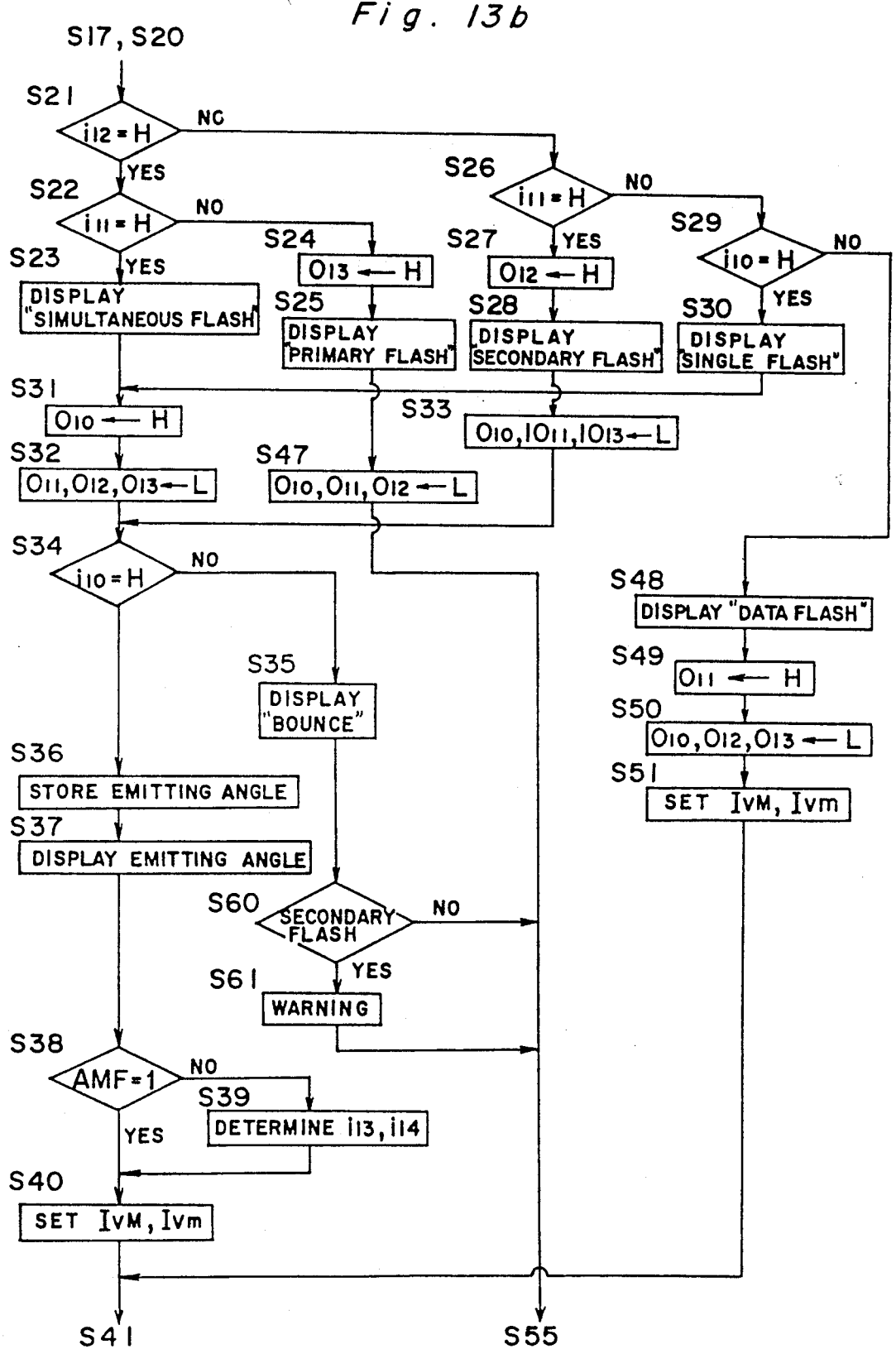

Referring to FIG. 13b, at steps S21 et seq., it is determined which one of the flash modes has been selected in accordance with the signal applied to inputs i10, i11 and i12. When inputs i12 and i11 are both receiving HIGH, the required mode is the simultaneous flash mode and, therefore, the program goes to step S23 for the display of simultaneous flash mode. Thereafter, HIGH is produced from output O10, and LOW is produced from each of outputs O11, O12 and O13. Then, the program goes to step S34. At step S34, it is detected whether or not input i10 is producing HIGH. If input i10 is producing HIGH indicating that the flash device is arranged in the straight flashing fashion, the program goes to step S36. On the contrary, if input i10 is producing LOW indicating that the flash device is arranged in the bounce flashing fashion, the program goes to step S35 for the indication of bounce flashing fashion and further to step S60.

When input i12 is receiving HIGH and input i11 is receiving LOW, the required mode is the sequence flash mode and particularly for effecting the first or primary flash of the sequence flash mode. In this case, the program goes to step S24 for producing HIGH from output O13 and then to step S25 for the display of primary flash. Thereafter, LOW is produced from each of outputs O10, O11 and O12. Then, the program goes to step S55.

When input i12 is receiving LOW and input i11 is receiving HIGH, the required mode is the sequence flash mode and particularly for effecting the secondary flash of the sequence flash mode. In this case, the program goes to step S27 for producing HIGH from output O12 and then to step S28 for the display of secondary flash. Thereafter, LOW is produced from each of outputs O10, O11 and O13. Then, the program goes to step S34.

When both inputs i12 and i11 are receiving LOW indicating that only one flash device I is connected directly or through the flash controller, the program goes to step S29. At step S29, it is detected whether input i10 is receiving HIGH or not. If input i10 is producing HIGH indicating that the flash device is arranged in the straight flashing fashion, the program goes to step S30 for the display of single flash. On the contrary, if input i10 is producing LOW indicating that the flash device is arranged in the bounce flashing fashion, the program goes to step S48 for the indication of double-action twin (DAT) flash mode. Thereafter, the program goes to step S49 to produce HIGH from output O11 and to step S50 to produce LOW from each of outputs O10, O12 and O13. Then, in accordance with the maximum and minimum available light amount from light emitter FLO1, a maximum controllable amount IvM and minimum controllable amount Ivm are set at step S51 and, thereafter, the program goes to step S41.

At step S36, data indicating the flash shooting angle as produced from angle data generator ZD (FIG. 9b) upon turning of light emitter FLO2, is stored, and at step S37, the flash shooting angle is displayed. Then, it is detected whether or not flag AMF is carrying "1". If it is carrying "1", the program goes to step S40, and if not, the level of signals at inputs i13 and i14 are detected. Then, in the case of auto-adjustment mode or manual adjustment mode with the full emission, IvM and Ivm are set, respectively, for the maximum and minimum controllable amount of the light emitter FLO2. In the case of manual adjustment mode, but other than the full emission, the set maximum controllable amount corresponds to the amount of emission indicated in Table 3. After setting the maximum and minimum controllable amounts IvM and Ivm in the above described manner, the program goes to step S41.

At step S41, it is detected whether or not an interchangeable lens is properly mounted on the camera body. If the lens is not mounted, or not properly mounted, on the camera body, it is displayed that no lens is mounted and, thereafter, the program goes to step S59. Furthermore, if the lens is not mounted, a special data is sent in place of the data Avf for the aperture value to the flash device. Thus, the flash device, upon receipt of the special data, detects that the no lens is mounted. On the contrary to the above, if it is detected at step S41 that an interchangeable lens is properly mounted, the program goes to step S43 to carry out calculations:

$$IvM + Sv - Avf = DvM$$

and $$Ivm + Sv - Avf = Dvm, \quad (15)$$

wherein DvM and Dvm are the maximum and minimum distances, respectively, which the flash light can shoot with the proper exposure. Thereafter, at step S45, it is detected whether or not the minimum shooting distance Dvm is shorter than a lower limit shooting distance DvL determined, for example, by parallax. In the case where $$Dvm < DvL,$$

DVL is used, in place of Dvm, for the minimum distance. Thereafter, the program goes to step S52.

At step S52, it is detected whether the flag AMF is carrying "1" or not. If the flag AMF is carrying "1" representing the auto-adjustment mode, a controllable range of distance is determined by the maximum controllable light amount IvM and minimum controllable light amount Ivm, and the determined range is displayed. Contrary, if the flag AMF is carrying "0" representing the manual adjustment mode, a photographing distance which gives the proper exposure is determined by maximum controllable light amount IvM, and the determined photographing distance is displayed. Then, the aperture value determined by the data Avf for the aperture value under flash photographing, focal length determined by the data fv for the focal length of the mounted lens, and film sensitivity determined by the data Sv for the film sensitivity are displayed. Thereafter, the program returns back to step S12 to repeat the operations of data reading, calculation and display. Then, when the output CF of mode determining circuit TIC (FIG. 9a) provides HIGH to interruption input iT of microcomputer MC2, the operation from step S3 is repeated. It is to be noted that at step S55, a determination whether a lens is mounted or not, as in step S41, is carried out. If a lens is mounted, the program goes to step S57, and if not, no lens is displayed and, thereafter, the program goes to step S59.

The modes which provide the controllable range of distance or the photographing distance which gives the proper exposure are the simultaneous flash mode, single flash mode, the second flashing under the sequence flash mode (provided that, for all these modes, the flash device is not arranged in the bounce flashing fashion, but in the straight flashing fashion), and double-action twin flash mode. In the case of double-action twin flash mode, the controllable range of distance or the photographing distance which gives the proper exposure which will be displayed is based on the light emitter FLO1. Accordingly, in the case of the first flashing under the sequence flash mode, simultaneous flash mode and the second flashing under the sequence flash mode (provided that, for all these modes, the flash device is arranged in the bounce flashing fashion), no display is effected for the controllable range of distance or for the photographing distance which gives the proper exposure. It is to be noted that in the case of the simultaneous flash mode, the second flashing under the sequence flash mode, or the single flash mode, provided that for all these modes the flash device is arranged in the bounce flashing fashion, a display for the indication of bounce flashing is effected at step S35. Thereafter, the program goes to step S60. Furthermore, since it is very rare to provide a proper exposure when light emitter FLO2 is in the bounce flashing fashion for the second flashing under the sequence flash mode, a warning is produced at step S61. Thereafter, the program goes to step S55.

Figure 14:
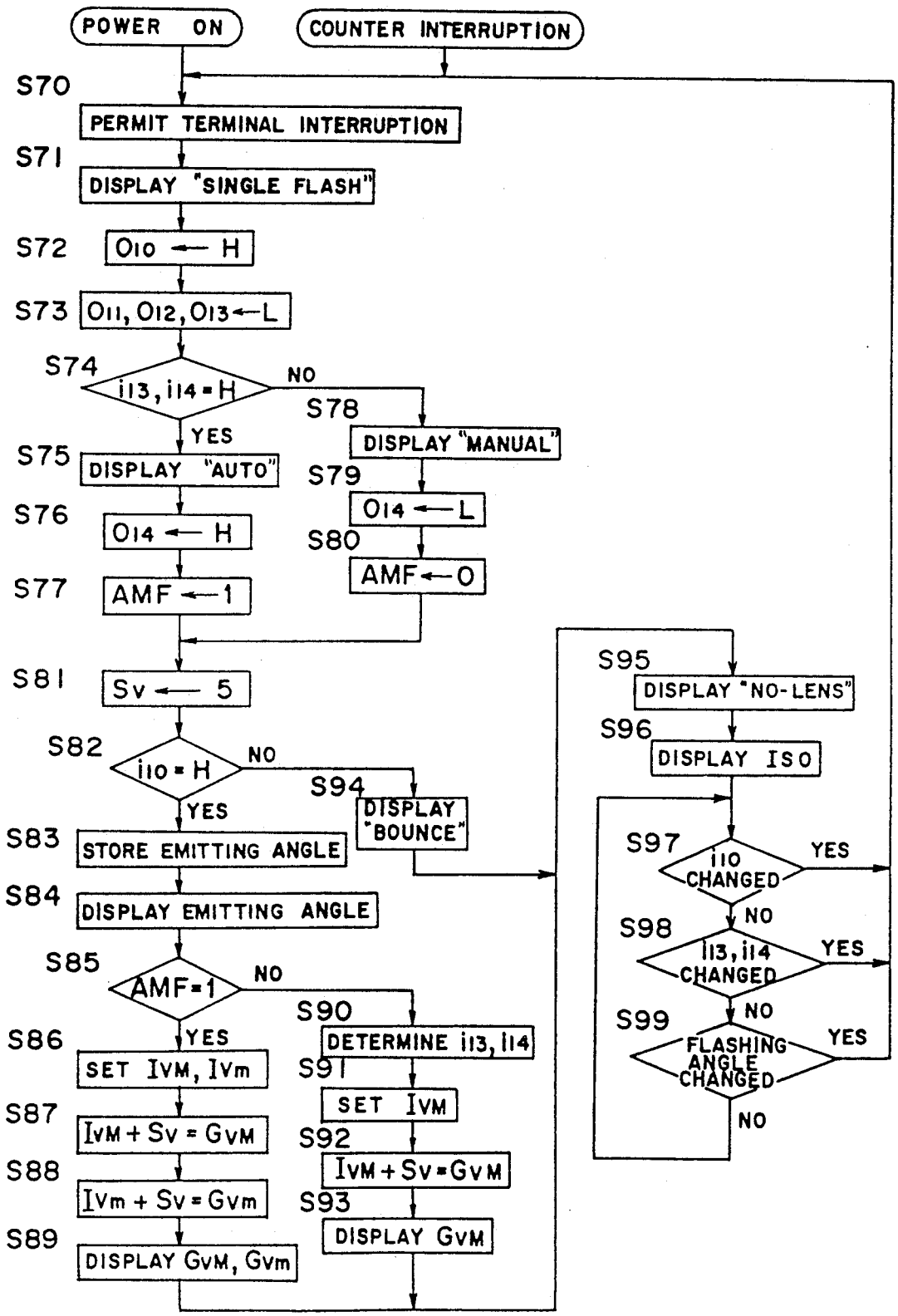
FIG. 14 shows a flow chart carried out upon supply of power to microcomputer MC2 shown in FIG. 9b.

Referring to FIG. 14, when microcomputer MC2 is supplied with an electric power, it follows the program after step S70. At step S70, display FDP1 is erased and, at the same time, an interruption to terminal iT is permitted. Then, in order to establish the simultaneous or single flash mode, output O10 produces HIGH, and outputs O11, O12 and O13 produces LOW and, thereafter, the program goes to step S74.

At step S74, it is detected whether or not the mode is an auto-adjustment mode in accordance with the signal applied to inputs i13 and i14. If the detected mode is an auto-adjustment mode, "AUTO" is displayed and, then, HIGH is produced from output O14 and "1" is assigned to flag AMF. Then, the program goes to step S81. If the detected mode is not an auto-adjustment mode, "MANUAL" is displayed and, then, LOW is produced from output O14. Then, "0" is assigned to flag AMF and, the program goes to step S81. At step S81, "5" is assigned to register (Sv) for the indication of ISO 100. Then, at step S82, a signal from input i10 is detected for the determination whether or not light emitter FLO2 is arranged in the bounce flashing fashion. If it is in the bounce flashing fashion, "BOUNCE" is displayed at step S94, and the program advances to step S95. If it is detected at step S82 that light emitter FLO2 is in the straight flashing fashion, the program goes to step S83 for reading the flash shooting angle as produced from angle data generator ZD (FIG. 9b), and the read angle is displayed. Then, it is detected whether or not the flag AMF is carrying "1" representing the auto-adjustment mode. If the mode is auto-adjustment mode, the maximum and minimum controllable amounts IvM and Ivm, respectively, for the detected flash shooting angle are set. Then, $$IvM + Sv = GvM$$

and $$Ivm + Sv = Gvm$$

are calculated for the display of maximum and minimum guide numbers GvM and Gvm, respectively, for the film having an ISO 100. Then, the program goes to step S95. On the contrary, at step S85, if it is detected that the flag AMF is carrying "0" representing the manual mode, signals applied to inputs i13 and i14 are determined, and the maximum controllable amount IvM based on the detected flash shooting angle is set. Then, a calculation, $$GvM = IvM + Sv$$

is carried out for the display of guide number GvM based on the set values. Thereafter, the program goes to step S95.

At step S95, in order to indicate that no data related to the lens has been transmitted from the camera body, "NO LENS" is displayed. It is further displayed that the film has ISO 100. Then, the program goes to step S97. At step S97, S98 and S99, it is repeatedly checked whether or not any change is made to the settings effected by the external setting means. If any change has been made in the setting, the program returns to step S70 to repeat the above described operation and also to change the display.

In the case where no interruption signal is transmitted within a certain period of time (such as 10 seconds) from the supply of interruption signal from terminal CF to input iT, the microcomputer itself starts the interruption (such an interruption is referred to as a counter interruption) when an internally provided counter has counted a predetermined time. Thereupon, the microcomputer carries out the program from step S70. Thus, in this case, for the 10 seconds after the stop supply of the data from the camera body, a display based on the data from the camera body is effected. After that 10 seconds, the data which can be obtained by the values set in the flash device is displayed.

Next, with reference to FIGS. 15a, 15b, 16 and 17, the flash devices II and III are described.

Figure 15A:
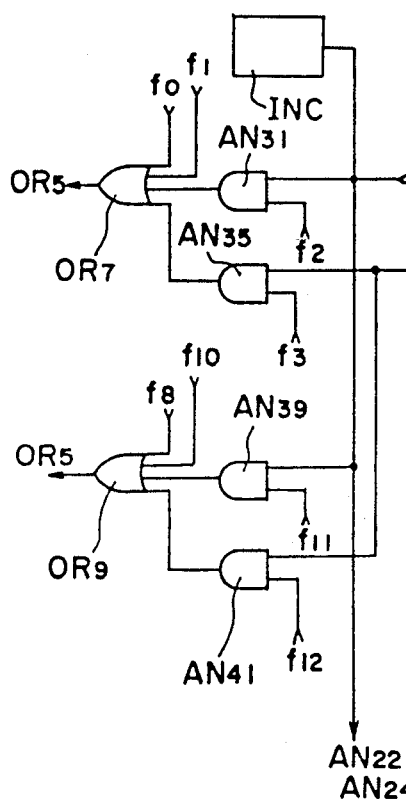
FIGS. 15a and 15b show parts of control circuit FLC2 or FLC3 shown in FIG. 1b-2, and particularly showing parts which are different from circuit FLC1 shown in FIG. 9b as enclosed by dotted lines XVa and XVb, respectively.
Figure 15B:
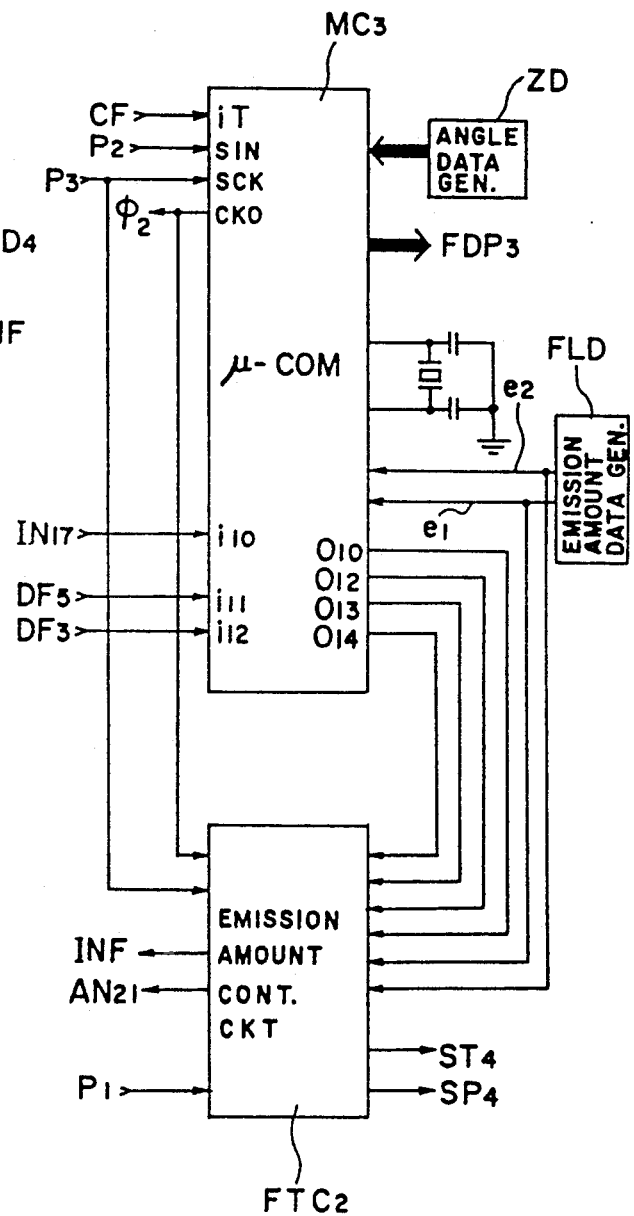

Referring to FIGS. 15a and 15b, parts of control circuit FLC2 or FLC3 which are different from control circuit FLC1 shown in FIG. 9b, are shown. More particularly, FIG. 15a shows a part corresponding to a dotted-line block XVa in FIG. 9b, and FIG. 15b shows a part corresponding to a dotted-line block XVb in FIG. 9b. The flash device II or III has only one light emitter FLO3 or FLO4 and, therefore, the double-action twin flash mode is not available. Therefore, in the case of FC mode, it is not necessary to indicate at bits b1 and b10 the twin flash mode. Thus, terminals f1 and f10 of mode determining circuit TIC are directly connected to OR gates OR7 and OR9, respectively, and therefore, HIGH is produced in response to bit b1 and b10. Furthermore, microcomputer MC3 has no output O11 that produces HIGH representing the double-action twin flash mode.

Figure 16:
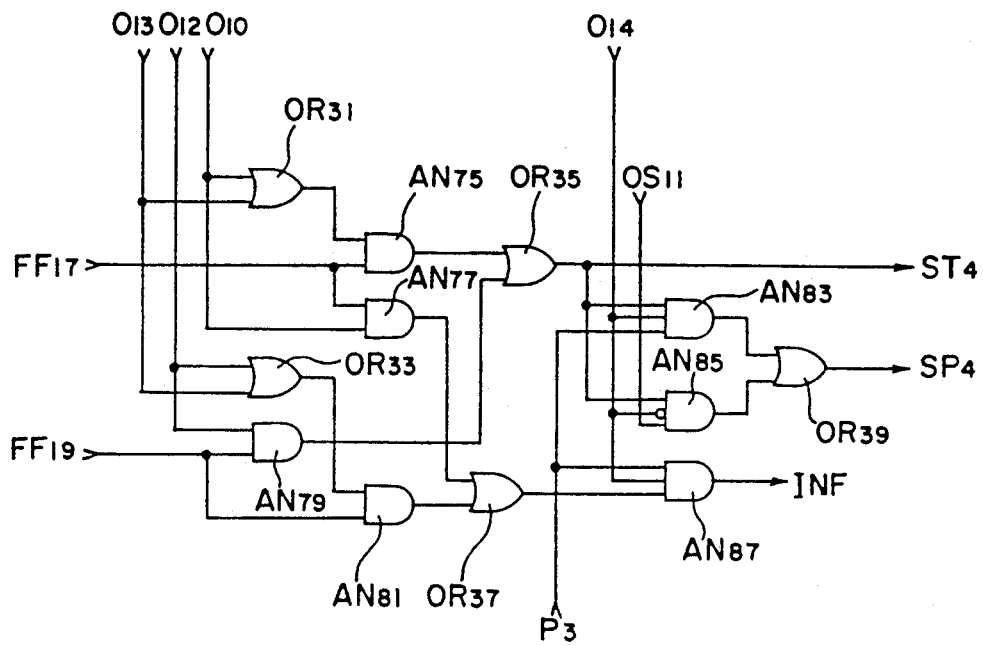
FIG. 16 shows a part of emission amount control circuit FTC2 which is different from circuit FTC1 shown in FIG. 11.

Referring to FIG. 16, a part of an emission amount control circuit FTC2 which is different from that shown in FIG. 11 is shown. Under the simultaneous or single flash mode, output O10 of microcomputer MC3 (FIG. 15b) produces HIGH which is applied to OR gate OR31 and to AND gate AN75, thereby enabling AND gate AN75. Accordingly, AND gate AN75 transmits HIGH for 2.5 milliseconds from the closure of X contact Sx in the camera body as produced from flip-flop FF17 (FIG. 11). This 2.5 milliseconds long HIGH pulse is applied through OR gate OR35 and through line ST4 to light emitter FLO3 or FLO4 (FIG. 1b-2), thereby starting the emission of flash light. If the adjustment mode is an auto-adjustment mode, stop emission signal produced from terminal P3 is applied through AND gate AN83, OR gate OR39 to terminal SP4 thereby stopping the light emission from light emitter FLO3 or FLO4. The stop emission signal is also applied through AND gate AN87 to light adjustment success indication circuit INF, thereby displaying that the light adjustment has been completed successfully. On the contrary, if the adjustment mode is a manual adjustment mode, a pulse produced from one-shot circuit OS11 (FIG. 11) is applied through AND gate AN85 and OR gate OR39 to line SP4, thereby stopping the light emission. For the first flashing under the sequence flash mode, output O13 of microcomputer MC3 (FIG. 15b) produces HIGH, thereby producing HIGH from OR gates OR31 and OR33. Then, when flip-flop FF17 provides HIGH through AND gate AN75 and OR gate OR35 in response to the closure of X contact Sx, light emitter FLO3 or FLO4 starts the light emission. In a similar manner described above, the light emission stops in response to the emission stop signal. As to light adjustment success indication circuit INF, a HIGH pulse produced from flip-flop FF19 for 2.5 milliseconds after passing 3.5 milliseconds from the closure of X contact Sx is transmitted, if the mode is auto-adjustment mode, through AND gate AN81 and OR gate OR37 to AND gate AN87. During this 2.5 milliseconds, the stop emission signal is sent from terminal P3 through AND gate AN87 to circuit INF. For the second flashing under the sequence flash mode, output O12 produces HIGH, thereby producing HIGH from OR gate OR33. Then, the HIGH pulse produced from flip-flop FF19 for 2.5 milliseconds after passing 3.5 milliseconds from the closure of X contact Sx is transmitted through AND gate AN79 and OR gate OR35, thereby starting the light emission. Then, in accordance with the stop emission signal provided from terminal P3 or from one-shot circuit OS11, the light emission stops. In this case, if the mode is auto-adjustment mode, the stop emission signal provided from terminal P3 is applied through AND gate AN87 to light adjustment success indication circuit INF.

Figure 13C:
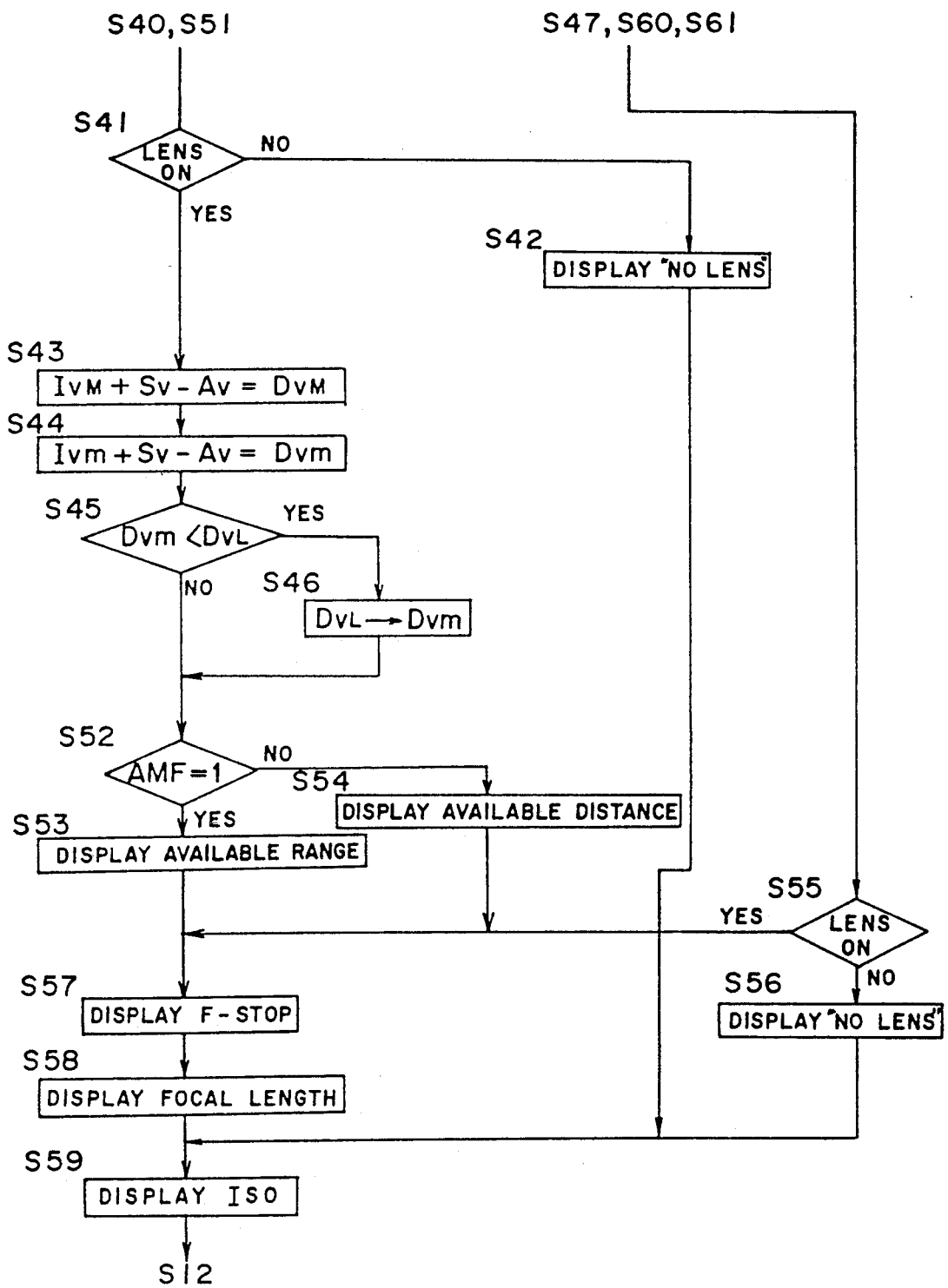
Figure 17:
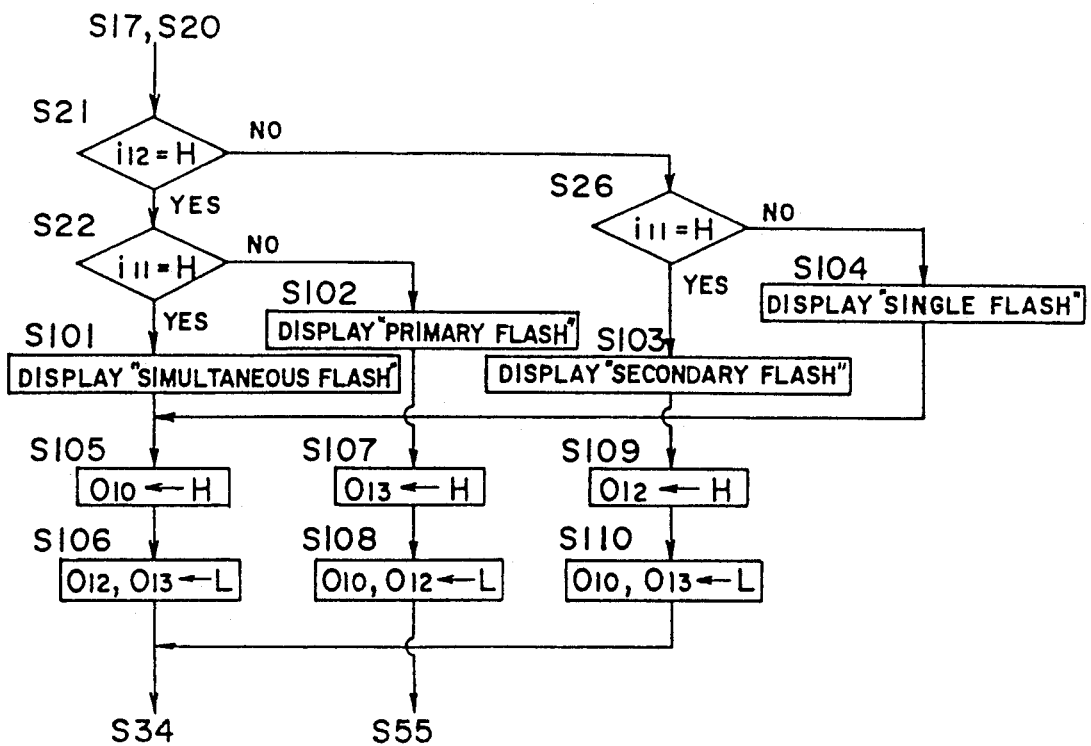
FIG. 17 shows a part of flow chart of microcomputer MC3, shown in FIG. 15b, and particularly showing a portion which is different from that shown in FIGS. 13a-13c.

Referring to FIG. 17, a part of a flow chart of microcomputer MC3 (FIG. 15b) which is different from that shown in FIGS. 13a-13c is shown. In the procedure from step S21 et seq., the desired flash mode is determined in accordance with the signal from outputs i11 and i12. When HIGH is produced from two outputs i12 and i11, it is understood that the simultaneous flash mode is selected and, therefore, the simultaneous flash mode is displayed at step S101. Then, at step S105, output O10 produces HIGH and, then, at step S106 outputs O12 and O13 produce LOW. Thereafter, the program goes to step S34 to detect whether or not the flash device is arranged in bounce flashing fashion.

Back again to step S21, when HIGH is produced from output i12 and LOW is produced from output i11, the mode is primary flash of the sequence flash mode. Thus, at step S102, the primary flash is displayed. Then, output O13 produces HIGH and outputs O10 and O12 produces LOW. Thereafter, the program goes to step S55 of FIG. 13c.

At step S21, when LOW is produced from outputs i12 and HIGH is produced from output i11, representing the secondary of the sequence flash mode, the secondary flash is displayed at step S103. Then, output O12 produces HIGH and outputs O10 and O13 produces LOW and, thereafter, the program goes to step S34.

At step S21, when LOW is produced from both outputs i12 and i11, a single flash is displayed. Then, the program goes to step S105.

Figure 18:
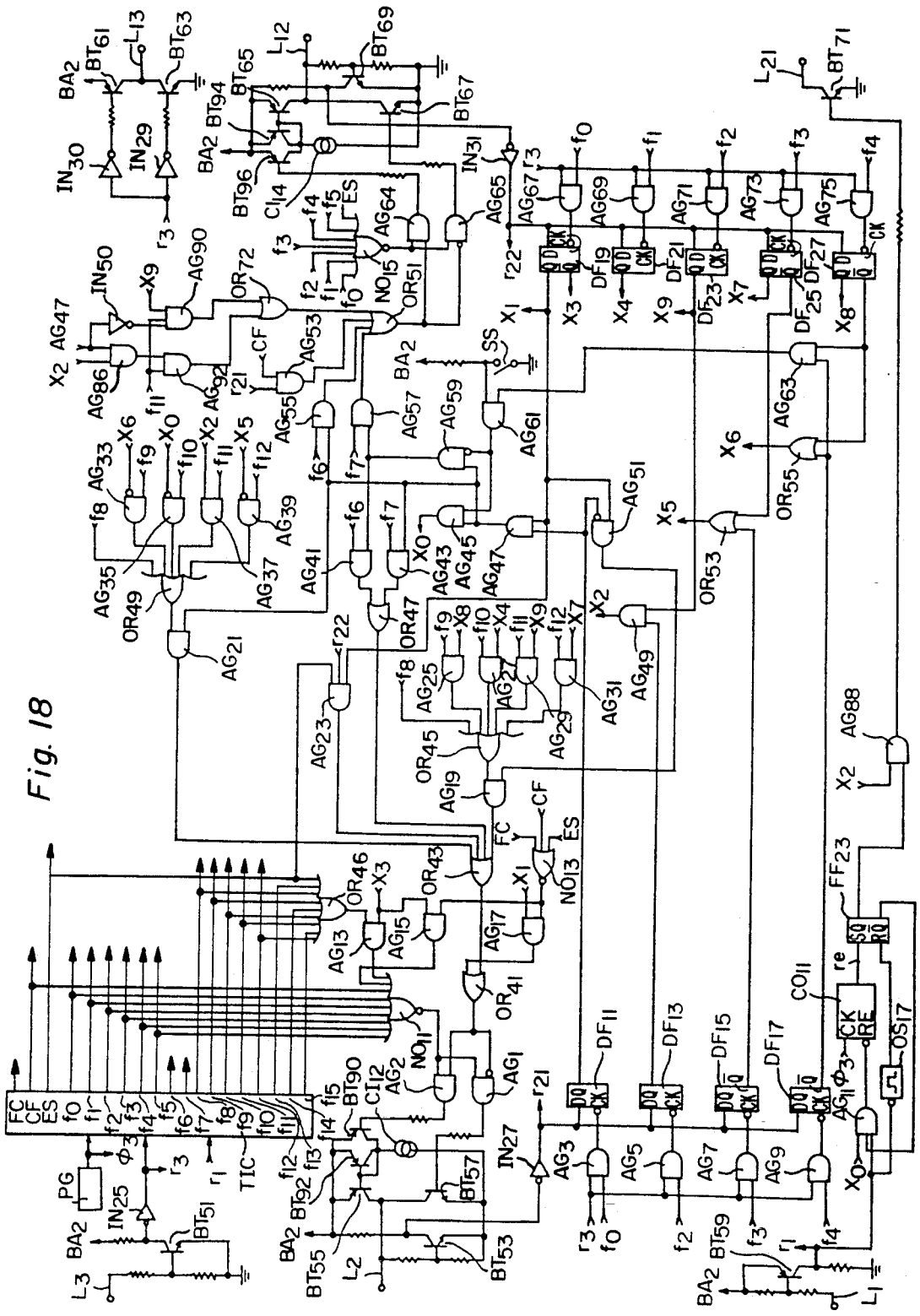
FIG. 18 is a circuit diagram showing the detail of flash control circuit CNC shown in FIG. 1b-1.

Referring to FIG. 18, a detail of flash control circuit CNC is shown. At upper left corner of FIG. 18, mode determining circuit TIC, which has been described in detail before in connection with FIGS. 9 and 10 is shown. The operation under FC mode is described. While mode determining circuit TIC is producing HIGH from one of its outputs f0-f5, NOR gates NO11 and NO15 produce LOW, thereby disabling AND gates AG2, AG64, AG1 and AG65 to establish a condition for reading data on lines L2 and L12. Thus, the signals on line L2 are transmitted through transistor BT53 and inverter IN27 to line r21, whereas the signals on line L12 are transmitted through transistor BT69, inverter IN31 to line r22. Then, the signals appearing on line r22 in response to bits b0, b1, b2, b3 and b5 are stored in D flip-flops DF19, DF21, DF23, DF25 and DF27, respectively. When the sequence flash mode is selected, switch SS is held opened, and when the simultaneous flash mode is selected, switch SS is held closed. When two flash devices are connected, D flip-flops DF11 and DF19 produce HIGH from their Q terminals. Thus, AND gate AG47 produces HIGH. When two flashes are not connected, at least one of D flip-flops DF11 and DF19 produces LOW from its Q terminal. Thus, AND gate AG47 produces LOW, and in turn, AND gates AG45 and AG59 produce LOW. The output of AND gate AG45 is connected to a line X0. D flip-flops DF17 and DF27 are provided to store the identification signal in response to bit b5. When the two flash devices connected to the camera are designed for the flash photographing system of the present invention, both D flip-flops DF17 and DF27 receive LOW. In this case, AND gate AG63 produces HIGH. When at least one of the two flash devices is a type that produces only HIGH on line L2, AND gate AG63 produces LOW. Then, when both flash devices are of the type applicable for the system of the present invention and when sequence flash mode is selected, AND gate AG61 produces HIGH. But, when at least one of the two flash devices is not the type applicable for the system of the invention, AND gate AG61 produces LOW even if switch SS is opened upon selection of sequence flash mode. Now, when the sequence flash mode is selected with two flash devices being connected, AND gates AG47 and AG61 produce HIGH. Thus, AND gate AG45 produces HIGH along line X0. When the simultaneous flash mode is selected, AND gate AG61 produces LOW. Thus, regardless of output signal from AND gate AG47, AND gate AG59 produces HIGH.

In the case of a sequence flash mode, a LOW produced from AND gate AG59 is applied to AND gate AG41. Then, at the timing when a HIGH is produced from output f6 of mode determining circuit TIC, the low applied to AND gate AN59 is transmitted through AND gate AG41, OR gates OR47, OR43 and OR41, AND gate AG1 and transistor BT57 to line L2. Then, at the timing when a HIGH is produced from output f7 of mode determining circuit TIC, the HIGH from AND gate AG47 is transmitted through AND gate AG43, OR gates OR47, 43 and OR41, AND gate AG2 and transistor BT55 to line L2. Therefore, the flash device connected directly to the camera body through the hot shoe is applied with a signal "01" representing the secondary flash of the sequence flash mode. Also at the timing when a HIGH is produced from output f6 of mode determining circuit TIC, a HIGH produced from AND gate AG47 is applied through AND gate AG55, OR gate OR51, AND gate AG64 and transistor BT65 to line L2. Then, at the timing when a HIGH is produced from output f7 of mode determining circuit TIC, LOW produced from AND gate AG59 is applied through AND gate AG57, OR gate OR51, AND gate AG65 and transistor BT67 to line L12. Thus, the flash device connected to camera body through the flash controller is applied with a signal "10" representing the primary flash of the sequence flash mode.

In the case of a simultaneous flash mode, AND gates AG47 and AG59 produce HIGH. Therefore, AND gates AG41 and AG55 produce HIGH at the timing when a HIGH is produced from output f6 of mode determining circuit TIC, and AND gates AG43 and AG57 produce HIGH at the timing when a HIGH is produced from output f7 of mode determining circuit TIC. Thus, a signal "11" representing the simultaneous flash mode is applied to both flash devices.

In the case of a mode other than sequence and simultaneous flash modes, that is a case when only one or no flash device is connected, AND gate AG47 produces LOW, and in turn, AND gate AG59 produces LOW. Thus, the signal corresponding to bits b6 and b7 is "00", which is produced from on both lines L2 and L12. In this case, if a flash device is connected directly to the camera body or through the flash controller, that flash device, upon receipt of the signal "00", is informed that no other flash device is connected.

Next, the description is directed to the data transmission when HIGH is produced from one of outputs f8-f15 of mode determining circuit TIC. When no power on signal is applied from line L12, D flip-flop DF19 produces HIGH from its Q̄ terminal along a line X3. During this period when HIGH is produced from one of outputs f8-f15 of mode determining circuit TIC, OR gate OR46 produces HIGH and, therefore, AND gate AG13 produces HIGH. Thus, NOR gate NO11 produces LOW, thereby disabling AND gates AG1 and AG2. Accordingly, a high impedance will be given on line L2. When the power on signals are applied to flash control circuit CNC through lines L2 and L12, respectively, AND gate AG47 produces HIGH, thereby enabling AND gate AG21. A HIGH produced from output f8 is transmitted through OR gate OR49, AND gate AG21, OR gates OR43 and OR41, AND gate AG2 and transistor BT55 to line L2. This signal corresponds to the power on signal produced in response to bit b8, as described above in connection with Table 1.

When output f9 of mode determining circuit TIC produces HIGH, a signal on line X6 produced from OR gate OR55, which is receiving signals from Q̄ terminals of D flip-flops DF27 and DF17, is inverted and transmitted through AND gate AG33, OR gate OR49, and others to line L2. The signal on line X6 is HIGH when at least one flash device is of the type applicable to the system of the present invention. Accordingly, when at least one flash device is of the type applicable to the system of the present invention, LOW representing the identification signal is produced from line L2 in response to bit b9.

When output f10 of mode determining circuit TIC produces HIGH, a signal on line X0 produced from AND gate AG45 is inverted and transmitted through AND gate AG35. Since AND gate AG47 produces HIGH when the mode is sequence flash mode, LOW representing the sequence flash signal is produced from line L2 in response to bit b10, as indicated in Table 1.

When output f11 of mode determining circuit TIC produces HIGH, a signal on line X2 from AND gate AG49 is transmitted through AND gate AG37 to line L2. AND gate AG49 receives signals from Q terminals of D flip-flops DF13 and DF23 which are storing ready signals obtained from flash devices previously in response to bit b2. Therefore, AND gate AG49 produces HIGH when both flash devices are in the ready condition. This HIGH signal corresponds to the ready signal produced in response to bit b11, as indicated in Table 1.

When output f12 of mode determining circuit TIC produces HIGH, a signal on line X5 from OR gate OR53 is transmitted through AND gate AG39 to line L2. OR gate OR53 receives signals from Q̄ terminals of D flip-flops DF15 and DF25 which are storing FDC signals obtained from flash devices previously in response to bit b3. Therefore, when at least one of the two flash devices produces FDC signal in response to bit b3, OR gate OR53 produces HIGH, which is inverted to LOW and transmitted to line L2. This LOW signal corresponds to the FDC signal produced in response to bit b11, as shown in Table 1.

When outputs f13, f14 and f15 produce HIGH, line L2 is held LOW, as indicated in Table 1, for the future use.

When D flip-flop DF19 stores the power on signal applied from line L12 to produce HIGH from its Q terminal on a line X1 and, at the same time, when D flip-flop DF11 stores no power on signal from line L2 to produce LOW from its Q terminal on a line X4, AND gate AG51 produces HIGH, thereby enabling AND gate AG19. When output f8 of mode determining circuit TIC produces HIGH, the HIGH signal from output f8 is transmitted through OR gate OR45, AND gate AG19, OR gates OR43 and OR41 to line L2. This HIGH signal corresponds to the power on signal produced in response to bit b8 as shown in Table 1.

When output f9 produces HIGH, a HIGH stored in D flip-flop DF27 previously in response to bit b5 and produced from its Q terminal on line X8 is transmitted through AND gate AG25 and various elements to line L2. This HIGH signal corresponds to the identification signal produced in response to bit b9 as shown in Table 1.

When output f10 produces HIGH, a signal produced from D flip-flop DF21 from its Q terminal on line X4 is transmitted through AND gate AG27. This signal is LOW when the flash device connected to line L12 is arranged in the double-action twin flash mode, and HIGH when it is in single flash mode. This signal corresponds to the sequence flash signal produced on line L2 in response to bit b10, as shown in Table 1.

When output f11 of mode determining circuit TIC produces HIGH, the ready signal stored in D flip-flop DF23 from line L12 previously in response to bit b2 is produced from Q terminal of D flip-flop DF23 on line X9 and is transmitted through AND gate AG29. This signal corresponds to the ready signal produced on line L2 in response to bit b11, as shown in Table 1.

When output f12 of mode determining circuit TIC produces HIGH the FDC signal stored in D flip-flop DF25 from line L12 previously in response to bit b3 is produced from Q terminal of D flip-flop DF25 on line X7 and is transmitted though AND gate AG31. This signal corresponds to the FDC signal produced on line L2 in response to bit b12, as shown in Table 1.

When outputs f13, f14 and f15 produce HIGH, line L2 is held LOW, as indicated in Table 1, for the future use.

In the case of a CF mode, output CF of mode determining circuit TIC produces HIGH, thereby producing LOW from NOR gate NO11. Thus, AND gates AG2 and AG1 are disabled. Accordingly, transistor BT53 changes its condition between on and off dependingly on the signals applied to line L2. Thus, the signals corresponding to those applied to line L2 are produced from inverter IN27 on line r21. Upon generation of HIGH from output CF, AND gate AG53 is enabled, thereby transmitting the signals on line r21 through AND gate AG53, OR gate OR51, AND gates AG64 and AG65 and transistor BT65 and BT67 to line 12. In this manner, the data from the camera body are transmitted through line L2 and flash controller to flash device connected to connector CN5 containing line L12.

In the case of an ES mode, terminal ES produces HIGH which is applied through OR gate OR46 to AND gate AG13. If no power on signal is stored in D flip-flop DF19, its output $\overline{Q}$ terminal produces HIGH on line X3, thereby enabling AND gate AG13. Thus, the HIGH from OR gate OR46 is transmitted through AND gate AG13 and, accordingly, NOR gate NO11 produces LOW. Thus, transistors BT55 and BT57 are turned off. If the power on signal is stored in D flip-flop DF19, D flip-flop DF19 produces HIGH from its Q terminal, thereby enabling AND gate AG23. Thus, the signals sent from the flash device through line L12 are transmitted through transistor BT69, inverter IN31 and line r22 to AND gate AG23 and further to line L2. Therefore, the integration control signal, which is synchronized with the light emission, is transmitted from flash device through line L12, flash controller and line L2 to camera body.

In the case of a sequence flash mode, AND gate AG45 produces HIGH which is transmitted through line X0 to AND gate AG11 (bottom of FIG. 18). Thus, AND gate AG11 is enabled. Then, when LOW is provided on line L1 upon closure of X contact Sx, transistor BT59 turns on to provide HIGH on line r1. At this moment, since flip-flop FF23 is in the reset condition, AND gate AG11 produces HIGH upon receipt of HIGH on line r1. When AND gate AG11 produces HIGH, counter CO11 is released from the reset condition, thereby start counting clock pulses $\phi 3$ from pulse generator PG. Then, after counting 6 milliseconds, that is after 6 milliseconds from the closure of X contact Sx, a HIGH is produced on line re, thereby setting flip-flop FF23. Then, if line X2 is carrying HIGH indicating that both flash devices are in the ready condition, AND gate AG88 produces HIGH, thereby turning transistor BT71 on. Thus, LOW is produced on line L21. Accordingly, the flash device III shown in FIG. 1a or 1b-2 emit light. More specifically, in the sequence flash mode, the flash devices I and II emit light sequentially in said order, providing an appropriate amount of light for the proper exposure with the two flash devices I and II. Immediately thereafter, the flash device III emits light. As understood to those skilled in the art, the third flash device is provided, for example, to eliminate undesirable shades formed, such as on back wall, by the flash devices I and II. When flip-flop FF23 is set, AND gate AG11 produces LOW, thereby resetting counter CO11. Then, when X contact Sx opens to turn transistor BT59 off, line r1 carries LOW. Thus, one-shot circuit OS17 produces a pulse which resets flip-flop FF23, thereby turning the circuit in the initial condition.

In the case of a multi-flash mode, the flash devices do not produce any signal during bits b8–b15, but instead, in response to bit b11, the flash controller produces on line L2 HIGH when both flash devices are in the ready condition, and LOW when at least one of the two flash devices is not ready. Then, when this signal is applied to the camera body, it is recognized as the ready signal, but in the flash devices, it is stored in flip-flop FF2 for use in determining whether to emit flash light or not. Furthermore, when it is detected that both flash devices are on the ready condition under the multi-flash mode, AND gate AG86 produces HIGH, thereby enabling AND gate AG92. Then, upon receipt of HIGH from output f11, AND gate AG92 produces HIGH which is applied through OR gate OR72 and OR51 to line L12.

This signal is further applied to the flash devices for informing that the flash emission is possible. On the contrary, if at least one flash device is not in the ready condition, AND gate AG86 produces LOW, thereby producing LOW on line L12. This signal is further applied to the flash devices for informing that the flash emission is not possible.

If the mode is other than the multi-flash mode, inverter IN50 produces HIGH which is applied to AND gate AG90. In this case, when the flash device connected to the flash controller is in the ready condition, HIGH is produced on line X9 from D flip-flop DF23, thereby enabling AND gate AG90. Thus, upon receipt of HIGH from output f11, AND gate AG90 produces HIGH which is applied through OR gates OR72 and OR51 to line L12, and further to the flash device. Thus, the flash device connected to the flash controller is ready to emit light. On the contrary, if the flash device connected to the flash controller is not in the ready condition, D flip-flop DF23 stores LOW, thereby producing LOW on line X9. Thus, notwithstanding the HIGH provided from output f11, AND gate AG90 produces LOW which is applied through OR gates OR72 and OR51 to line L12 and further to the flash device. By this signal, the flash device can not emit flash light.

When outputs FC, CF and ES produce LOW, that is when the mode is a waiting mode, NOR gate NO13 produces HIGH. Then, when no flash device is connected to connector CN5 containing line L12, D flip-flop DF19 produces HIGH on line X3, thereby producing HIGH from AND gate AG15. Thus, NOR gate NO11 produces LOW, thereby turning transistors BT55 and BT57 off. On the contrary, when a flash device is connected to connector CN5, D flip-flop DF19 produces HIGH on line X1, thereby enabling AND gate AG17. Then, when the ready signal stored in D flip-flop DF23 from line L12 in response to bit b2 is HIGH, D flip-flop DF23 produces HIGH on line X9, thereby producing HIGH from AND gate AG17 during the waiting condition. Therefore, when the flash device connected to connector CN5 produces ready signal along line L12, the flash controller produces HIGH on line L2 during the waiting condition.

Figure 19:
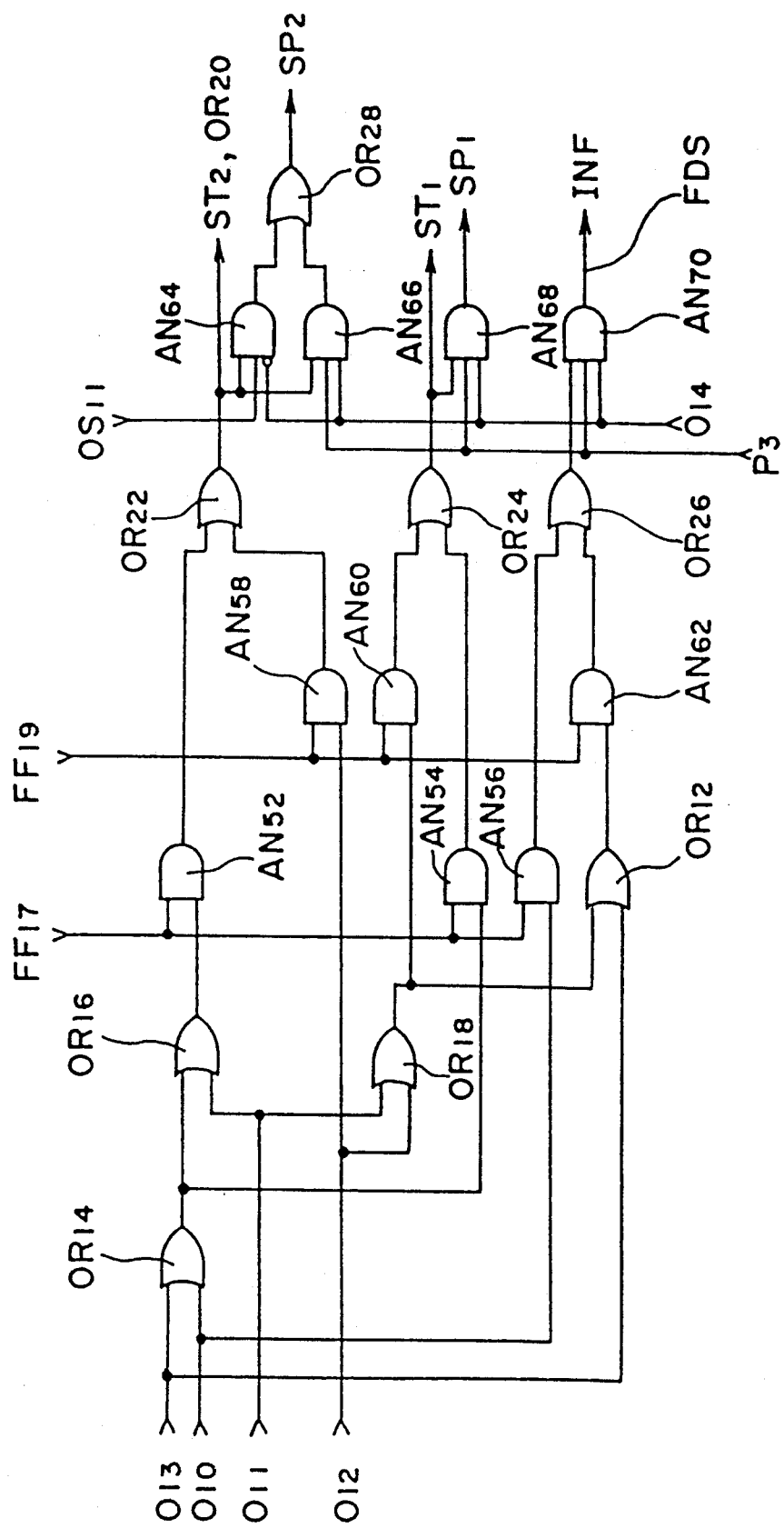
FIG. 19 is a circuit diagram showing a part of emission amount control circuit FTC1, which is different from that shown in FIG. 11.

Referring to FIG. 19, a part of an emission amount control circuit FTC1 for the double flash-head type which is different from that shown in FIG. 11 is shown. In the case of the primary flash of the sequence flash mode, output O13 produces HIGH, thereby producing HIGH from OR gates OR14, OR16 and OR12. Thus, AND gates AN52, AN54 and AN62 are enabled. Thus, the signal from flip-flop FF17, which signal is maintained HIGH for 2.5 milliseconds after the closure of X contact Sx, is transmitted through AND gates AN52 and AN54 and OR gates OR22 and OR24 to each of light emitters FLO1 and FLO2. Thus, both light emitters FLO1 and FLO2 emit light simultaneously.

If the mode is auto-adjustment mode, the stop emission signal produced from the terminal P3 is produced from both AND gates AN66 and AN68 and provided to both light emitters FLO1 and FLO2, simultaneously. Thus, light emitters FLO1 and FLO2 stop emission simultaneously. Also, the signal from flip-flop FF19, which signal is maintained HIGH for 2.5 milliseconds after 3.5 milliseconds passed from the closure of X contact Sx, is transmitted through AND gate AN62 and OR gate OR26 to AND gate AN70. During the presence of said signal, the stop emission signal is transmitted from terminal P3 through AND gate AN70 to light adjustment success indication circuit INF, for the indication of FDS signal.

If the mode is other than the auto-adjustment mode, the stop emission signal produced from one-shot circuit OS11 is transmitted through AND gate AN64 and OR gate OR28 to light emitter FLO2, and no stop emission signal is applied to light emitter FLO1. Thus, in this case, the light emitter FLO1 carries out the full emission.

In the case of the secondary flash of the sequence flash mode, output O12 produces HIGH, thereby producing HIGH from OR gates OR18 and OR12. Thus, AND gates AN58, AN60 and AN62 are enabled. Accordingly, when flip-flop FF19 is set, both light emitters emit light simultaneously, and stop the light emission simultaneously upon receipt of the stop emission signal provided from terminal P3. The stop emission signal is also provided to light adjustment success indication circuit INF.

In the case of the simultaneous or single flash mode, terminal O10 produces HIGH, thereby producing HIGH from OR gates OR14 and OR16. Thus, AND gates AN52, AN54 and AN56 are enabled. Accordingly, when flip-flop FF17 is set, both light emitters emit light simultaneously, and stop the light emission simultaneously upon receipt of the stop emission signal provided from terminal P3. The stop emission signal is also provided to light adjustment success indication circuit INF.

In the case of the double-action twin flash mode, output O11 produces HIGH, thereby producing HIGH from OR gates OR16, OR18 and OR12. Thus, AND gates AN52, AN60 and AN62 are enabled. First, light emitter FLO2 starts to emit light when flip-flop FF17 is set, and it stops emission in response to the stop emission signal from terminal P3. Thereafter, light emitter FLO1 starts to emit light when flip-flop FF19 is set, and it stops emission in response to the stop emission signal. This stop emission signal is also applied to light adjustment success indication circuit INF.

According to the above modification, for the modes other than the double-action twin flash mode, both light emitters emit light simultaneously. Therefore, the available range of photographing distance must be determined and displayed in accordance with the total maximum light amount from light emitters FLO1 and FLO2.

Next, further modifications of the flash photographing system of the present invention will be described.

In the case of multi-flash photographing, a first flash device may be set to auto-adjustment mode, and a second flash device may be set to manual adjustment mode. In such a case, the FDC display can be carried out between the first flash device and the camera body, but no FDC display is effected with respect to the second flash device. In order to avoid such an inconvenience, the following modification can be employed.

1. When the signal read in response to bits b6 and b7 is either "01", "10" (representing sequence flash mode) or "11" (representing simultaneous flash mode), the mode is forcibly set to auto-adjustment mode even if it is set to manual adjustment mode. In other words, in the case of multi-flash mode, the manual adjustment mode is not permitted.

2. In response to bit b4, preserved for the future use, the flash device produces a signal representing either auto- or manual adjustment mode. This signal is read by the flash controller. While in the flash controller, it is determined whether or not the mode is multi-flash mode. If the flash controller detects that one flash device is in the manual adjustment mode, a prohibit signal is sent in response to bit b15 to the flash device in the manual adjustment mode. Accordingly, the flash device in the manual adjustment mode is forcibly changed to auto-adjustment flash mode. In other words, in the case of multi-flash mode, it is prohibited to set two different modes (auto-adjustment mode and manual adjustment mode) at the same time, thus permitting both flash devices to be either auto-adjustment mode or manual adjustment mode.

3. In the case of multi-flash mode, if the flash controller receives FDC signals from both flash devices, the FDC signals are sent out in response to bit b15.

According to another modification, when the data from the flash device to camera body are all HIGH, indicating that the connected flash device is not applicable to the system of the present invention, the camera body will not carry out a control operation of exposure and display for the flash photographing, but a control operation of exposure and display for the ambient light. Thus, it is possible to exclude the flash devices which are not designed for the system of the present invention.

Furthermore, when the signals from the flash device to camera body are all HIGH, the camera body, regardless of what mode it is set, automatically sets 1/60 second for the exposure time and F-stop 5.6 for the aperture size, thereby ensuring the most widely used setting condition for the flash photographing.

Instead of the manner described in the preferred embodiment, the signal exchange to determine whether or not to carry out the light emission upon charge completion can be carried out in the following manner. When mode determining circuit TIC produces HIGH from its output ES after the shutter of camera body has been released, a timing signal for producing ready signal and a timing signal for reading are formed in each flash devices and flash controller. In accordance with the ready signal read in response to these timing signals, it is possible to determined whether or not to carry out the light emission.

In the preferred embodiment described above, since the operation of power-on-reset carried out upon turn on of the main power is known to those skilled in the art, the detailed description therefor is omitted for the sake of brevity.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. A flash photographing system comprising:
   a camera unit including mixing means for mixing a timing signal with a camera side information signal to produce a composite timing signal;
   a flash unit including interpreting means for interpreting said camera side information signal;
   first means for transmitting a first signal from said camera unit to said flash unit;
   second means for transmitting a second signal from said flash unit to said camera unit; and
   third means for transmitting said composite signal from said camera unit to said flash unit.

2. The system of claim 1, wherein said first means includes a pair of first transmission terminals each provided at each of said camera and flash units, said pair of first transmission terminals being electrically connected.

3. The system of claim 2 wherein said first signal is a flash start signal.

4. The system of claim 1 wherein said second means includes a pair of second transmission terminals each provided at each of said camera and flash units, said pair of second transmission terminals being electrically connected.

5. The system of claim 4 wherein said second signal is a flash unit side information signal containing a plurality of data produced serially at the flash unit.

6. The system of claim 1 wherein said third means includes a pair of third transmission terminals each provided at each of said camera and flash units, said pair of third transmission terminals being electrically connected.

7. A flash photographing system comprising:
   a camera unit including combining means for combining a timing signal with a camera side information signal to produce a composite timing signal and camera side information signal;
   a flash unit including interpreting means for interpreting said said camera side information signal;
   a first means for transmitting a first signal from said camera unit to said flash unit;
   second means for transmitting a second signal from said flash unit to said camera unit; and
   third means for transmitting said combined timing signal and said camera side information signal from said camera unit to said flash unit.

8. The system of claim 7 wherein said first means includes a pair of first transmission terminals each provided at each of said camera and flash units, said pair of first transmission terminals being electrically connected.

9. The system of claim 8 wherein said first signal is a flash start signal.

10. The system of claim 7 wherein said second means includes a pair of second transmission terminals each provided at each of said camera and flash units, said pair of second transmission terminals being electrically connected.

11. The system of claim 10 wherein said second signal is a flash unit side information signal containing a plurality of data produced serially at the flash unit.

12. The system of claim 8 wherein said third means includes a pair of third transmission terminals each provided at each of said camera and flash units, said pair of third transmission terminals being electrically connected.

* * * * *